US007291367B2

(12) United States Patent
Kirsch et al.

(10) Patent No.: US 7,291,367 B2
(45) **Date of Patent: *Nov. 6, 2007**

(54) LIQUID-CRYSTALLINE COMPOUNDS

(75) Inventors: Peer Kirsch, Kanagawa (JP); Alexander Hahn, Gross-Gerau (DE); Eike Poetsch, Muehltal (DE); Volker Meyer, Gross-Zimmern (DE); Michael Heckmeier, Hemsbach (DE); Melanie Klasen-Memmer, Heuchelheim (DE); Georg Luessem, Petershausen (DE); Christian Hock, Mainaschaff (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/536,808

(22) PCT Filed: Nov. 17, 2003

(86) PCT No.: PCT/EP03/12813

§ 371 (c)(1),
(2), (4) Date: May 27, 2005

(87) PCT Pub. No.: WO2004/048501

PCT Pub. Date: Jun. 10, 2004

(65) Prior Publication Data

US 2006/0061699 A1 Mar. 23, 2006

(30) Foreign Application Priority Data

Nov. 27, 2002 (DE) ................................ 102 55 311

(51) Int. Cl.

| | |
|---|---|
| ***C09K 19/34*** | (2006.01) |
| ***C09K 19/30*** | (2006.01) |
| ***C09K 19/12*** | (2006.01) |
| ***C07D 309/02*** | (2006.01) |
| ***C07D 319/06*** | (2006.01) |
| ***C07D 315/00*** | (2006.01) |

(52) U.S. Cl. ............ 428/1.1; 252/299.61; 252/299.63; 252/299.66; 549/356; 549/369; 549/427; 549/428

(58) Field of Classification Search ................. 428/1.1; 252/299.61, 299.01, 299.63, 299.66; 549/356, 549/369, 427, 428
See application file for complete search history.

(56) References Cited

U.S. PATENT DOCUMENTS

| | | | | |
|---|---|---|---|---|
| 4,818,431 | A | 4/1989 | Eidenschink et al. | |
| 6,558,758 | B1 | 5/2003 | Yanai et al. | |
| 6,605,747 | B2 * | 8/2003 | Kondo et al. | 568/642 |
| 6,827,876 | B2 * | 12/2004 | Kondo et al. | 252/299.6 |
| 6,902,777 | B2 * | 6/2005 | Hirschmann et al. | 428/1.1 |
| 7,056,561 | B2 * | 6/2006 | Heckmeier et al. | 428/1.1 |
| 2002/0120168 | A1 * | 8/2002 | Kondo et al. | 568/39 |
| 2003/0197153 | A1 | 10/2003 | Heckmeier et al. | |
| 2003/0213935 | A1 | 11/2003 | Heckmeier et al. | |
| 2003/0216554 | A1 | 11/2003 | Kirsch et al. | |
| 2003/0234384 | A1 * | 12/2003 | Heckmeier et al. | 252/299.63 |
| 2004/0016906 | A1 | 1/2004 | Kondo et al. | |
| 2004/0112275 | A1 * | 6/2004 | Heckmeier et al. | 117/2 |
| 2005/0040365 | A1 * | 2/2005 | Heckmeier et al. | 252/299.63 |

FOREIGN PATENT DOCUMENTS

| | | |
|---|---|---|
| DE | 100 08 712 | 8/2000 |
| DE | 100 50 071 | 6/2001 |
| DE | 102 29 476 | 2/2003 |
| DE | 102 43 776 | 4/2003 |
| DE | 103 03 638 | 11/2003 |
| EP | 0 117 476 | 9/1984 |
| EP | 1 182 186 | 2/2002 |
| EP | 1 302 523 | 4/2003 |

* cited by examiner

*Primary Examiner*—Shean C Wu
(74) *Attorney, Agent, or Firm*—Millen, White, Zelano & Branigan, P.C.

(57) ABSTRACT

The invention relates to liquid-crystalline compounds of the formula (I) in which $R^1$, $R^2$, $A^1$, $A^2$, $A^3$, $A^4$, $Z^1$, $Z^2$, $Z^3$, a, b and c have the meanings indicated in Claim 1, and to liquid-crystalline media comprising at least one compound of the (I) and to electro-optical displays containing a liquid-crystalline medium of this type.

12 Claims, No Drawings

LIQUID-CRYSTALLINE COMPOUNDS

The present invention relates to liquid-crystalline compounds and to a liquid-crystalline medium, to the use thereof for electro-optical purposes, and to displays containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid-crystal displays of this type are known. Non-linear elements which can be used for individual switching of the individual pixels are, for example, active elements (i.e. transistors). The term "active matrix" is then used, where a distinction can be made between two types:

1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joins.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are back-lit.

The term MLC displays here encompasses any matrix display with integrated non-linear elements, i.e., besides the active matrix, also displays with passive elements, such as varistors or diodes (MIM=metal-insulator-metal).

MLC displays of this type are particularly suitable for TV applications (for example pocket television sets) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKI-GUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, p.141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not meet today's requirements.

There thus continues to be a great demand for MLC displays having very high specific resistance at the same time as a large working-temperature range, short response times even at low temperatures and low threshold voltage which do not have these disadvantages, or only do so to a reduced extent.

In TN (Schadt-Helfrich) cells, media are desired which facilitate the following advantages in the cells:

- extended nematic phase range (in particular down to low temperatures)
- the ability to switch at extremely low temperatures (outdoor use, auto-mobile, avionics)
- increased resistance to UV radiation (longer service life).

The media available from the prior art do not allow these advantages to be achieved while simultaneously retaining the other parameters.

In the case of supertwisted (STN) cells, media are desired which enable greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

The invention has the object of providing media, in particular for MLC, IPS, TN or STN displays of this type, which do not have the above-mentioned disadvantages or only do so to a reduced extent, and preferably simultaneously have very high specific resistance values and low threshold voltages. This object requires liquid-crystalline compounds which have a high clearing point and low rotational viscosity.

It has now been found that this object can be achieved if the liquid-crystal-line compounds according to the invention are used.

The invention thus relates to liquid-crystalline compounds of the formula I

I

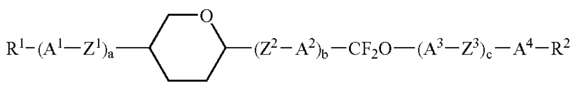

in which $R^1$ and $R^2$ each, independently of one another, denote H, halogen, a halogenated or unsubstituted alkyl or alkoxy radical having 1 to 15 C atoms, where, in addition, one or more $CH_2$ groups in these radicals may each, independently of one another, be replaced by —C≡C—, —CH═CH—, —O—, —CO—O— or —O—CO— in such a way that O atoms are not linked directly to one another, where one of the radicals $R^1$ and $R^2$ may alternatively denote CN, OCN, SCN, NCS or $SF_5$, $A^1$, $A_2$, $A_3$ and $A^4$ each, independently of one another, denote

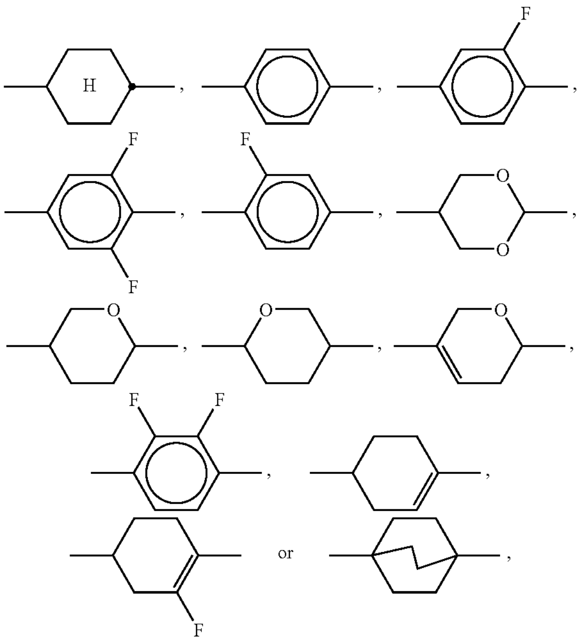

$Z^1$, $Z^2$ and $Z^3$ each, independently of one another, denote —CO—O—, —O—CO—, —$CF_2O$—, —$OCF_2$—, —$CH_2O$—, —$OCH_2$—, —$CH_2CH_2$—, —$(CH_2)_4$—, —$C_2F_4$—, —$CH_2CF_2$—, —$CF_2CH_2$—, —CF═CF—, —CH═CH—, —C≡C— or a single bond, and a, b and c each, independently of one another, denote 0, 1, 2 or 3, where a+b+c≦3.

The invention furthermore relates to the use of the compounds of the formula I in liquid-crystalline media.

The compounds of the formula I have a broad range of applications. Depending on the choice of substituents, these compounds can serve as base materials of which liquid-crystalline media are predominantly composed; however, it is also possible to add compounds of the formula I to liquid-crystalline base materials from other classes of compound in order, for example, to modify the dielectric and/or optical anisotropy of a dielectric of this type and/or in order to optimise its threshold voltage and/or its viscosity.

In the pure state, the compounds of the formula I are colourless and form liquid-crystalline mesophases in a temperature range which is favourably located for electro-optical use. In particular, the compounds according to the invention are distinguished by their broad nematic phase range. In liquid-crystalline mixtures, the substances according to the invention suppress the smectic phases and result in a significant improvement in the low-temperature storage stability. They are stable chemically, thermally and to light.

The invention relates, in particular, to the compounds of the formula I in which $R^1$ is alkyl or alkenyl, and $R^2$ is halogen or $OCF_3$. Halogen is preferably F, furthermore Cl.

Particular preference is given to compounds of the formula I in which a=0, furthermore a=1. $Z^1$, $Z^2$ and/or $Z^3$ preferably denotes a single bond, furthermore —$CF_2O$—, —$OCF_2$—, —$C_2F_4$—, —$CH_2O$—, —$OCH_2$— or —COO—.

$A^1$, $A^2$, $A^3$ and $A^4$ preferably denote

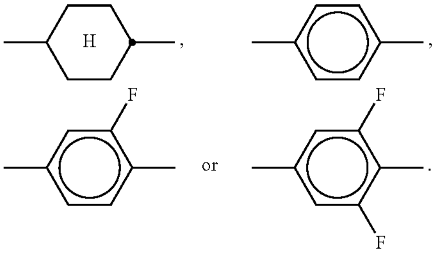

$A^4$ denotes in particular

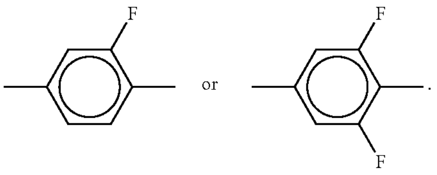

Particular preference is given to compounds of the formulae IA

IA

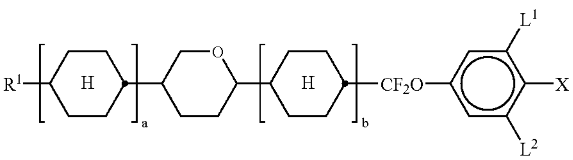

in which a and b each denote 0, 1 or 2 and a+b=1 or 2. Preferably, a=1 and b=0 or a=0 and b=1. Preferably, $L^1$=F and $L^2$=H or fluorine, in particular $L^1$=$L^2$=fluorine.

$R^1$ preferably denotes alkyl, alkoxy, alkenyl or alkenyloxy. $R^2$ preferably denotes F, Cl, $OCF_3$, $OCHF_2$, $OCHFCF_3$, $OCF_2CHFCF_3$, CN, $SF_5$, NCS or SCN, in particular F or $OCF_3$, and $R^1$ preferably denotes straight-chain alkyl or alkenyl. $L^1$ and $L^2$ each, independently of one another, denote H or F. Particular preference is given to compounds in which X=$L^1$=$L^2$=fluorine, furthermore X═$OCF_3$ and. $L^1$=$L^2$=F.

Particularly preferred compounds of the formula I are the compounds of the formulae I1 to I31,

I1

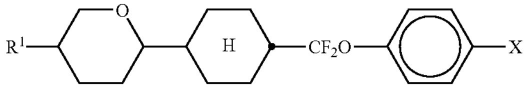

I2

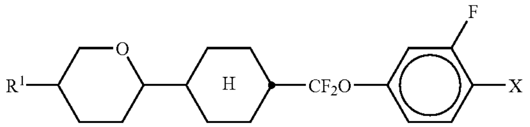

I3

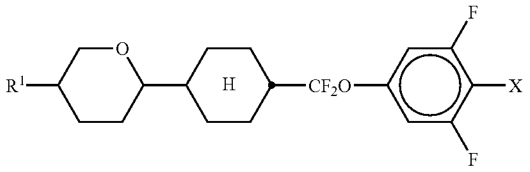

I4

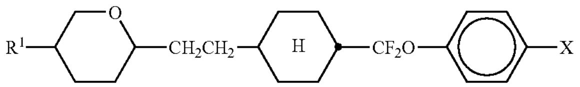

I5

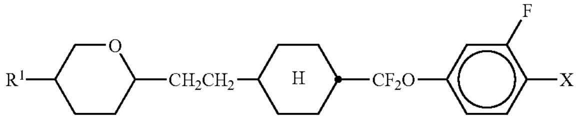

I6

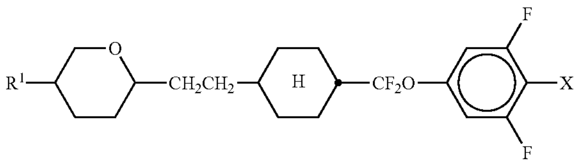

I7

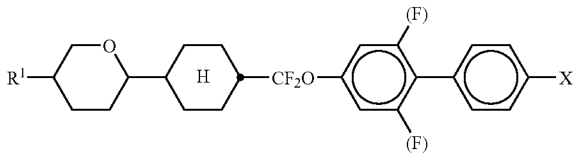

-continued

I8

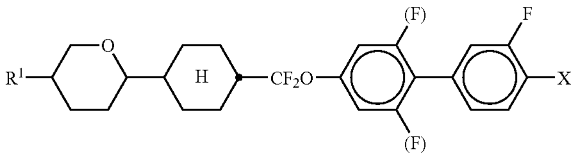

I9

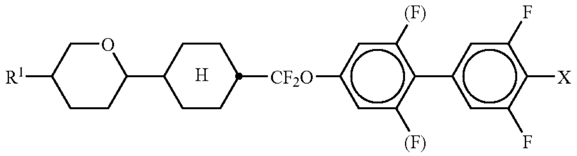

I10

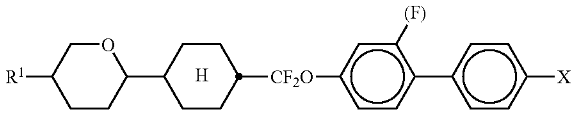

I11

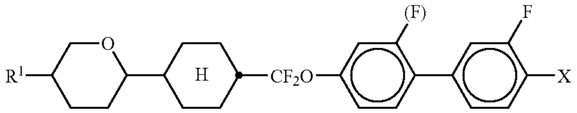

I12

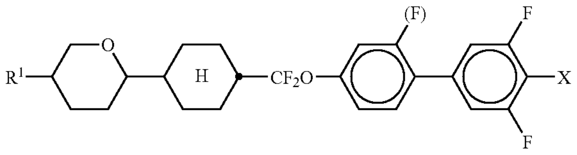

I13

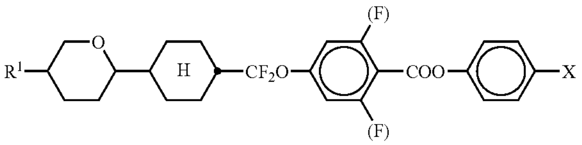

I14

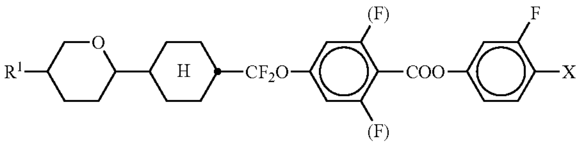

I15

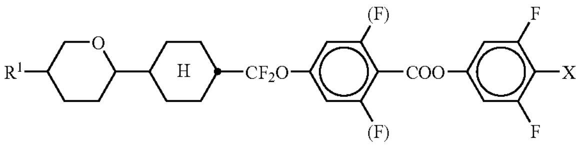

I16

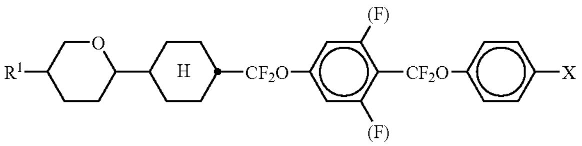

-continued

I17

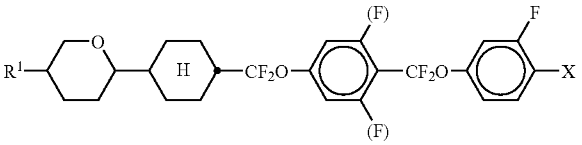

I18

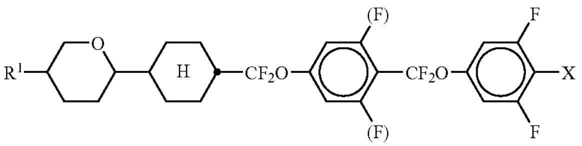

I19

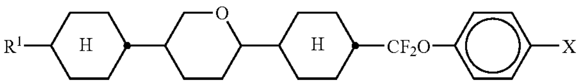

I20

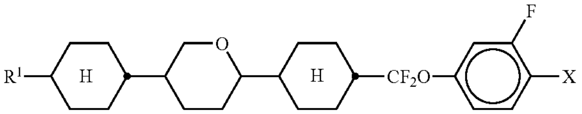

I21

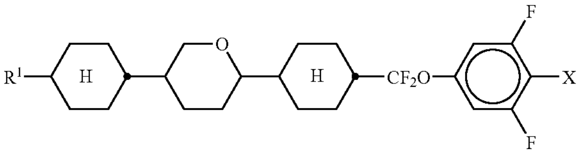

I22

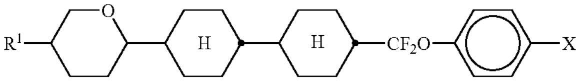

I23

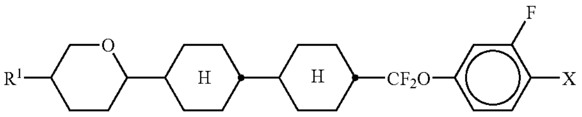

I24

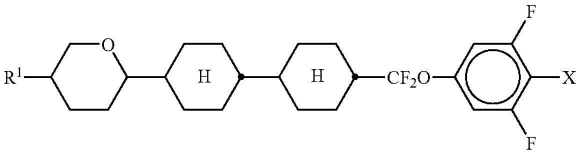

I25

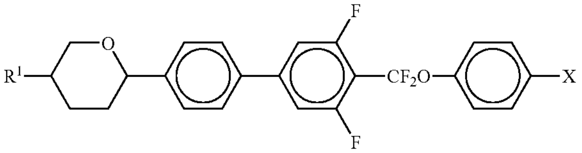

I26

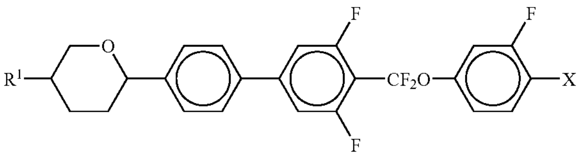

-continued

I27

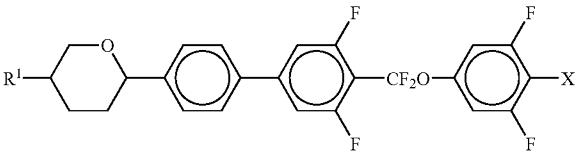

I28

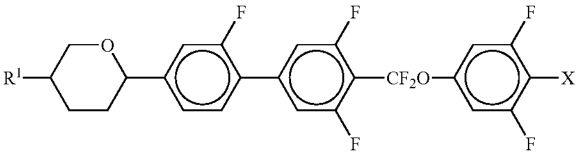

I29

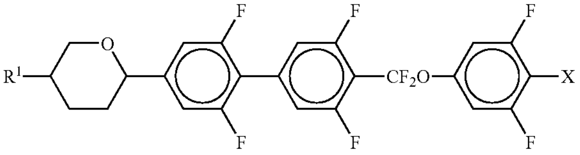

I30

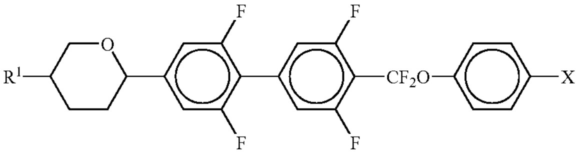

I31

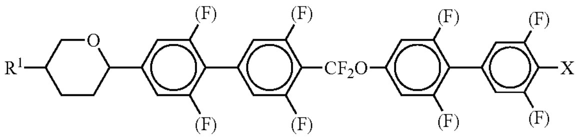

in which $R^1$ has the meaning indicated above. X has the meaning of $R^2$.

The compounds of the formula I can be separated into the enantiomers very easily by passing the racemate, for example, through a chiral HPLC column. The invention therefore relates to the compounds of the formula I both in the form of the racemate and the enantiomer.

The compounds of the formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail.

The compounds of the formula I can be prepared, for example, as follows:

Scheme 1

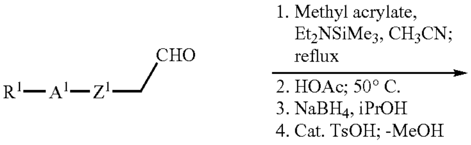

-continued
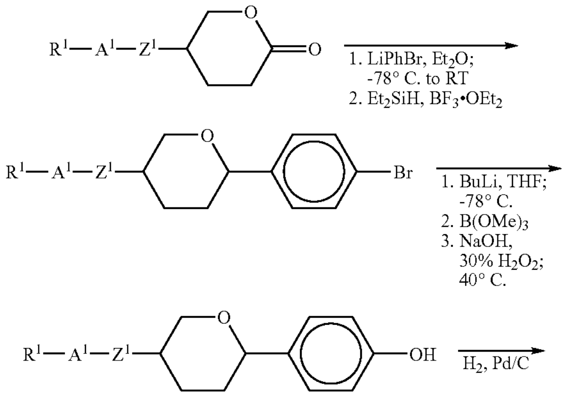
-continued
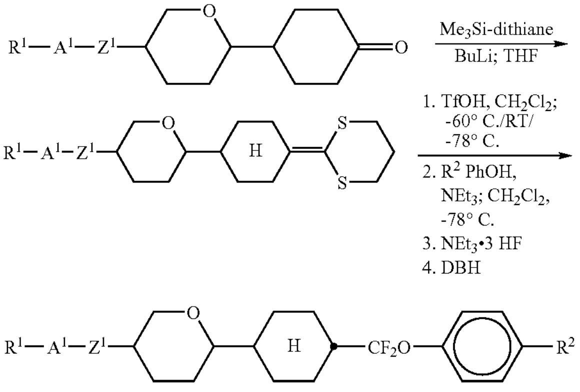
Scheme 2
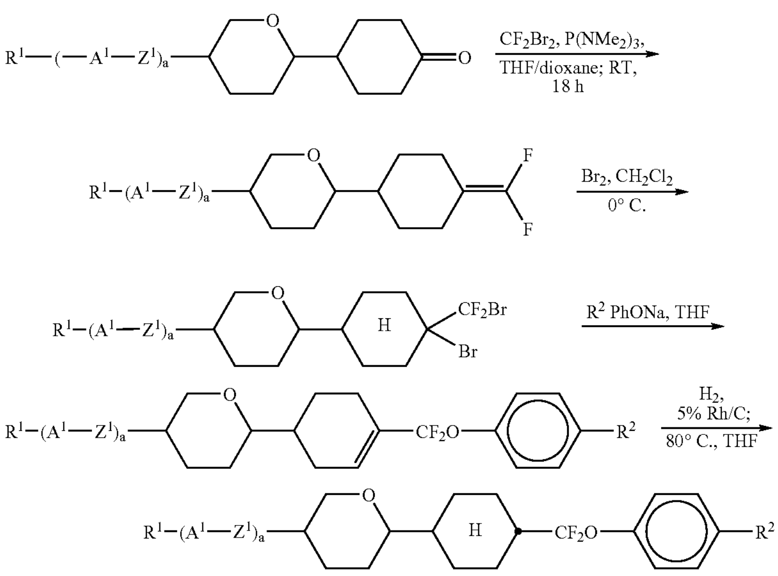
Scheme 3
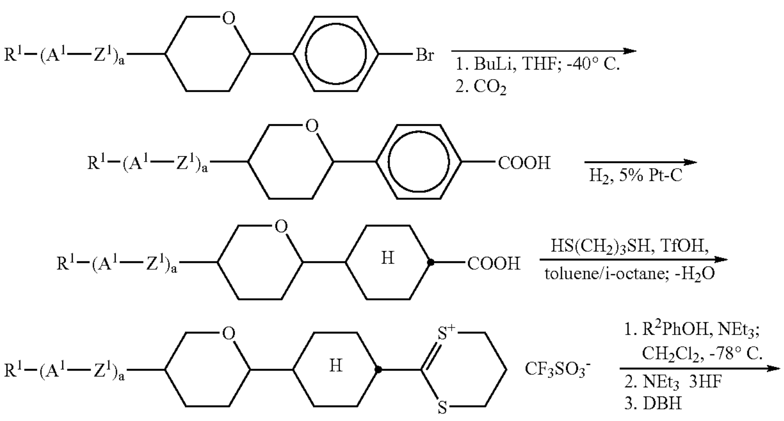

-continued
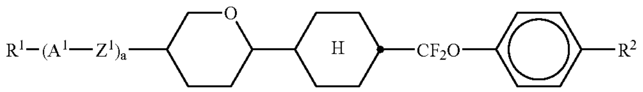
Scheme 4
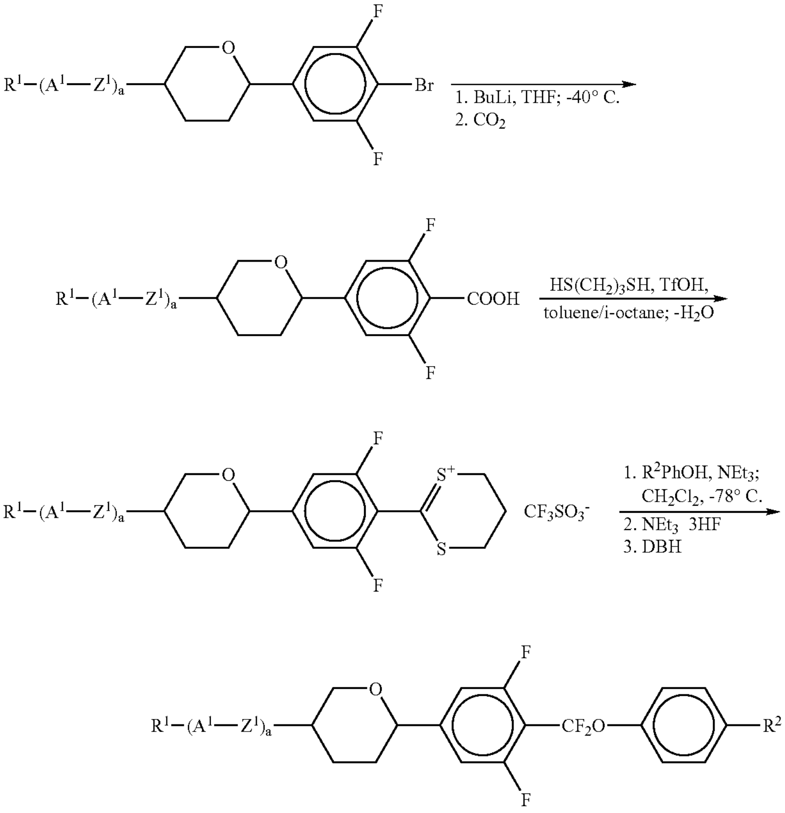
Scheme 5
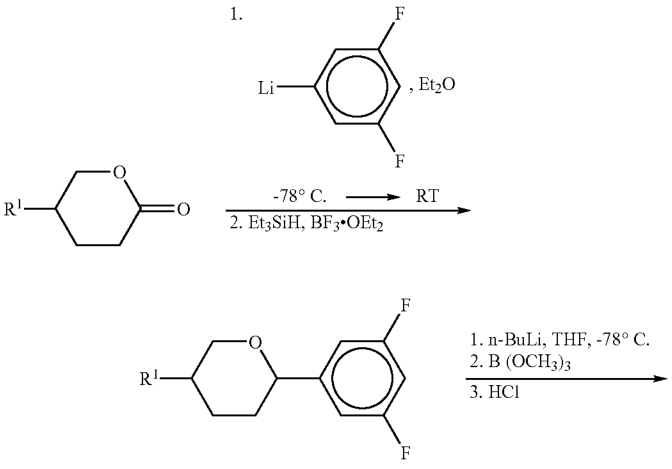

-continued

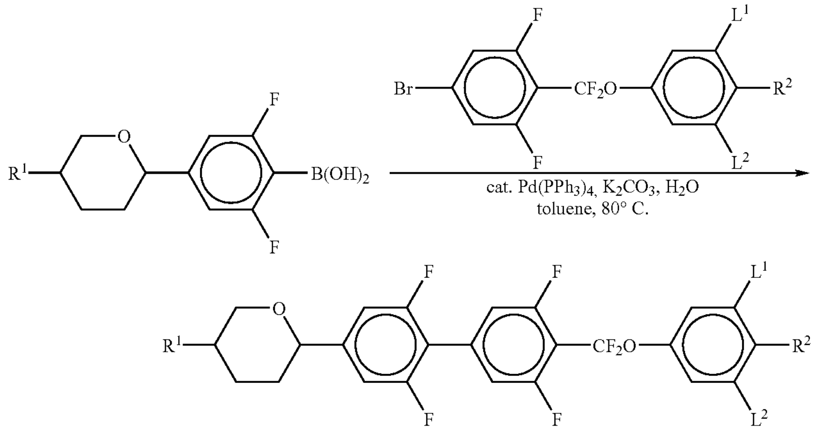

($L^1$ and $L^2$: H or F)

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance which is located in the cell) which contain media of this type, and to the use of these media for electro-optical purposes.

The liquid-crystal mixtures according to the invention enable a significant widening of the available parameter latitude.

The achievable combinations of clearing point, viscosity at low temperature, thermal and UV stability and dielectric anisotropy are far superior to previous materials from the prior art.

The requirement for a high clearing point, a nematic phase at low temperature and a high $\Delta\epsilon$ has hitherto only been satisfied to an inadequate extent. Although liquid-crystal mixtures such as, for example, MS 99295 (Merck KGaA, Darmstadt, Germany) have comparable clearing points and low-temperature stabilities, they have, however, relatively high $\Delta n$ values and also higher threshold voltages of about $\leqq$1.7 V.

Other mixture systems have comparable viscosities and $\Delta\epsilon$ values, but only have clearing points in the region of 60° C.

The liquid-crystal mixtures according to the invention, while retaining the nematic phase down to −20° C. and preferably down to −30° C., particularly preferably down to −40° C., enable clearing points above 80°, preferably above 90°, particularly preferably above 100° C., simultaneously dielectric anisotropy values $\Delta\epsilon$ of $\geqq$4, preferably $\geqq$6, and a high value for the specific resistance to be achieved, enabling excellent STN and MLC displays to be obtained. In particular, the mixtures are characterised by low operating voltages. The TN thresholds are below 1.5 V, preferably below 1.3 V.

It goes without saying that, through a suitable choice of the components of the mixtures according to the invention, it is also possible for higher clearing points (for example above 110°) to be achieved at higher threshold voltage or lower clearing points to be achieved at lower threshold voltages with retention of the other advantageous properties. At viscosities correspondingly increased only slightly, it is likewise possible to obtain mixtures having greater $\Delta\epsilon$ and thus lower thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

The flow viscosity $\nu_{20}$ at 20° C. is preferably $<60\ mm^2 \cdot s^{-1}$, particularly preferably $<50\ mm^2 \cdot s^{-1}$. The nematic phase range is preferably at least 90°, in particular at least 100°. This range preferably extends at least from −30° to +80°. The rotational viscosity $\gamma_1$ at 20° C. is preferably <200 mPa.s, particularly preferably <180 mPa.s, in particular <160 mPa.s.

Measurements of the capacity holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR with increasing temperature than analogous mixtures comprising cyanophenylcyclohexanes of the formula

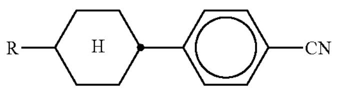

or esters of the formula

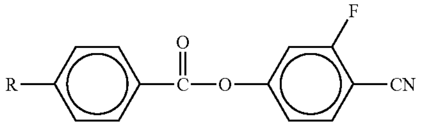

instead of the compounds of the formula I.

The UV stability of the mixtures according to the invention is also considerably better, i.e. they exhibit a significantly smaller decrease in the HR on exposure to UV.

The media according to the invention are preferably based on a plurality of (preferably two, three or more) compounds of the formula I, i.e. the proportion of these compounds is 5-95%, preferably 10-60% and particularly preferably in the range 15-40%.

The individual compounds of the formulae I to IX and their sub-formulae which can be used in the media according to the invention are either known or they can be prepared analogously to the known compounds.

Preferred embodiments are indicated below:

The medium preferably comprises one, two or three homologous compounds of the formula I, where each homologue is present in the mixture in a maximum amount of 10%.

Medium additionally comprises one or more compounds selected from the group consisting of the general formulae II to IX:

II

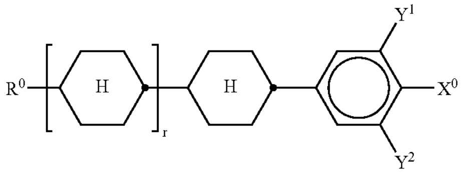

III

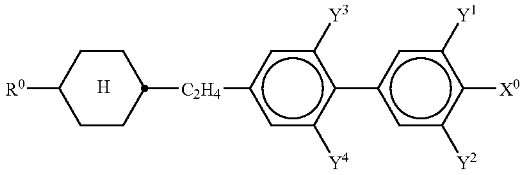

IV

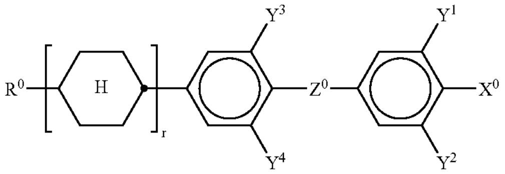

V

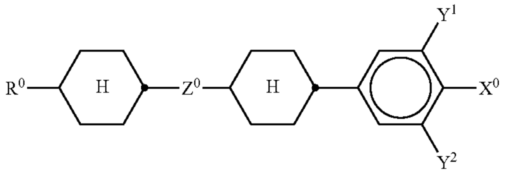

-continued

VI

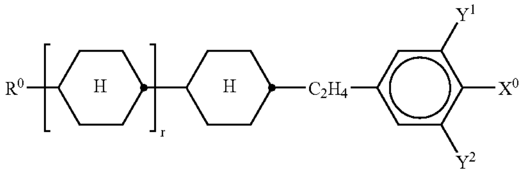

VII

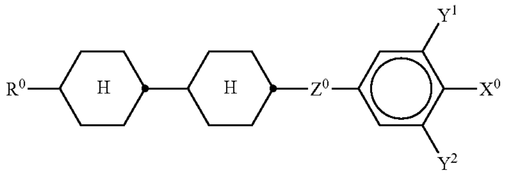

VIII

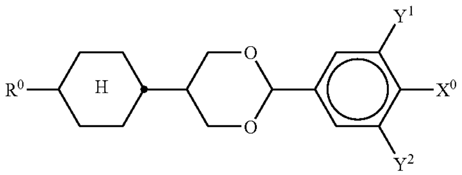

IX

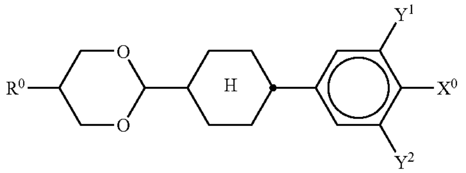

in which the individual radicals have the following meanings:

$R^0$ n-alkyl, oxaalkyl, fluoroalkyl, alkenyloxy or alkenyl, each having up to 9 C atoms, $X^0$ F, Cl, halogenated alkyl, halogenated alkenyl, halogenated alkenyloxy or halogenated alkoxy having up to 7 C atoms, $Z^0$ —CH═CH—, —$C_2H_4$—, —$(CH_2)_4$—, —$C_2F_4$—, —$CH_2O$—, —$OCH_2$—, —CF═CF—, —$CF_2O$—, —$OCF_2$— or —COO—, $Y^1$, $Y^2$, $Y^3$ and $Y^4$ each, independently of one another, H or F, and r 0 or 1.

The compound of the formula IV is preferably

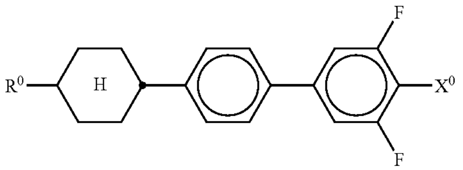

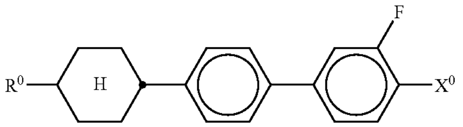

-continued
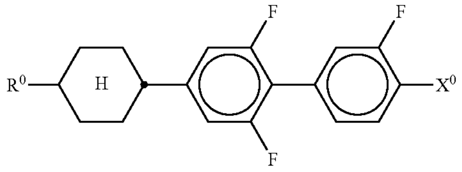
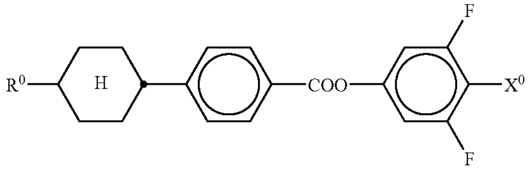
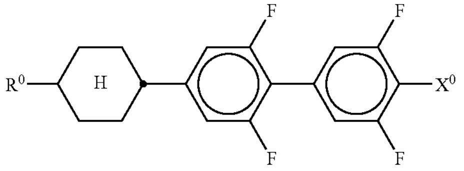
or
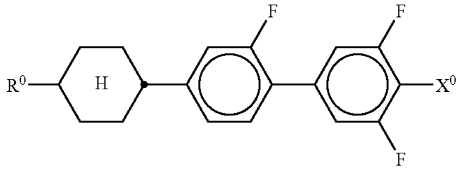
The medium preferably comprises one or more compounds of the formulae
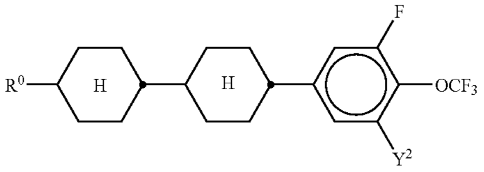
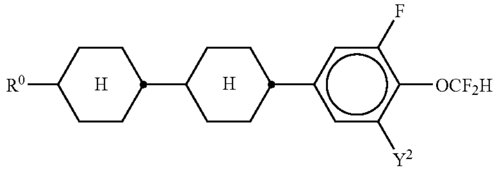
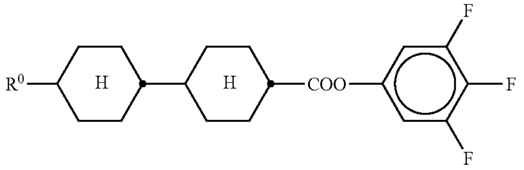
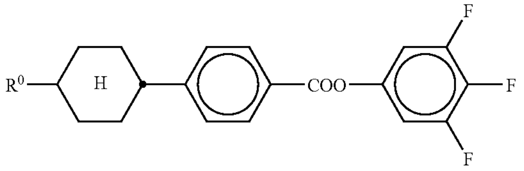
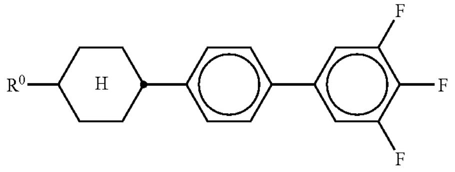
-continued
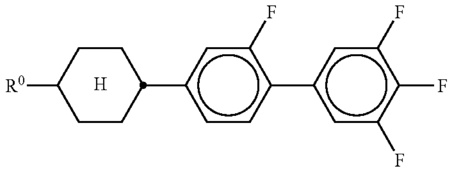
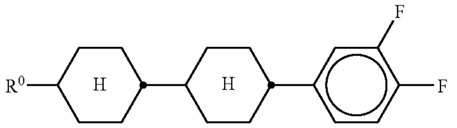
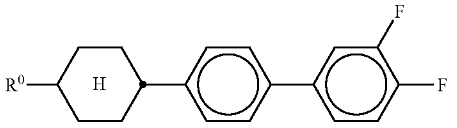
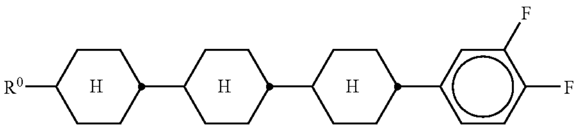
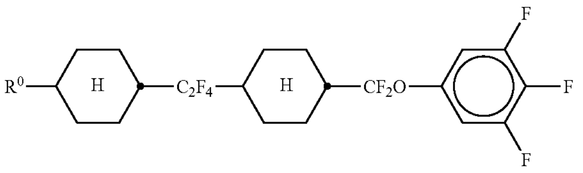
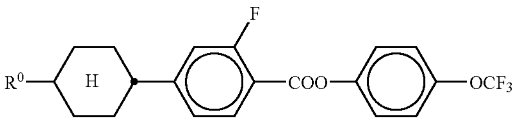
and/or
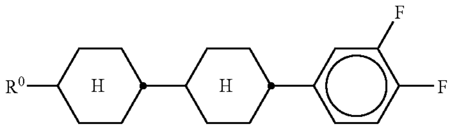
in which $R^0$ and $Y^2$ have the meanings indicated above.
The medium preferably comprises one, two or three, furthermore four, homologues of the compounds selected from the group consisting of H1 to H19 (n=1-7):
H1
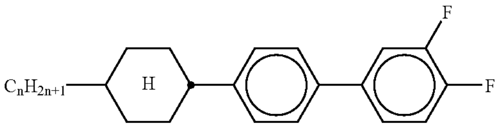
H2
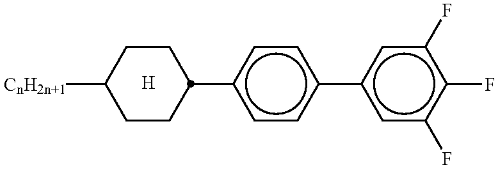
H3
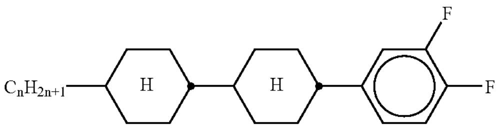

-continued
H4
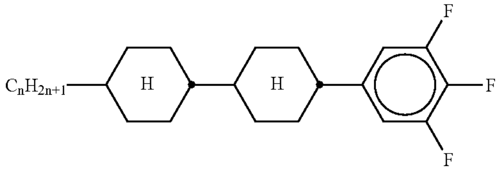
H5
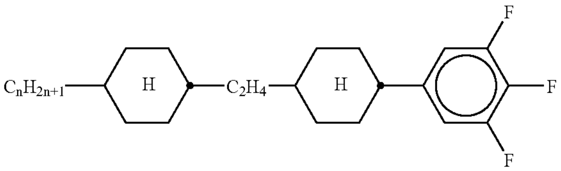
H6
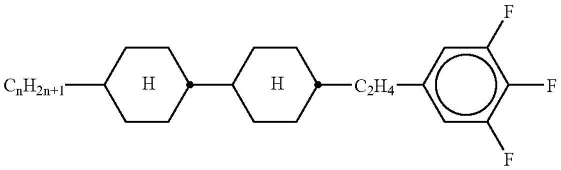
H7
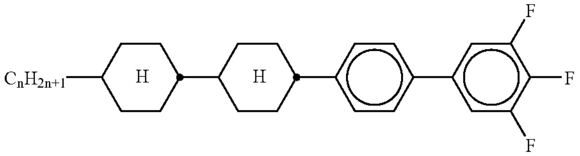
H8
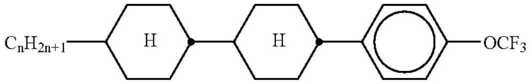
H9
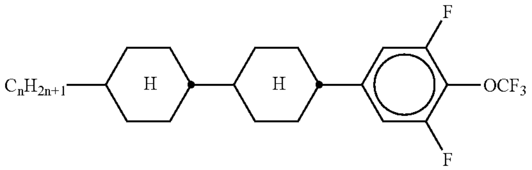
H10
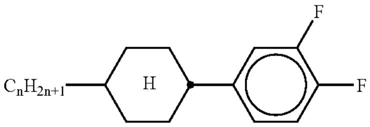
H11
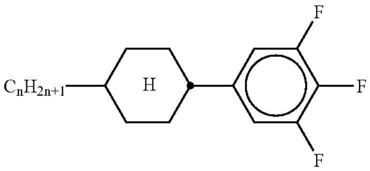
H12
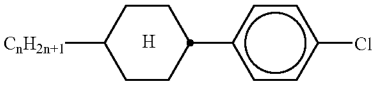
-continued
H13
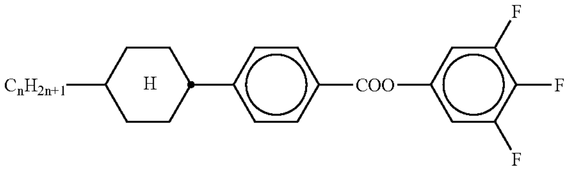
H14
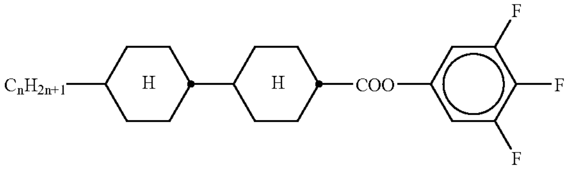
H15
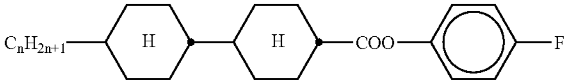
H16
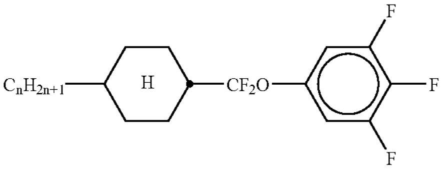
H17
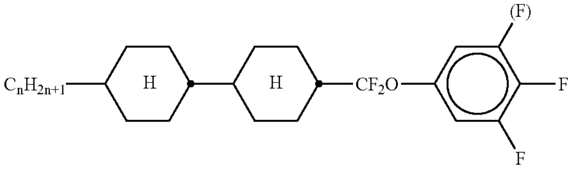
H18
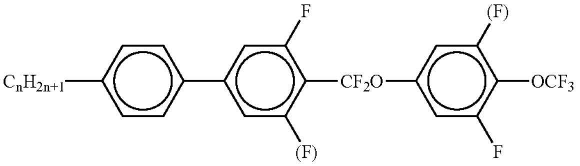
H19
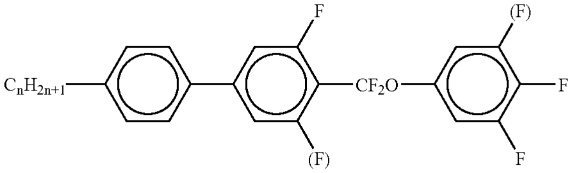
The medium additionally comprises one or more compounds selected from the group consisting of the general formulae X to XV:
X
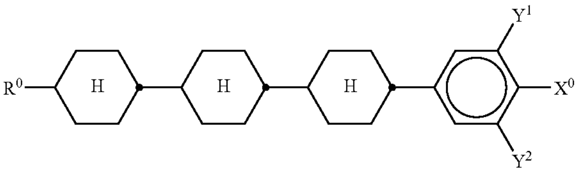

-continued

XI

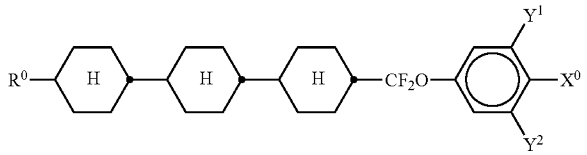

XIII

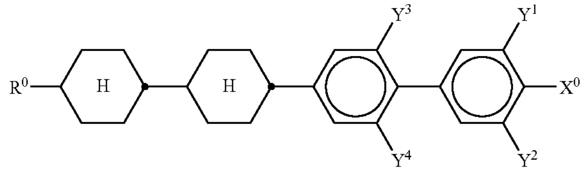

XIII

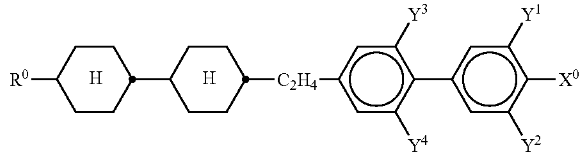

XIV

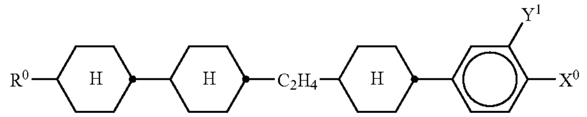

XV

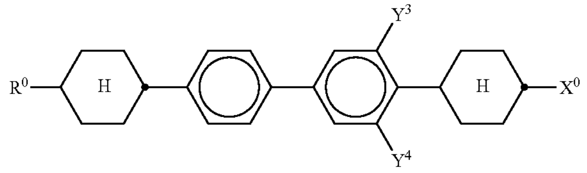

in which $R^0$, $X^0$, $Y^1$, $Y^2$, $Y^3$ and $Y^4$ each, independently of one another, have one of the meanings indicated in Claim 8. $X^0$ [a]preferably denotes F, Cl, $CF_3$, $OCF_3$ or $OCHF_2$. $R^0$ preferably denotes alkyl, oxaalkyl, fluoroalkyl, alkenyl or alkenyloxy.

The proportion of compounds of the formulae I to IX together in the mixture as a whole is at least 50% by weight.

The proportion of compounds of the formula I in the mixture as a whole is 5 to 50% by weight.

The proportion of compounds of the formula II in the mixture as a whole is 3-40% by weight.

The proportion of compounds of the formulae II to IX in the mixture as a whole is 30 to 70% by weight.

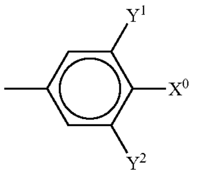

preferably denotes

-continued

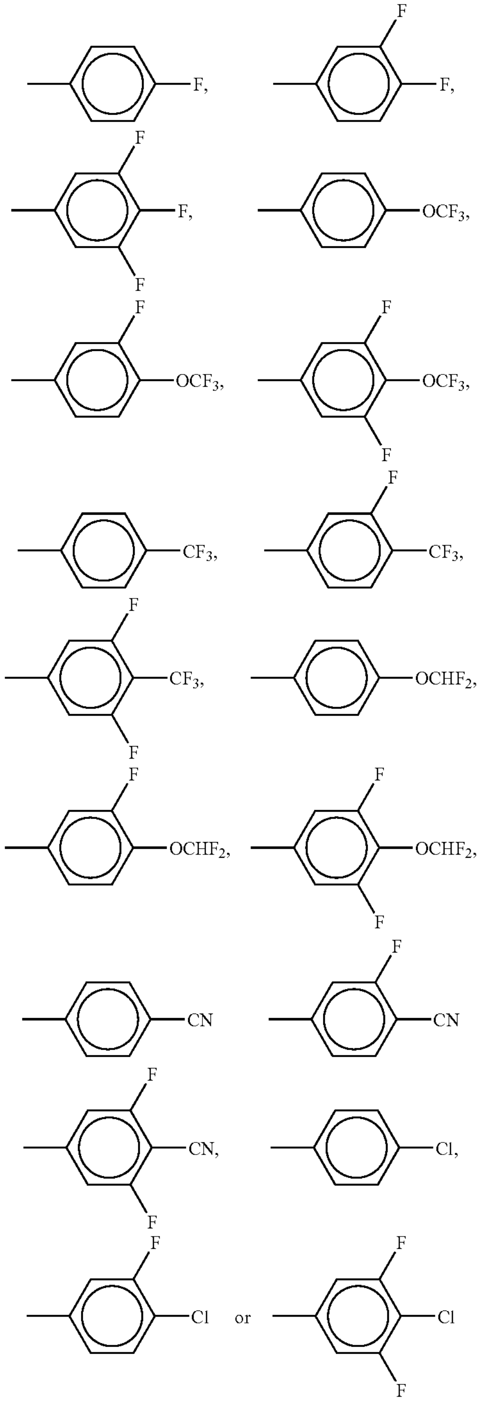

The medium comprises compounds of the formulae II, III, IV, V, VI, VII, VIII and/or IX.

$R^0$ is straight-chain alkyl or alkenyl having 2 to 7 C atoms.

The medium essentially consists of compounds of the formulae I to XV.

The medium comprises 5-40% by weight of compounds of the formulae H17 and/or H18.

The medium comprises further compounds, preferably selected from the following group consisting of the general formulae XVI to XX:

XVI

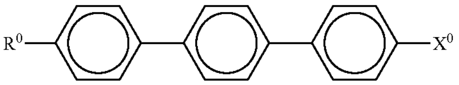

XVII

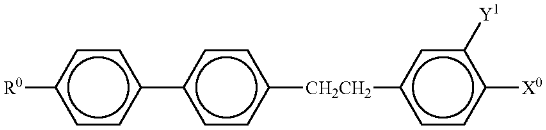

XVIII

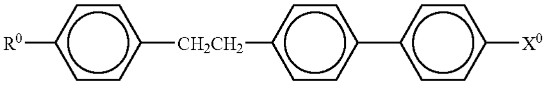

XIX

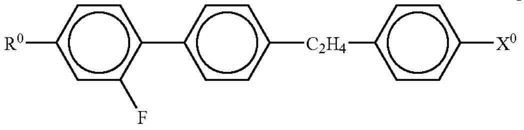

XX

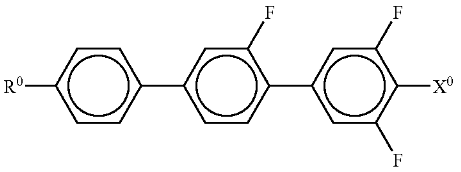

in which $R^0$ and $X^0$ have the meanings indicated above, and the 1,4-phenylene rings may be substituted by CN, chlorine or fluorine. The 1,4-phenylene rings are preferably mono- or polysubstituted by fluorine atoms.

The medium comprises further compounds, preferably selected from the following group consisting of the formulae RI to RIX

RI

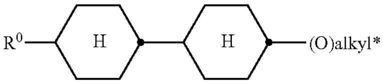

RII

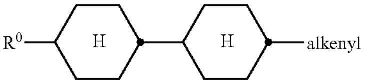

RIII

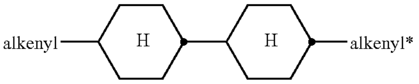

RIV

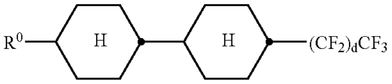

RV

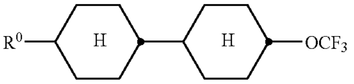

-continued

RVI

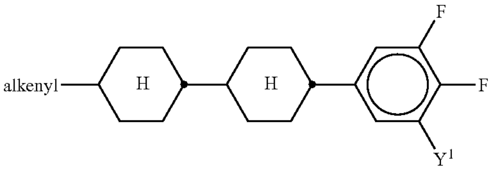

RVII

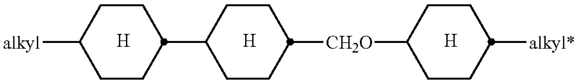

RVIII

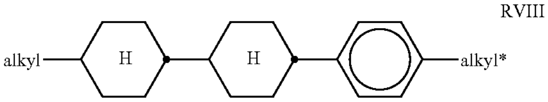

RIX

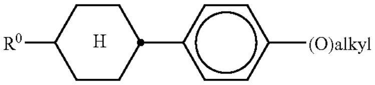

in which $R^0$ denotes n-alkyl, oxaalkyl, fluoroalkyl, alkenyloxy or alkenyl, each having up to 9 C atoms, d denotes 0, 1 or 2, $Y^1$ denotes H or F, alkyl or alkyl* each, independently of one another, denote a straight-chain or branched alkyl radical having 1-9 C atoms, alkenyl or alkenyl* each, independently of one another, denote a straight-chain or branched alkenyl radical having up to 9 C atoms.

The medium preferably comprises one or more compounds of the formulae

RIa

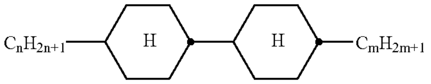

RIb

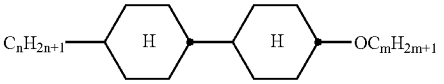

RIIa

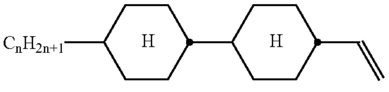

RIIb

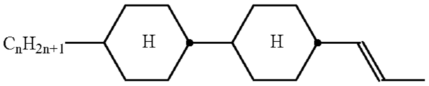

RIIIa

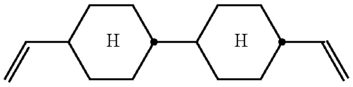

RIIIb

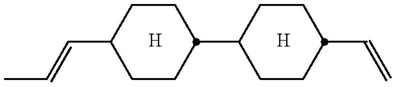

-continued

RIIIc

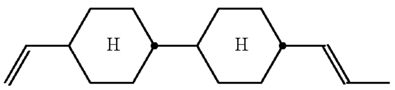

RIVa

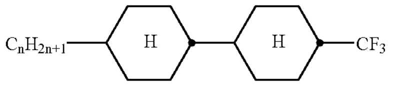

in which n and m each denote an integer from 1 to 9.

The I: (II+III+IV+V+VI+VII+VII+IX) weight ratio is preferably 1:10 to 10:1.

The medium essentially consists of compounds selected from the group consisting of the general formulae I to XV.

It has been found that even a relatively small proportion of compounds of the formula I mixed with conventional liquid-crystal materials, but in particular with one or more compounds of the formula II, III, IV, V, VI, VII, VIII or IX results in a considerable lowering of the threshold voltage and in low birefringence values, with broad nematic phases with low smectic-nematic transition temperatures being observed at the same time, improving the storage stability. The compounds of the formulae I to IX are colourless, stable and readily miscible with one another and with other liquid-crystal materials.

The term "alkyl" or "alkyl*" encompasses straight-chain and branched alkyl groups having 1-9 carbon atoms, in particular the straight-chain groups methyl, ethyl, propyl, butyl, pentyl, hexyl and heptyl. Groups having 2-5 carbon atoms are generally preferred.

The term "alkenyl" or "alkenyl*" encompasses straight-chain and branched alkenyl groups having up to 9 carbon atoms, in particular the straight-chain groups. Particularly preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E -hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably encompasses straight-chain radicals of the formula $C_nH_{2n+1}$—O—$(CH_2)_m$, in which n and m each, independently of one another, denote 1 to 6. Preferably, n=1 and m denotes 1 to 6.

Through a suitable choice of the meanings of $R^0$ and $X^0$, the addressing times, the threshold voltage, the steepness of the transmission characteristic lines, etc., can be modified in the desired manner. For example, 1E -alkenyl radicals, 3E-alkenyl radicals, 2E-alkenyloxy radicals and the like generally result in shorter addressing times, improved nematic tendencies and a higher ratio of the elastic constants $k_{33}$ (bend) and $k_{11}$ (splay) compared with alkyl or alkoxy radicals. 4-alkenyl radicals, 3-alkenyl radicals and the like generally give lower threshold voltages and smaller values of $k_{33}/k_{11}$ compared with alkyl and alkoxy radicals.

A —$CH_2CH_2$- group in $Z^1$ and/or $Z^2$ generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (greater multiplexability), and vice versa.

The optimum mixing ratio of the compounds of the formulae I and II+III+IV+V+VI+VII+VII+VIII+IX depends substantially on the desired properties, on the choice of the components of the formulae I, II, III, IV, V, VI, VII, VIII and/or IX, and on the choice of any other components that may be present. Suitable mixing ratios within the range given above can easily be determined from case to case.

The total amount of compounds of the formulae I to XV in the mixtures according to the invention is not crucial. The mixtures can therefore comprise one or more further components for the purposes of optimisation of various properties. However, the observed effect on the addressing times and the threshold voltage is generally greater, the higher the total concentration of compounds of the formulae I to XV.

In a particularly preferred embodiment, the media according to the invention comprise compounds of the formulae II to IX (preferably II and/or III) in which $X^0$ denotes $OCF_3$, $OCHF_2$, F, OCH═$CF_2$, OCF═$CF_2$, $OCF_2CHFCF_3$ or $OCF_2$—$CF_2H$. A favourable synergistic effect with the compounds of the formula I results in particularly advantageous properties.

The construction of the MLC display according to the invention from polarisers, electrode base plates and surface-treated electrodes corresponds to the conventional construction for displays of this type. The term conventional construction is broadly drawn here and also encompasses all derivatives and modifications of the MLC display, in particular including matrix display elements based on poly-Si TFT or MIM.

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example stabilisers and antioxidants. For example, 0-15% of pleochroic dyes or chiral dopants can be added.

C denotes a crystalline phase, S a smectic phase, $S_C$ a smectic C phase, $S_B$ a smectic B phase, N a nematic phase and I the isotropic phase.

$V_{10}$ denotes the voltage for 10% transmission (viewing angle perpendicular to the plate surface). $t_{on}$ denotes the switch-on time and $t_{off}$ the switch-off time at an operating voltage corresponding to 2 times the value of $V_{10}$. Δn denotes the optical anisotropy and $n_o$ the refractive index. Δε denotes the dielectric anisotropy ($\Delta\epsilon=\epsilon_{\parallel}-\epsilon_{\perp}$, where $\epsilon_{\parallel}$ denotes the dielectric constant parallel to the longitudinal molecular axes and $\epsilon_{\perp}$ the dielectric constant perpendicular thereto). The electro-optical data were measured in a TN cell at the 1st minimum (i.e. at a d·Δn value of 0.5 μm) at 20° C., unless expressly stated otherwise. The optical data were measured at 20° C., unless expressly stated otherwise.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m C atoms respectively; n and m are each, independently of one another, 1, 2, 3, 4, 5, 6, 7, 8, 9, 10, 11, 12, 13, 14 or 15. The coding in Table B is self-evident. In Table A, only the acronym for the parent structure is indicated. In individual cases, the acronym for the parent structure is followed, separated by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| $nCF_3$ | $C_nH_{2n+1}$ | $CF_3$ | H | H |
| $nOCF_3$ | $C_nH_{2n+1}$ | $OCF_3$ | H | H |
| $nOCF_3$.F | $C_nH_{2n+1}$ | $OCF_3$ | H | F |
| $nOCF_2$ | $C_nH_{2n+1}$ | $OCHF_2$ | H | H |
| nS | $C_nH_{2n+1}$ | NCS | H | H |
| rVsN | $C_rH_{2r+1}$—CH═CH—$C_sH_{2s}$— | CN | H | H |
| rEsN | $C_rH_{2r+1}$—O—$C_2H_{2s}$— | CN | H | H |
| nAm | $C_nH_{2n+1}$ | $COOC_mH_{2m+1}$ | H | H |
| $nOCCF_2$.F.F | $C_nH_{2n+1}$ | $OCH_2CF_2H$ | F | F |

Preferred mixture components are given in Tables A and B.

TABLE A

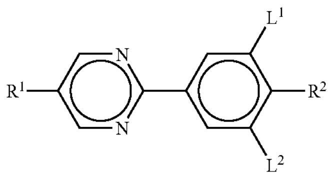

PYP

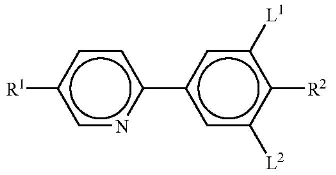

PYRP

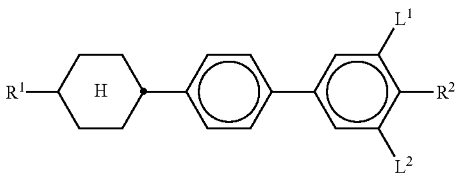

BCH

TABLE A-continued

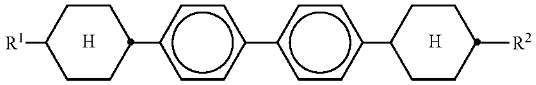

CBC

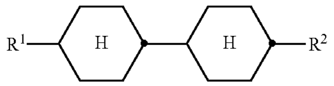

CCH

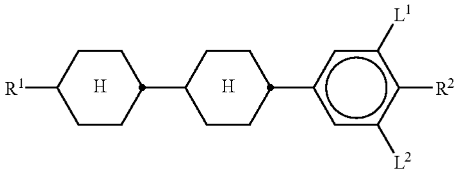

CCP

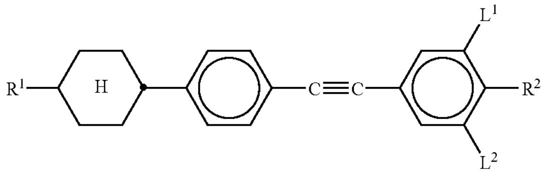

CPTP

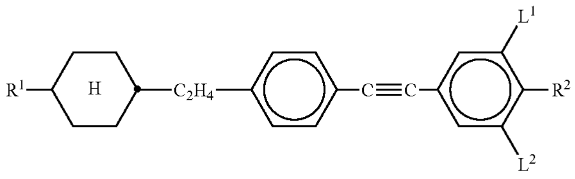

CEPTP

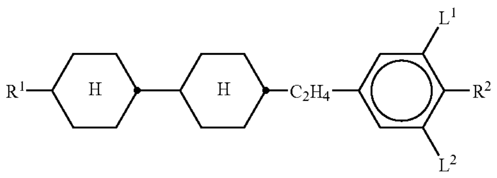

ECCP

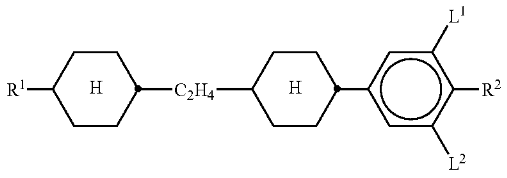

CECP

TABLE A-continued
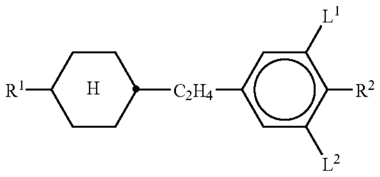
EPCH
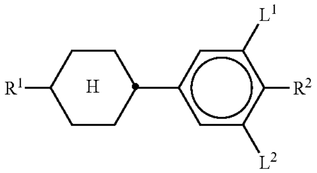
PCH
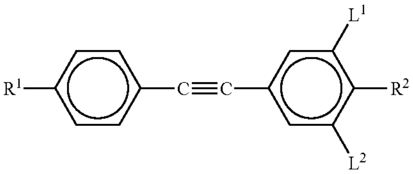
PTP
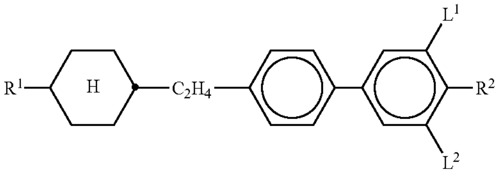
BECH
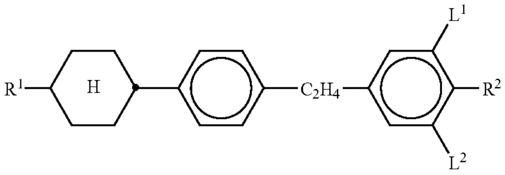
EBCH
CPC
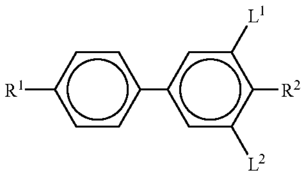
B
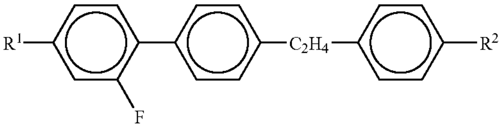
FET-nF
TABLE A-continued
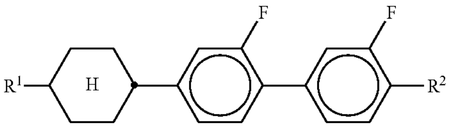
CGG
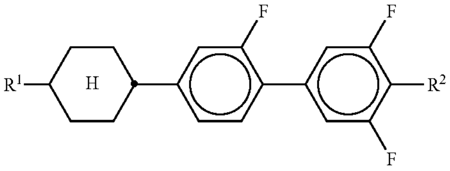
CGU
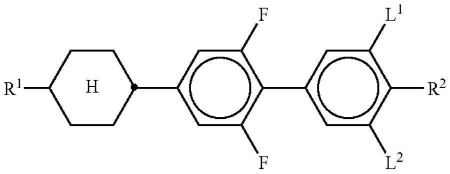
CUP
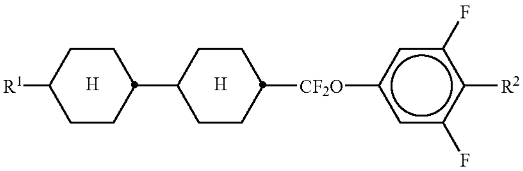
CCQU
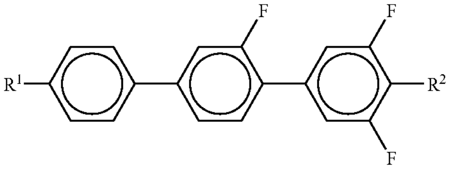
PGU
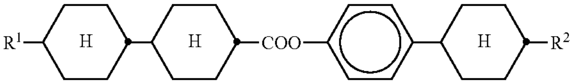
CCPC
TABLE B
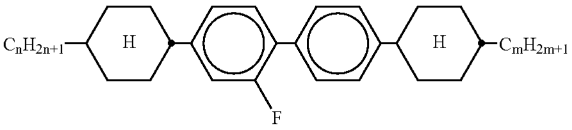
CBC-nmF
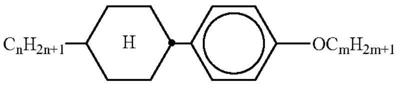
PCH-nOm
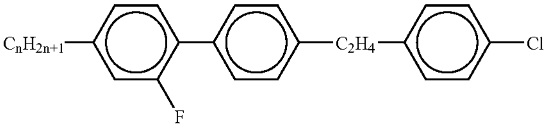
FET-nCl TABLE B-continued
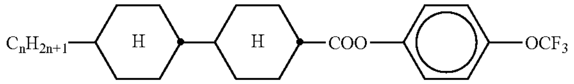
CP-nOCF$_3$
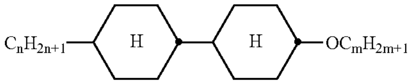
CCH-nOm
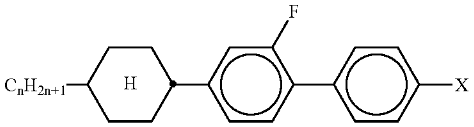
BCH-n.Fm
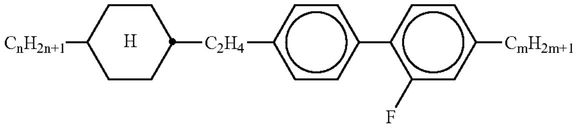
Inm
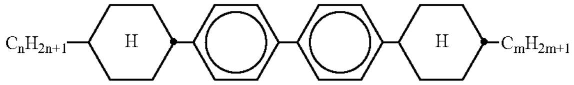
CBC-nm
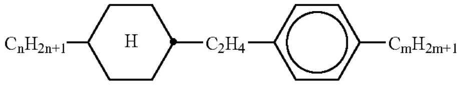
ECCP-nm
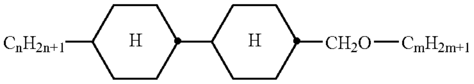
CCH-n1EM
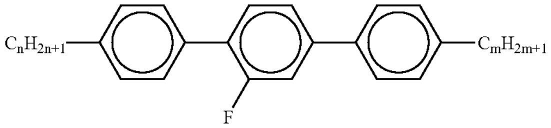
T-nFm
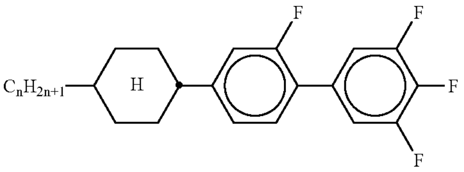
CGU-n-F
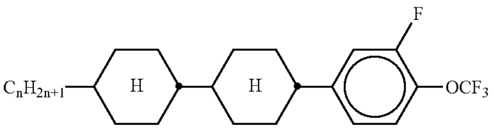
CCP-nOCF$_3$.F
TABLE B-continued
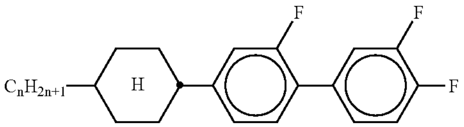
CGG-n-F
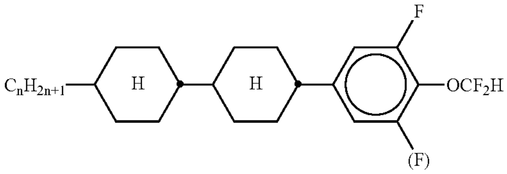
CCP-nOCF$_2$.F(.F)
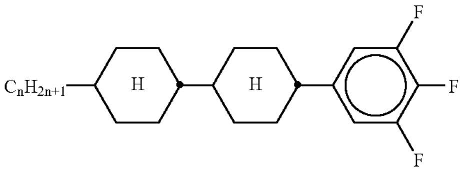
CCP-nF.F.F
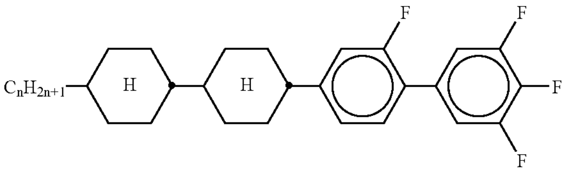
CCGU-n-F
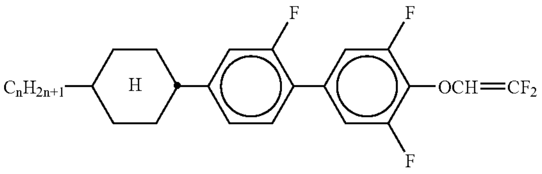
CGU-n-OXF
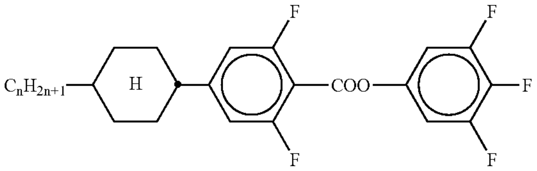
CUZU-n-F
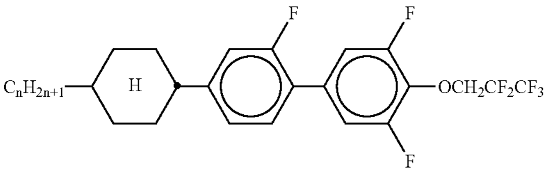
CGU-n-O1DT
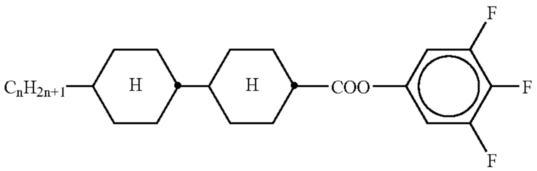
CCZU-n-F TABLE B-continued
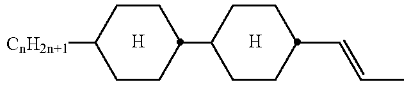
CC-n-V1
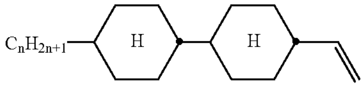
CC-n-V
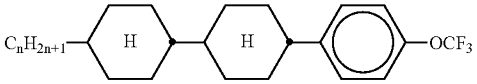
CCP-nOCF$_3$
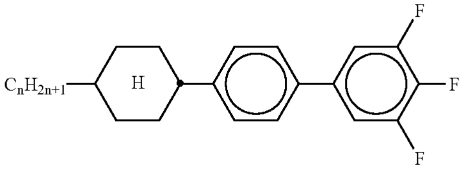
BCH-nF.F.F
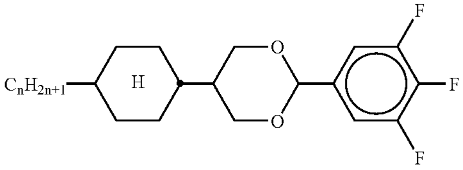
CDU-n-F
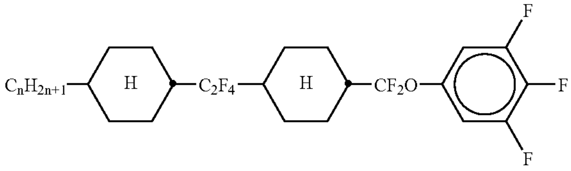
CWCQU-n-F
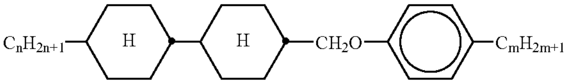
CCOC-n-m
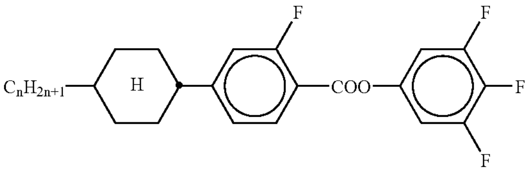
CGZU-n-F
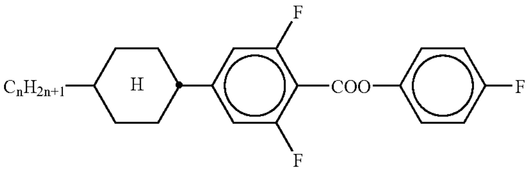
CUZP-n-F
TABLE B-continued
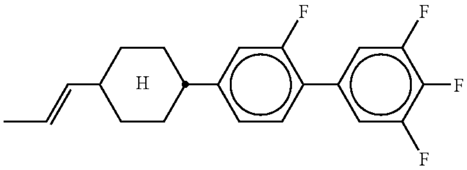
CGU-1V-F
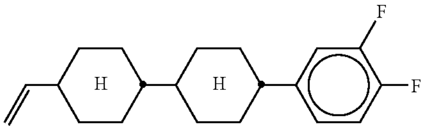
CCG-V-F
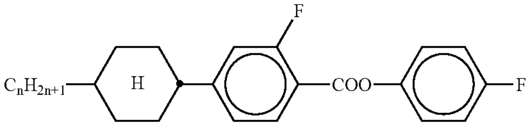
CGZP-n-F
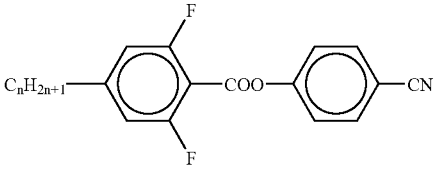
UZP-n-N
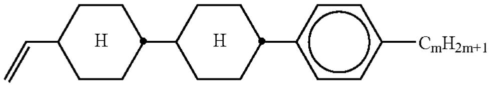
CCP-V-m
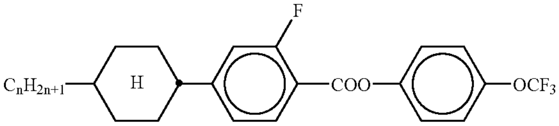
CGZP-n-OT
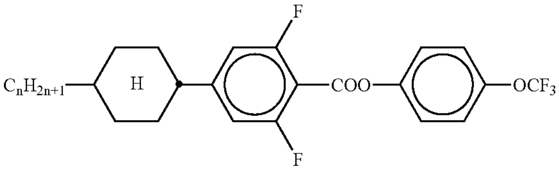
CUZP-n-OT
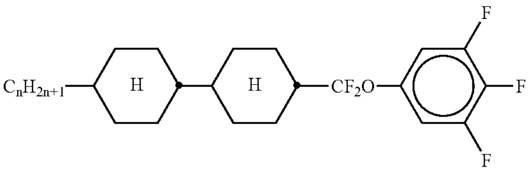
CCQU-n-F
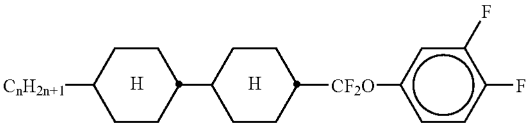
CCQG-n-F TABLE B-continued
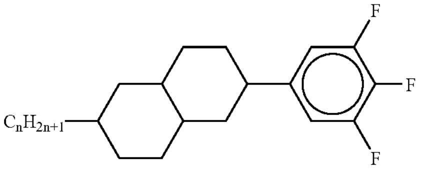
Dec-U-n-F
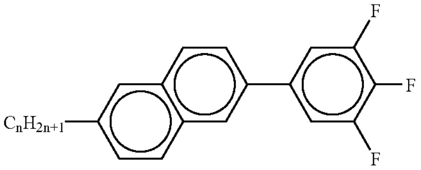
Nap-U-n-F
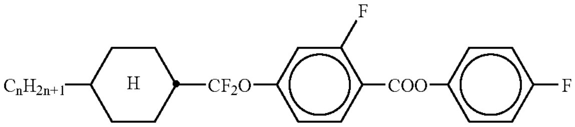
CQGZP-n-F
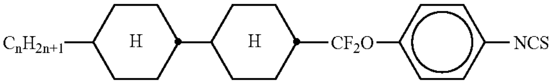
CCQP-n-S
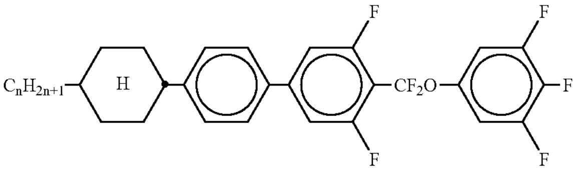
CPUQU-n-F
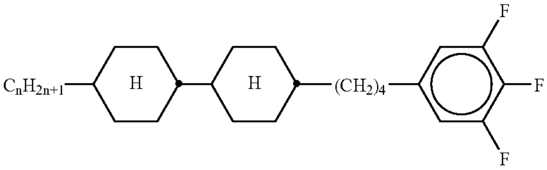
CCEEU-n-F
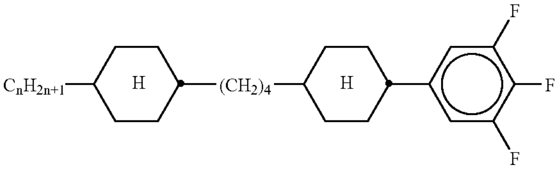
CEECU-n-F
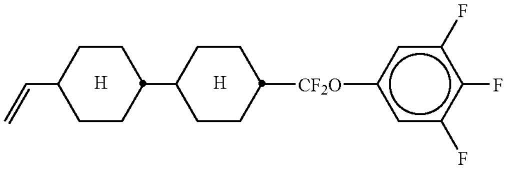
CCQU-V-F
TABLE B-continued
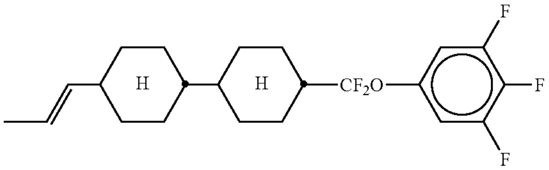
CCQU-1V-F
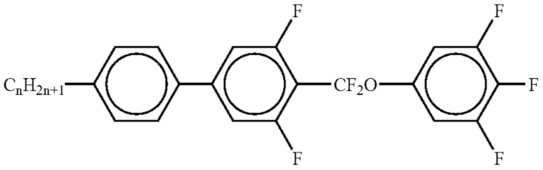
PUQU-n-F
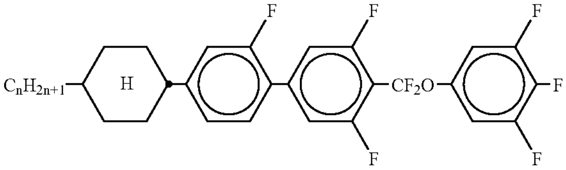
CGUQU-n-F
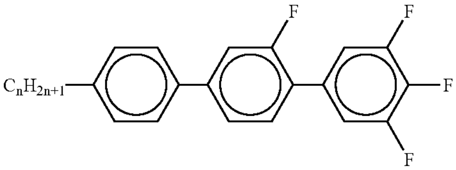
PGU-n-F
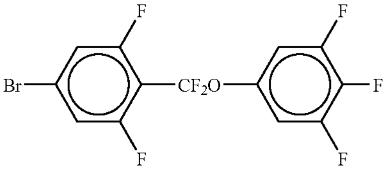
PQU-Br-F
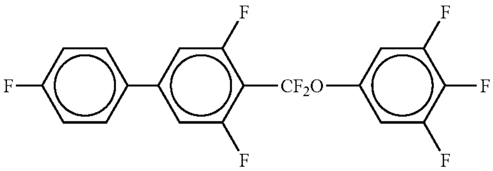
PUQU-F-F
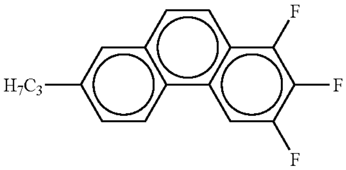
IS-9003

TABLE B-continued
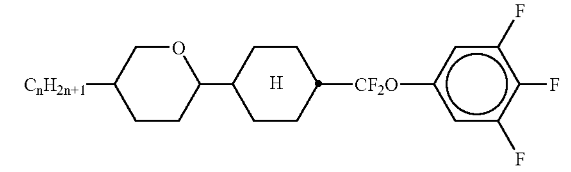
ACQU-n-F
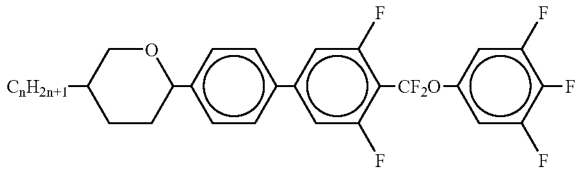
APUQU-n-F
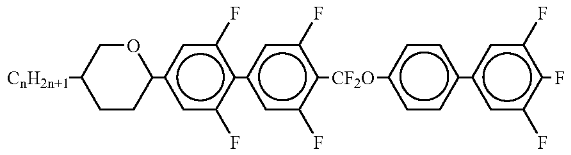
AUUQPU-n-F
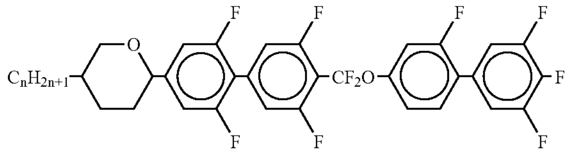
AUUQGU-n-F
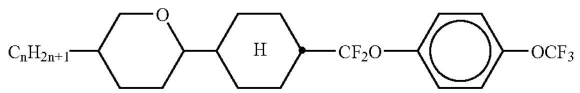
ACQP-n-OT
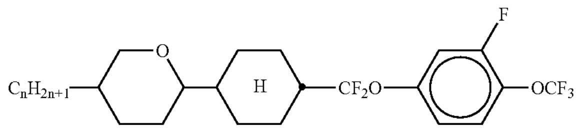
ACQG-n-OT
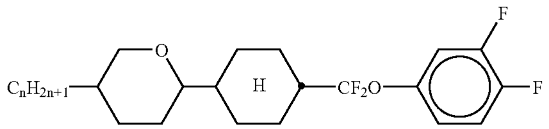
ACQG-n-F
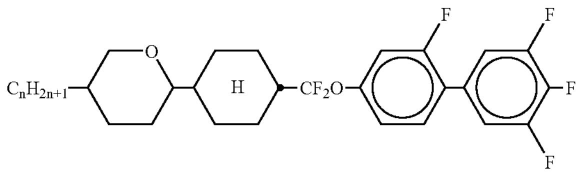
ACQGU-n-F
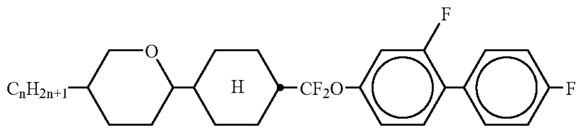
ACQGP-n-F
TABLE B-continued
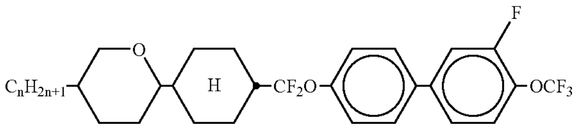
ACQPG-n-OT
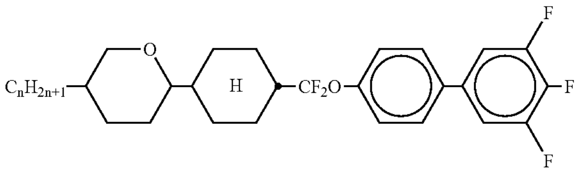
ACQPU-n-F
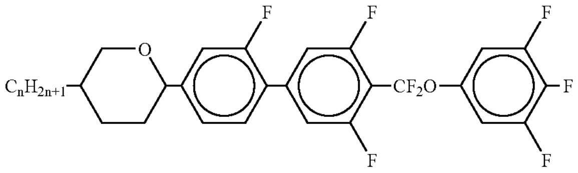
AGUQU-n-F
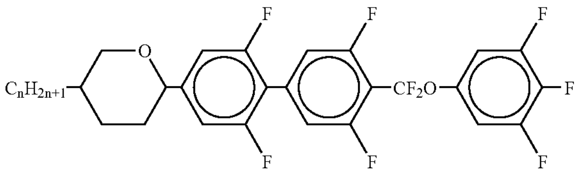
AUUQU-n-F
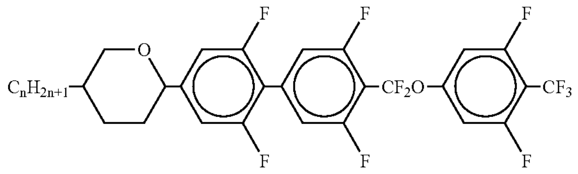
AUUQU-n-T
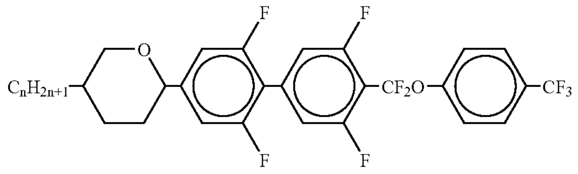
AUUQP-n-T
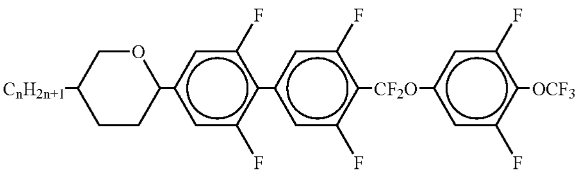
AUUQU-n-OT
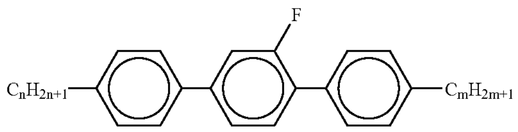
PGP-n-m Table C shows possible dopants which are generally added to the mixtures according to the invention in amounts of 0.1 to 10% by weight.
TABLE C
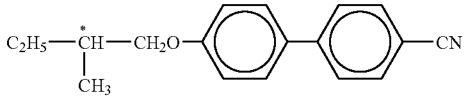
C 15
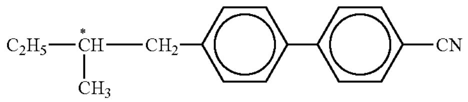
CB 15
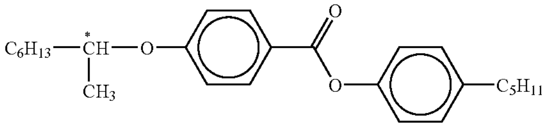
CM 21
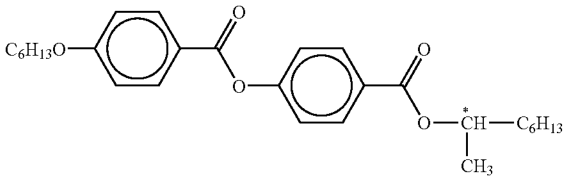
R/S-811
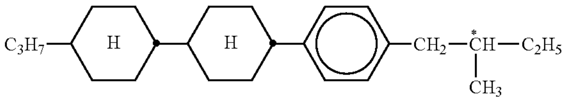
CM 44
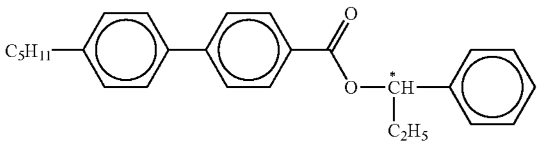
CM 45
TABLE C-continued
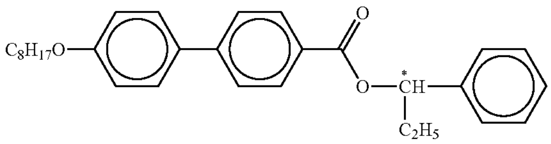
CM 47
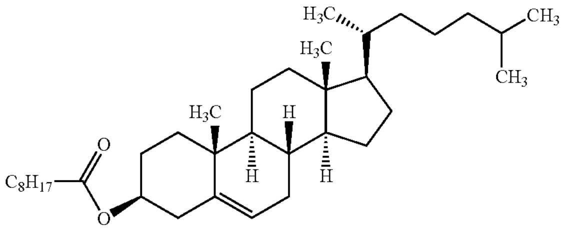
CN
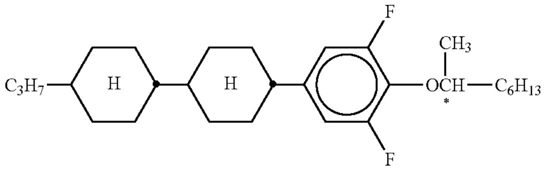
R/S-2011
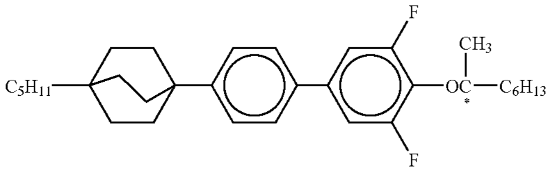
R/S-4011
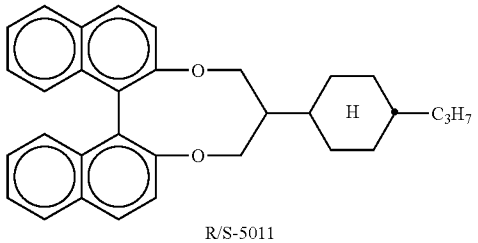
R/S-5011
Stabilisers which can be added, for example, to the mixtures according to the invention are mentioned below.
TABLE D
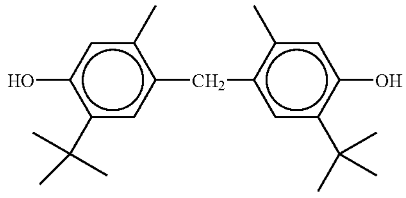

TABLE D-continued
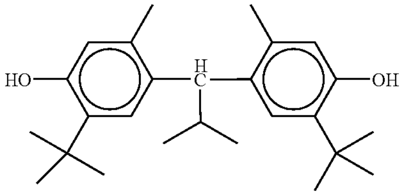
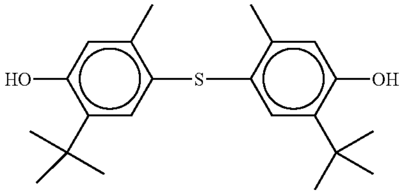
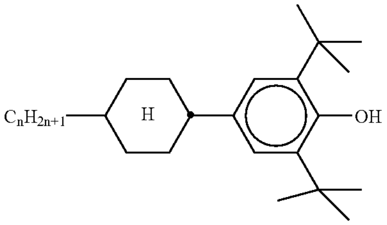
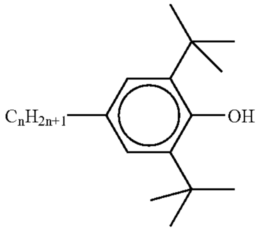
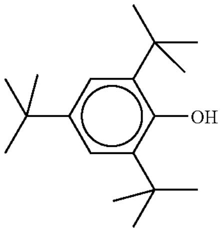
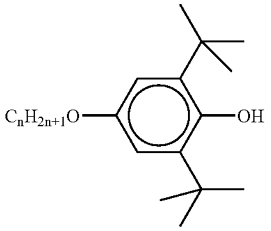
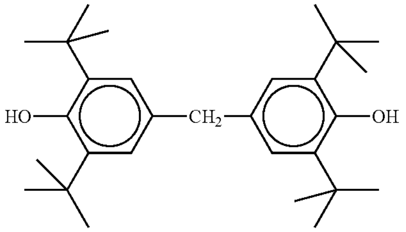

TABLE D-continued
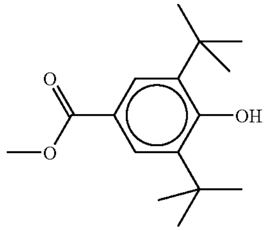
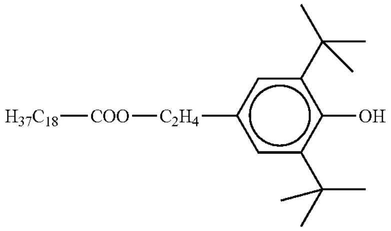
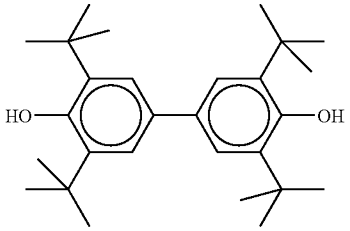
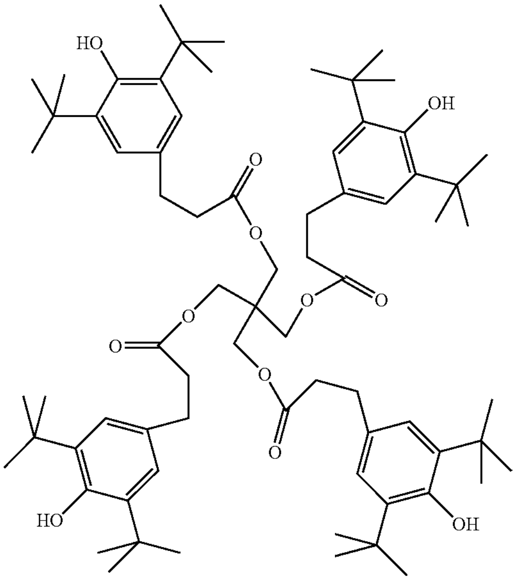
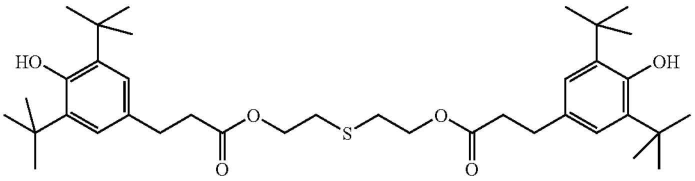

TABLE D-continued
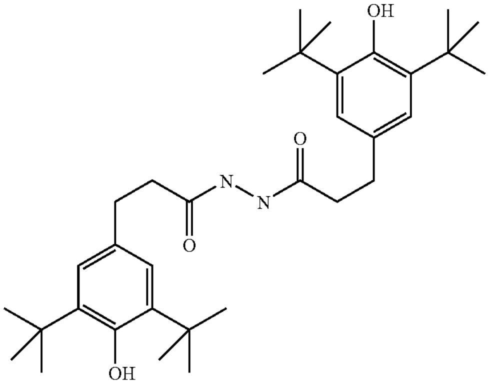
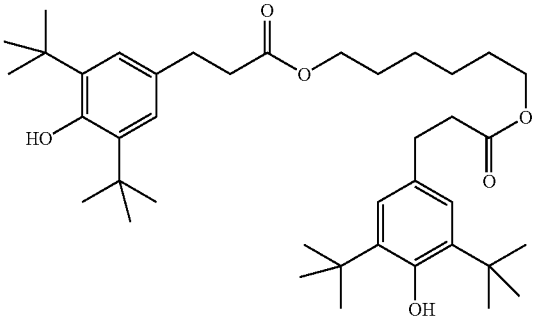
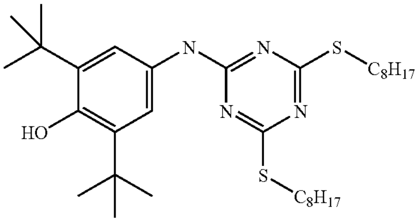
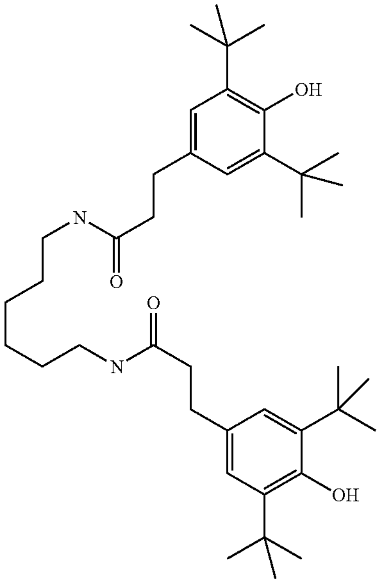

TABLE D-continued
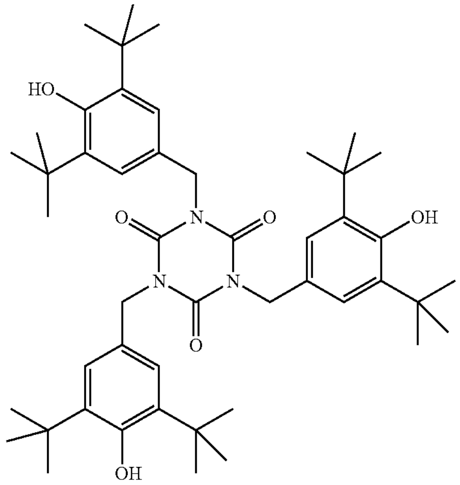
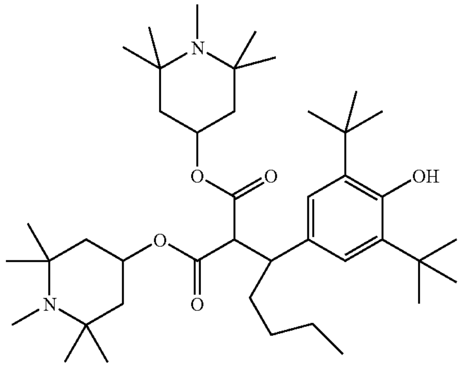
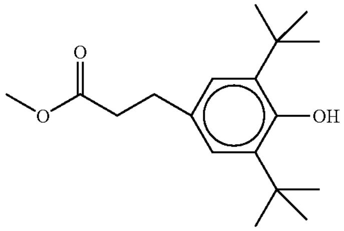
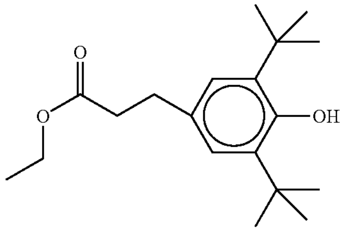
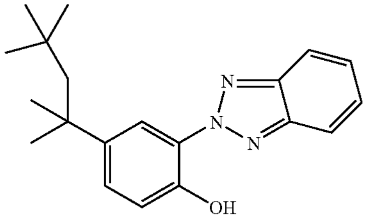

TABLE D-continued
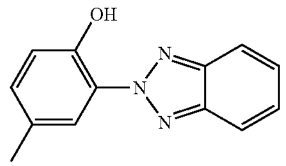
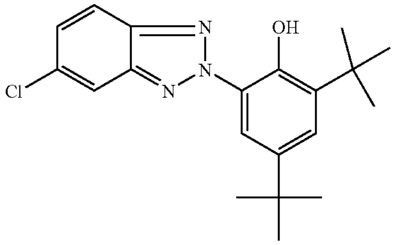
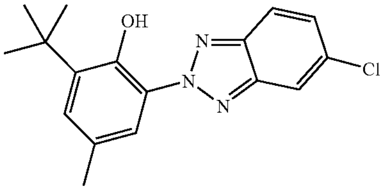
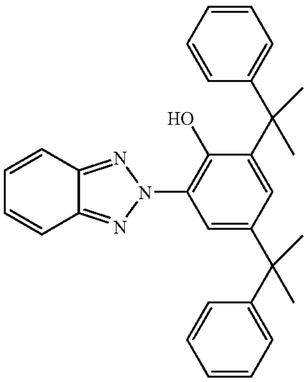
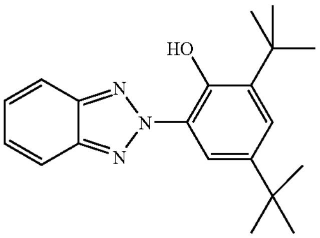
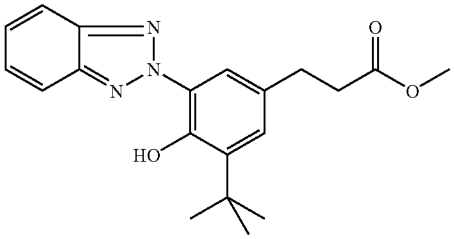

TABLE D-continued
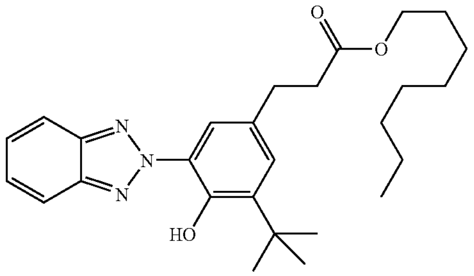
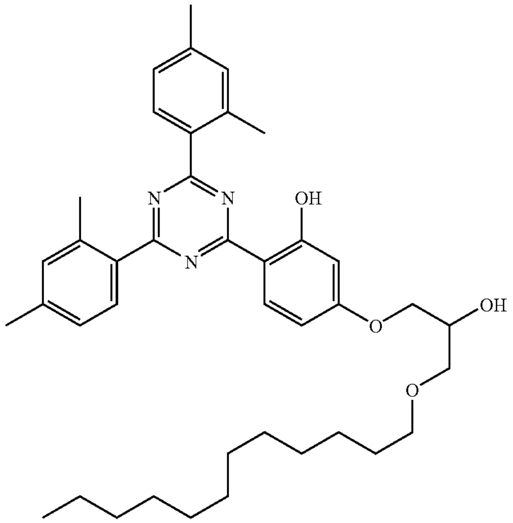
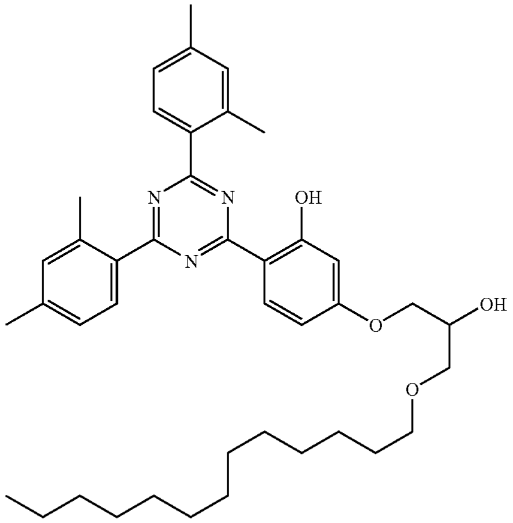

TABLE D-continued

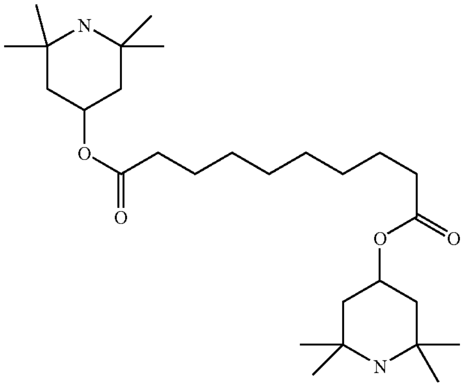

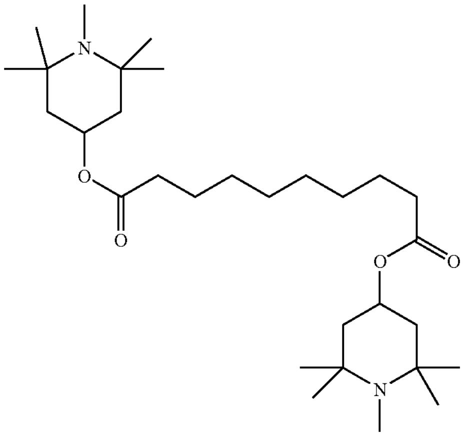

The following examples are intended to explain the invention without restricting it. Above and below, percentages are per cent by weight. All temperatures are given in degrees Celsius. m.p. denotes melting point, cl.p. clearing point. Furthermore, C=crystalline state, N=nematic phase, S=smectic phase and I=isotropic phase. The data between these symbols represent the transition temperatures. Δn denotes optical anisotropy (589 nm, 20° C.), Δε the dielectric anisotropy (1 kHz, 20° C.). The flow viscosity $\nu_{20}$ ($mm^2$/sec) was determined at 20° C. The rotational viscosity $\gamma_1$ (mPa·s) was likewise determined at 20° C.

"Conventional work-up" means that water is added if necessary, the mixture is extracted with dichloromethane, diethyl ether, methyl tert-butyl ether or toluene, the phases are separated, the organic phase is dried and evaporated, and the product is purified by distillation under reduced pressure or crystallisation and/or chromatography. The following abbreviations are used:

n-BuLi 1.6 molar solution of n-butyllithium in n-hexane

DMAP 4-(dimethylamino)pyridine

THF tetrahydrofuran

DCC N,N'-dicyclohexylcarbodiimide

LDA lithium dimethylamide

RT room temperature

EXAMPLE 1

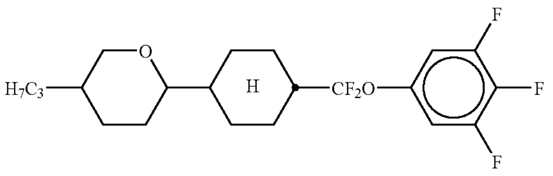

Step 1.1

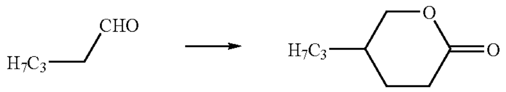

A B

B is prepared analogously to Lit. a) R. Baker, A. L. Boyes, C. J. Swain, *J. Chem. Soc. Perkin Trans.* 1, 1990, 1415-1421; b) H. Hagiwara, T. Okabe, H. Ono, V. P. Kamat, T. Hoshi, T. Suzuku, M. Ando, *J. Chem. Soc. Perkin Trans.* 1, 2002, 895-900.

Step 1.2

C

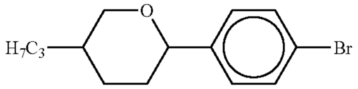

207 mmol of BuLi (15% in hexane) are added dropwise at −50° C. to a solution of 207 mmol of 1,4-dibromobenzene in 250 ml of diethyl ether. A solution of 170 mmol of B in 50 ml of diethyl ether is then added dropwise at the same temperature, and the mixture is stirred for a further 30 minutes, allowed to come to 0° C. and subjected to conventional aqueous work-up. The crude product (51 g) is dissolved in 400 ml of $CH_2Cl_2$, and 400 mmol of triethylsilane are added at −75° C. 400 mmol of boron trifluoride etherate are added dropwise, during which the temperature must not rise above −70° C. The mixture is then allowed to come to −10° C., is hydrolysed using sat. $NaHCO_3$ solution and subjected to conventional aqueous work-up. The crude product comprises the trans/cis isomers in a ratio of 9:1. The product is recrystallised from pentane at −20° C.

Step 1.3

D

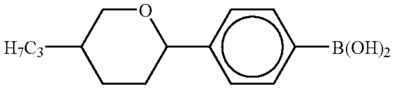

73 mmol of C are dissolved in 200 ml of THF and cooled to −70° C. Firstly 73 mmol of BuLi (15% in hexane) followed by 73 mmol of trimethyl borate in 50 ml of THF are added dropwise. The mixture is allowed to come to −20° C., adjusted to pH=2 by addition of 2N HCl and subjected to aqueous work-up. The crude product is digested with hot heptane and crystallised at 0° C.

Step 1.4

E

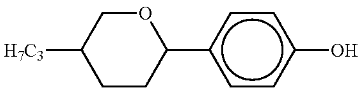

A mixture of 60 mmol of D, 300 ml of toluene, 120 mmol of NaOH, 50 ml of water and 30 ml of 30% $H_2O_2$ is stirred at 45° C. for 2 hours. The mixture is adjusted to pH=2 using 10% HCl and subjected to aqueous work-up. The crude product is recrystallised from heptane.

Step 1.5

F

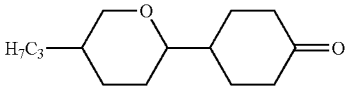

22 mmol of E are hydrogenated at 5 bar and 130° C. for 27.5 hours in 100 ml of xylene in the presence of 1.5 g of water-moist 5% Pd/C catalyst. Conventional work-up gives a colourless oil.

Step 1.6

G

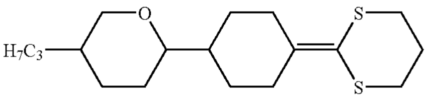

17 mmol of BuLi (15% in hexane) are added at −70° C. to a solution of 17 mmol of 2-trimethylsilyl-1,3-dithiane in 75 ml of THF. The mixture is allowed to come to 0° C. over the course of 4 hours, then re-cooled to −70° C., 17 mmol of F in 25 ml of THF are added dropwise, and the mixture is allowed to come to room temperature, stirred for a further 18 hours and subjected to conventional aqueous work-up. The crude product is crystallised from heptane, giving colourless crystals.

Step 1.7

H

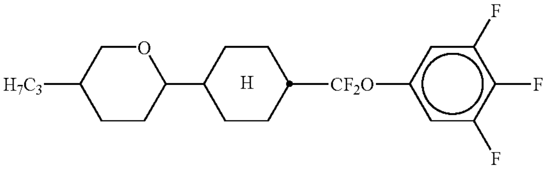

6.27 mmol of trifluoromethanesulfonic acid are added dropwise at −20° C. to a solution of 6.12 mmol of G in 50 ml of $CH_2Cl_2$. The mixture is allowed to come to room temperature for 30 minutes and then cooled to −70° C. Firstly a solution of 9.1 mmol of 3,4,5-trifluorophenol and 10.1 mmol of triethylamine in 20 l of $CH_2Cl_2$ and 5 minutes later 31 mmol of triethylamine tris(hydrofluoride) are then added. After a further 5 minutes, a suspension of 31.5 mmol of DBH (1,3-dibromo-5,5-dimethylhydanthoin) is added in small portions, and the mixture is stirred at −70° C. for a further 1 hour. The reaction mixture is allowed to come to −10° C. and is poured into 400 ml of ice-cold NaOH. The mixture is subjected to conventional aqueous work-up, and the crude product is purified by chromatography on silica gel (heptane/toluene 3:2) and crystallisation from pentane at −70° C., giving colourless crystals: C 35 N 66.3 I; Δn=0.0570; Δε=13.4

The following compounds of the formula

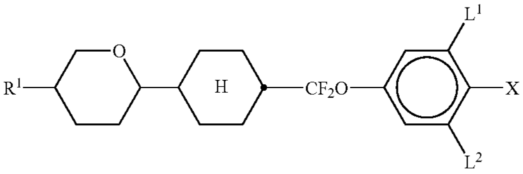

are prepared analogously:

| $R^1$ | X | $L^1$ | $L^2$ |
|---|---|---|---|
| H | F | H | H |
| $CH_3$ | F | H | H |
| $C_2H_5$ | F | H | H |
| n-$C_4H_9$ | F | H | H |
| n-$C_5H_{11}$ | F | H | H |
| n-$C_6H_{13}$ | F | H | H |
| H | F | F | H |
| $CH_3$ | F | F | H |
| $C_2H_5$ | F | F | H |

-continued

| $R^1$ | X | $L^1$ | $L^2$ | |
|---|---|---|---|---|
| n-$C_3H_7$ | F | F | H | C 41 $S_B$ 51 N 95.9 I; $\Delta\epsilon$ = 9.7; $\Delta n$ = 0.0688 |
| n-$C_4H_9$ | F | F | H | C 31 $S_B$ 64 N 97.1 I; $\Delta\epsilon$ = 9.3; $\Delta n$ = 0.0621 |
| n-$C_5H_{11}$ | F | F | H | |
| n-$C_6H_{13}$ | F | F | H | |
| H | F | F | F | |
| $CH_3$ | F | F | F | C 54 I; $\Delta\epsilon$ = 14.8; $\Delta n$ = 0.0490 |
| $C_2H_5$ | F | F | F | C 48 N (34.7) I; $\Delta\epsilon$ = 14.1; $\Delta n$ = 0.0540 |
| n-$C_3H_7$ | F | F | F | |
| n-$C_4H_9$ | F | F | F | C 43 N 66.1 I; $\Delta\epsilon$ = 13.3; $\Delta n$ = 0.0590 |
| n-$C_5H_{11}$ | F | F | F | C 39 N 75.3 I; $\Delta\epsilon$ = 11.8; $\Delta n$ = 0.0568 |
| n-$C_6H_{13}$ | F | F | F | |
| H | Cl | H | H | |
| $CH_3$ | Cl | H | H | |
| $C_2H_5$ | Cl | H | H | |
| n-$C_3H_7$ | Cl | H | H | |
| n-$C_4H_9$ | Cl | H | H | |
| n-$C_5H_{11}$ | Cl | H | H | |
| n-$C_6H_{13}$ | Cl | H | H | |
| H | Cl | F | H | |
| $CH_3$ | Cl | F | H | |
| $C_2H_5$ | Cl | F | H | |
| n-$C_3H_7$ | Cl | F | H | |
| n-$C_4H_9$ | Cl | F | H | |
| n-$C_5H_{11}$ | Cl | F | H | |
| n-$C_6H_{13}$ | Cl | F | H | |
| H | Cl | F | F | |
| $CH_3$ | Cl | F | F | |
| $C_2H_5$ | Cl | F | F | |
| n-$C_3H_7$ | Cl | F | F | |
| n-$C_4H_9$ | Cl | F | F | |
| n-$C_5H_{11}$ | Cl | F | F | |
| n-$C_6H_{13}$ | Cl | F | F | |
| H | $OCF_3$ | H | H | |
| $CH_3$ | $OCF_3$ | H | H | |
| $C_2H_5$ | $OCF_3$ | H | H | |
| n-$C_3H_7$ | $OCF_3$ | H | H | C −41 $S_B$ 123 N 129.3 I; $\Delta\epsilon$ = 9.1; $\Delta n$ = 0.0780 |
| n-$C_4H_9$ | $OCF_3$ | H | H | C? −54 $S_B$ 129 I; $\Delta\epsilon$ = 9.1; $\Delta n$ = 0.0689 |
| n-$C_5H_{11}$ | $OCF_3$ | H | H | |
| n-$C_6H_{13}$ | $OCF_3$ | H | H | |
| H | $OCF_3$ | F | H | |
| $CH_3$ | $OCF_3$ | F | H | |
| $C_2H_5$ | $OCF_3$ | F | H | |
| n-$C_3H_7$ | $OCF_3$ | F | H | $S_B$ 74 N 105.8 I; $\Delta\epsilon$ = 11.7; $\Delta n$ = 0.0701 |
| n-$C_4H_9$ | $OCF_3$ | F | H | $S_B$ 81 N 105.8 I; $\Delta\epsilon$ = 11.5; $\Delta n$ = 0.0623 |
| n-$C_5H_{11}$ | $OCF_3$ | F | H | |
| n-$C_6H_{13}$ | $OCF_3$ | F | H | |
| H | $OCF_3$ | F | F | |
| $CH_3$ | $OCF_3$ | F | F | |
| $C_2H_5$ | $OCF_3$ | F | F | |
| n-$C_3H_7$ | $OCF_3$ | F | F | |
| n-$C_4H_9$ | $OCF_3$ | F | F | |
| n-$C_5H_{11}$ | $OCF_3$ | F | F | |
| n-$C_6H_{13}$ | $OCF_3$ | F | F | |
| H | $OCHF_2$ | H | H | |
| $CH_3$ | $OCHF_2$ | H | H | |
| $C_2H_5$ | $OCHF_2$ | H | H | |
| n-$C_3H_7$ | $OCHF_2$ | H | H | |
| n-$C_4H_9$ | $OCHF_2$ | H | H | |
| n-$C_5H_{11}$ | $OCHF_2$ | H | H | |
| n-$C_6H_{13}$ | $OCHF_2$ | H | H | |
| H | $OCHF_2$ | F | H | |
| $CH_3$ | $OCHF_2$ | F | H | |
| $C_2H_5$ | $OCHF_2$ | F | H | |
| n-$C_3H_7$ | $OCHF_2$ | F | H | |
| n-$C_4H_9$ | $OCHF_2$ | F | H | |
| n-$C_5H_{11}$ | $OCHF_2$ | F | H | |
| n-$C_6H_{13}$ | $OCHF_2$ | F | H | |

-continued

| $R^1$ | X | $L^1$ | $L^2$ |
|---|---|---|---|
| H | $OCHF_2$ | F | F |
| $CH_3$ | $OCHF_2$ | F | F |
| $C_2H_5$ | $OCHF_2$ | F | F |
| n-$C_3H_7$ | $OCHF_2$ | F | F |
| n-$C_4H_9$ | $OCHF_2$ | F | F |
| n-$C_5H_{11}$ | $OCHF_2$ | F | F |
| n-$C_6H_{13}$ | $OCHF_2$ | F | F |
| H | $OCHFCF_3$ | H | H |
| $CH_3$ | $OCHFCF_3$ | H | H |
| $C_2H_5$ | $OCHFCF_3$ | H | H |
| n-$C_3H_7$ | $OCHFCF_3$ | H | H |
| n-$C_4H_9$ | $OCHFCF_3$ | H | H |
| n-$C_5H_{11}$ | $OCHFCF_3$ | H | H |
| n-$C_6H_{13}$ | $OCHFCF_3$ | H | H |
| H | $OCHFCF_3$ | F | H |
| $CH_3$ | $OCHFCF_3$ | F | H |
| $C_2H_5$ | $OCHFCF_3$ | F | H |
| n-$C_3H_7$ | $OCHFCF_3$ | F | H |
| n-$C_4H_9$ | $OCHFCF_3$ | F | H |
| n-$C_5H_{11}$ | $OCHFCF_3$ | F | H |
| n-$C_6H_{13}$ | $OCHFCF_3$ | F | H |
| H | $OCHFCF_3$ | F | F |
| $CH_3$ | $OCHFCF_3$ | F | F |
| $C_2H_5$ | $OCHFCF_3$ | F | F |
| n-$C_3H_7$ | $OCHFCF_3$ | F | F |
| n-$C_4H_9$ | $OCHFCF_3$ | F | F |
| n-$C_5H_{11}$ | $OCHFCF_3$ | F | F |
| n-$C_6H_{13}$ | $OCHFCF_3$ | F | F |
| H | $OCHFCF_3$ | H | H |
| $CH_3$ | $OCHFCF_3$ | H | H |
| $C_2H_5$ | $OCHFCF_3$ | H | H |
| n-$C_3H_7$ | $OCHFCF_3$ | H | H |
| n-$C_4H_9$ | $OCHFCF_3$ | H | H |
| n-$C_5H_{11}$ | $OCHFCF_3$ | H | H |
| n-$C_6H_{13}$ | $OCHFCF_3$ | H | H |
| H | $OCHFCF_3$ | F | H |
| $CH_3$ | $OCHFCF_3$ | F | H |
| $C_2H_5$ | $OCHFCF_3$ | F | H |
| n-$C_3H_7$ | $OCHFCF_3$ | F | H |
| n-$C_4H_9$ | $OCHFCF_3$ | F | H |
| n-$C_5H_{11}$ | $OCHFCF_3$ | F | H |
| n-$C_6H_{13}$ | $OCHFCF_3$ | F | H |
| H | $OCHFCF_3$ | F | F |
| $CH_3$ | $OCHFCF_3$ | F | F |
| $C_2H_5$ | $OCHFCF_3$ | F | F |
| n-$C_3H_7$ | $OCHFCF_3$ | F | F |
| n-$C_4H_9$ | $OCHFCF_3$ | F | F |
| n-$C_5H_{11}$ | $OCHFCF_3$ | F | F |
| n-$C_6H_{13}$ | $OCHFCF_3$ | F | F |
| H | $OCF_2CHFCF_3$ | H | H |
| $CH_3$ | $OCF_2CHFCF_3$ | H | H |
| $C_2H_5$ | $OCF_2CHFCF_3$ | H | H |
| n-$C_3H_7$ | $OCF_2CHFCF_3$ | H | H |
| n-$C_4H_9$ | $OCF_2CHFCF_3$ | H | H |
| n-$C_5H_{11}$ | $OCF_2CHFCF_3$ | H | H |
| n-$C_6H_{13}$ | $OCF_2CHFCF_3$ | H | H |
| H | $OCF_2CHFCF_3$ | F | H |
| $CH_3$ | $OCF_2CHFCF_3$ | F | H |
| $C_2H_5$ | $OCF_2CHFCF_3$ | F | H |
| n-$C_3H_7$ | $OCF_2CHFCF_3$ | F | H |
| n-$C_4H_9$ | $OCF_2CHFCF_3$ | F | H |
| n-$C_5H_{11}$ | $OCF_2CHFCF_3$ | F | H |
| n-$C_6H_{13}$ | $OCF_2CHFCF_3$ | F | H |
| H | $OCF_2CHFCF_3$ | F | F |
| $CH_3$ | $OCF_2CHFCF_3$ | F | F |
| $C_2H_5$ | $OCF_2CHFCF_3$ | F | F |
| n-$C_3H_7$ | $OCF_2CHFCF_3$ | F | F |
| n-$C_4H_9$ | $OCF_2CHFCF_3$ | F | F |
| n-$C_5H_{11}$ | $OCF_2CHFCF_3$ | F | F |
| n-$C_6H_{13}$ | $OCF_2CHFCF_3$ | F | F |
| H | NCS | H | H |
| $CH_3$ | NCS | H | H |
| $C_2H_5$ | NCS | H | H |
| n-$C_3H_7$ | NCS | H | H |
| n-$C_4H_9$ | NCS | H | H |
| n-$C_5H_{11}$ | NCS | H | H |
| n-$C_6H_{13}$ | NCS | H | H |

-continued

| $R^1$ | X | $L^1$ | $L^2$ |
|---|---|---|---|
| H | NCS | F | H |
| $CH_3$ | NCS | F | H |
| $C_2H_5$ | NCS | F | H |
| n-$C_3H_7$ | NCS | F | H |
| n-$C_4H_9$ | NCS | F | H |
| n-$C_5H_{11}$ | NCS | F | H |
| n-$C_6H_{13}$ | NCS | F | H |
| H | NCS | F | F |
| $CH_3$ | NCS | F | F |
| $C_2H_5$ | NCS | F | F |
| n-$C_3H_7$ | NCS | F | F |
| n-$C_4H_9$ | NCS | F | F |
| n-$C_5H_{11}$ | NCS | F | F |
| n-$C_6H_{13}$ | NCS | F | F |
| H | $C_2F_5$ | H | H |
| $CH_3$ | $C_2F_5$ | H | H |
| $C_2H_5$ | $C_2F_5$ | H | H |
| n-$C_3H_7$ | $C_2F_5$ | H | H |
| n-$C_4H_9$ | $C_2F_5$ | H | H |
| n-$C_5H_{11}$ | $C_2F_5$ | H | H |
| n-$C_6H_{13}$ | $C_2F_5$ | H | H |
| H | $C_2F_5$ | F | H |
| $CH_3$ | $C_2F_5$ | F | H |
| $C_2H_5$ | $C_2F_5$ | F | H |
| n-$C_3H_7$ | $C_2F_5$ | F | H |
| n-$C_4H_9$ | $C_2F_5$ | F | H |
| n-$C_5H_{11}$ | $C_2F_5$ | F | H |
| n-$C_6H_{13}$ | $C_2F_5$ | F | H |
| H | $C_2F_5$ | F | F |
| $CH_3$ | $C_2F_5$ | F | F |
| $C_2H_5$ | $C_2F_5$ | F | F |
| n-$C_3H_7$ | $C_2F_5$ | F | F |
| n-$C_4H_9$ | $C_2F_5$ | F | F |
| n-$C_5H_{11}$ | $C_2F_5$ | F | F |
| n-$C_6H_{13}$ | $C_2F_5$ | F | F |
| H | $C_3F_7$ | H | H |
| $CH_3$ | $C_3F_7$ | H | H |
| $C_2H_5$ | $C_3F_7$ | H | H |
| n-$C_3H_7$ | $C_3F_7$ | H | H |
| n-$C_4H_9$ | $C_3F_7$ | H | H |
| n-$C_5H_{11}$ | $C_3F_7$ | H | H |
| n-$C_6H_{13}$ | $C_3F_7$ | H | H |
| H | $C_3F_7$ | F | H |
| $CH_3$ | $C_3F_7$ | F | H |
| $C_2H_5$ | $C_3F_7$ | F | H |
| n-$C_3H_7$ | $C_3F_7$ | F | H |
| n-$C_4H_9$ | $C_3F_7$ | F | H |
| n-$C_5H_{11}$ | $C_3F_7$ | F | H |
| n-$C_6H_{13}$ | $C_3F_7$ | F | H |
| H | $C_3F_7$ | F | F |
| $CH_3$ | $C_3F_7$ | F | F |
| $C_2H_5$ | $C_3F_7$ | F | F |
| n-$C_3H_7$ | $C_3F_7$ | F | F |
| n-$C_4H_9$ | $C_3F_7$ | F | F |
| n-$C_5H_{11}$ | $C_3F_7$ | F | F |
| n-$C_6H_{13}$ | $C_3F_7$ | F | F |
| H | $SF_5$ | H | H |
| $CH_3$ | $SF_5$ | H | H |
| $C_2H_5$ | $SF_5$ | H | H |
| n-$C_3H_7$ | $SF_5$ | H | H |
| n-$C_4H_9$ | $SF_5$ | H | H |
| n-$C_5H_{11}$ | $SF_5$ | H | H |
| n-$C_6H_{13}$ | $SF_5$ | H | H |
| H | $SF_5$ | F | H |
| $CH_3$ | $SF_5$ | F | H |
| $C_2H_5$ | $SF_5$ | F | H |
| n-$C_3H_7$ | $SF_5$ | F | H |
| n-$C_4H_9$ | $SF_5$ | F | H |
| n-$C_5H_{11}$ | $SF_5$ | F | H |
| n-$C_6H_{13}$ | $SF_5$ | F | H |
| H | $SF_5$ | F | F |
| $CH_3$ | $SF_5$ | F | F |
| $C_2H_5$ | $SF_5$ | F | F |
| n-$C_3H_7$ | $SF_5$ | F | F |
| n-$C_4H_9$ | $SF_5$ | F | F |
| n-$C_5H_{11}$ | $SF_5$ | F | F |
| n-$C_6H_{13}$ | $SF_5$ | F | F |

-continued

| $R^1$ | X | $L^1$ | $L^2$ |
|---|---|---|---|
| H | CN | H | H |
| $CH_3$ | CN | H | H |
| $C_2H_5$ | CN | H | H |
| n-$C_3H_7$ | CN | H | H |
| n-$C_4H_9$ | CN | H | H |
| n-$C_5H_{11}$ | CN | H | H |
| n-$C_6H_{13}$ | CN | H | H |
| H | CN | F | H |
| $CH_3$ | CN | F | H |
| $C_2H_5$ | CN | F | H |
| n-$C_3H_7$ | CN | F | H |
| n-$C_4H_9$ | CN | F | H |
| n-$C_5H_{11}$ | CN | F | H |
| n-$C_6H_{13}$ | CN | F | H |
| H | CN | F | F |
| $CH_3$ | CN | F | F |
| $C_2H_5$ | CN | F | F |
| n-$C_3H_7$ | CN | F | F |
| n-$C_4H_9$ | CN | F | F |
| n-$C_5H_{11}$ | CN | F | F |
| n-$C_6H_{13}$ | CN | F | F |

EXAMPLE 2

Step 2.1

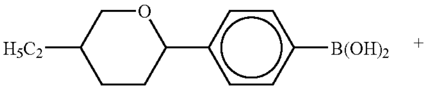

I

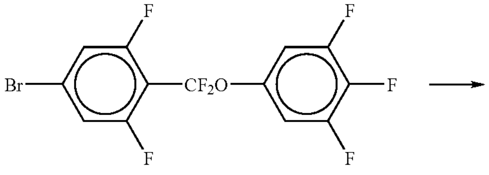

J

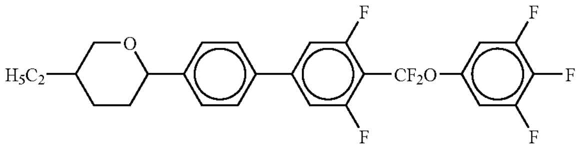

K

A mixture of 50 mmol of I 50 mmol of J. 2.5 mmol of $Pd(PPh_3)_4$, 300 ml of toluene and 300 ml of Na borate buffer (pH=9) is stirred at 80° C. for 18 hours. The mixture is poured into 500 ml of 0.1 N HCl, and the product is extracted with $CH_2Cl_2$, dried over $Na_2SO_4$ and evaporated to dryness in a rotary evaporator. The crude product is chromatographed over silica gel in n-heptane and subsequently recrystallised twice from n-heptane at −20° C. C 78 N 93.1 I; $\Delta n$=0.1493; $\Delta\epsilon$=27.3

The following compounds of the formula

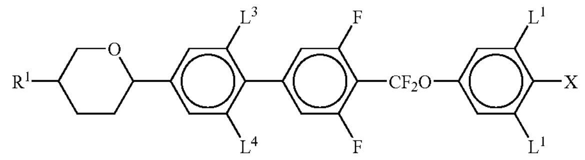

are prepared analogously:

| $R^1$ | X | $L^1$ | $L^2$ | $L^3$ | $L^4$ | |
|---|---|---|---|---|---|---|
| H | F | H | H | H | H | |
| $CH_3$ | F | H | H | H | H | |
| $C_2H_5$ | F | H | H | H | H | |
| $C_3H_7$ | F | H | H | H | H | |
| $n\text{-}C_4H_9$ | F | H | H | H | H | |
| $n\text{-}C_5H_{11}$ | F | H | H | H | H | |
| $n\text{-}C_6H_{13}$ | F | H | H | H | H | |
| H | F | F | H | H | H | |
| $CH_3$ | F | F | H | H | H | |
| $C_2H_5$ | F | F | H | H | H | |
| $n\text{-}C_3H_7$ | F | F | H | H | H | |
| $n\text{-}C_4H_9$ | F | F | H | H | H | |
| $n\text{-}C_5H_{11}$ | F | F | H | H | H | |
| $n\text{-}C_6H_{13}$ | F | F | H | H | H | |
| H | F | F | F | H | H | |
| $CH_3$ | F | F | F | H | H | |
| $n\text{-}C_3H_7$ | F | F | F | H | H | C 75 N 118.0 I; $\Delta\epsilon = 23.2$; $\Delta n = 0.1450$ |
| $n\text{-}C_4H_9$ | F | F | F | H | H | |
| $n\text{-}C_5H_{11}$ | F | F | F | H | H | |
| $n\text{-}C_6H_{13}$ | F | F | F | H | H | |
| H | Cl | H | H | H | H | |
| $CH_3$ | Cl | H | H | H | H | |
| $C_2H_5$ | Cl | H | H | H | H | |
| $n\text{-}C_3H_7$ | Cl | H | H | H | H | |
| $n\text{-}C_4H_9$ | Cl | H | H | H | H | |
| $n\text{-}C_5H_{11}$ | Cl | H | H | H | H | |
| $n\text{-}C_6H_{13}$ | Cl | H | H | H | H | |
| H | Cl | F | H | H | H | |
| $CH_3$ | Cl | F | H | H | H | |
| $C_2H_5$ | Cl | F | H | H | H | |
| $n\text{-}C_3H_7$ | Cl | F | H | H | H | |
| $n\text{-}C_4H_9$ | Cl | F | H | H | H | |
| $n\text{-}C_5H_{11}$ | Cl | F | H | H | H | |
| $n\text{-}C_6H_{13}$ | Cl | F | H | H | H | |
| H | Cl | F | F | H | H | |
| $CH_3$ | Cl | F | F | H | H | |
| $C_2H_5$ | Cl | F | F | H | H | |
| $n\text{-}C_3H_7$ | Cl | F | F | H | H | |
| $n\text{-}C_4H_9$ | Cl | F | F | H | H | |
| $n\text{-}C_5H_{11}$ | Cl | F | F | H | H | |
| $n\text{-}C_6H_{13}$ | Cl | F | F | H | H | |
| H | $OCF_3$ | H | H | H | H | |
| $CH_3$ | $OCF_3$ | H | H | H | H | |
| $C_2H_5$ | $OCF_3$ | H | H | H | H | |
| $n\text{-}C_3H_7$ | $OCF_3$ | H | H | H | H | |
| $n\text{-}C_4H_9$ | $OCF_3$ | H | H | H | H | |
| $n\text{-}C_5H_{11}$ | $OCF_3$ | H | H | H | H | |
| $n\text{-}C_6H_{13}$ | $OCF_3$ | H | H | H | H | |
| H | $OCF_3$ | F | H | H | H | |
| $CH_3$ | $OCF_3$ | F | H | H | H | |
| $C_2H_5$ | $OCF_3$ | F | H | H | H | |
| $n\text{-}C_3H_7$ | $OCF_3$ | F | H | H | H | |
| $n\text{-}C_4H_9$ | $OCF_3$ | F | H | H | H | |
| $n\text{-}C_5H_{11}$ | $OCF_3$ | F | H | H | H | |
| $n\text{-}C_6H_{13}$ | $OCF_3$ | F | H | H | H | |
| H | $OCF_3$ | F | F | H | H | |
| $CH_3$ | $OCF_3$ | F | F | H | H | |
| $C_2H_5$ | $OCF_3$ | F | F | H | H | |
| $n\text{-}C_3H_7$ | $OCF_3$ | F | F | H | H | |
| $n\text{-}C_4H_9$ | $OCF_3$ | F | F | H | H | |
| $n\text{-}C_5H_{11}$ | $OCF_3$ | F | F | H | H | |
| $n\text{-}C_6H_{13}$ | $OCF_3$ | F | F | H | H | |
| H | $OCHF_2$ | H | H | H | H | |
| $CH_3$ | $OCHF_2$ | H | H | H | H | |

-continued

| $R^1$ | X | $L^1$ | $L^2$ | $L^3$ | $L^4$ |
|---|---|---|---|---|---|
| $C_2H_5$ | $OCHF_2$ | H | H | H | H |
| $n\text{-}C_3H_7$ | $OCHF_2$ | H | H | H | H |
| $n\text{-}C_4H_9$ | $OCHF_2$ | H | H | H | H |
| $n\text{-}C_5H_{11}$ | $OCHF_2$ | H | H | H | H |
| $n\text{-}C_6H_{13}$ | $OCHF_2$ | H | H | H | H |
| H | $OCHF_2$ | F | H | H | H |
| $CH_3$ | $OCHF_2$ | F | H | H | H |
| $C_2H_5$ | $OCHF_2$ | F | H | H | H |
| $n\text{-}C_3H_7$ | $OCHF_2$ | F | H | H | H |
| $n\text{-}C_4H_9$ | $OCHF_2$ | F | H | H | H |
| $n\text{-}C_5H_{11}$ | $OCHF_2$ | F | H | H | H |
| $n\text{-}C_6H_{13}$ | $OCHF_2$ | F | H | H | H |
| H | $OCHF_2$ | F | F | H | H |
| $CH_3$ | $OCHF_2$ | F | F | H | H |
| $C_2H_5$ | $OCHF_2$ | F | F | H | H |
| $n\text{-}C_3H_7$ | $OCHF_2$ | F | F | H | H |
| $n\text{-}C_4H_9$ | $OCHF_2$ | F | F | H | H |
| $n\text{-}C_5H_{11}$ | $OCHF_2$ | F | F | H | H |
| $n\text{-}C_6H_{13}$ | $OCHF_2$ | F | F | H | H |
| H | $OCHFCF_3$ | H | H | H | H |
| $CH_3$ | $OCHFCF_3$ | H | H | H | H |
| $C_2H_5$ | $OCHFCF_3$ | H | H | H | H |
| $n\text{-}C_3H_7$ | $OCHFCF_3$ | H | H | H | H |
| $n\text{-}C_4H_9$ | $OCHFCF_3$ | H | H | H | H |
| $n\text{-}C_5H_{11}$ | $OCHFCF_3$ | H | H | H | H |
| $n\text{-}C_6H_{13}$ | $OCHFCF_3$ | H | H | H | H |
| H | $OCHFCF_3$ | F | H | H | H |
| $CH_3$ | $OCHFCF_3$ | F | H | H | H |
| $C_2H_5$ | $OCHFCF_3$ | F | H | H | H |
| $n\text{-}C_3H_7$ | $OCHFCF_3$ | F | H | H | H |
| $n\text{-}C_4H_9$ | $OCHFCF_3$ | F | H | H | H |
| $n\text{-}C_5H_{11}$ | $OCHFCF_3$ | F | H | H | H |
| $n\text{-}C_6H_{13}$ | $OCHFCF_3$ | F | H | H | H |
| H | $OCHFCF_3$ | F | F | H | H |
| $CH_3$ | $OCHFCF_3$ | F | F | H | H |
| $C_2H_5$ | $OCHFCF_3$ | F | F | H | H |
| $n\text{-}C_3H_7$ | $OCHFCF_3$ | F | F | H | H |
| $n\text{-}C_4H_9$ | $OCHFCF_3$ | F | F | H | H |
| $n\text{-}C_5H_{11}$ | $OCHFCF_3$ | F | F | H | H |
| $n\text{-}C_6H_{13}$ | $OCHFCF_3$ | F | F | H | H |
| H | $OCHFCF_3$ | H | H | H | H |
| $CH_3$ | $OCHFCF_3$ | H | H | H | H |
| $C_2H_5$ | $OCHFCF_3$ | H | H | H | H |
| $n\text{-}C_3H_7$ | $OCHFCF_3$ | H | H | H | H |
| $n\text{-}C_4H_9$ | $OCHFCF_3$ | H | H | H | H |
| $n\text{-}C_5H_{11}$ | $OCHFCF_3$ | H | H | H | H |
| $n\text{-}C_6H_{13}$ | $OCHFCF_3$ | H | H | H | H |
| H | $OCHFCF_3$ | F | H | H | H |
| $CH_3$ | $OCHFCF_3$ | F | H | H | H |
| $C_2H_5$ | $OCHFCF_3$ | F | H | H | H |
| $n\text{-}C_3H_7$ | $OCHFCF_3$ | F | H | H | H |
| $n\text{-}C_4H_9$ | $OCHFCF_3$ | F | H | H | H |
| $n\text{-}C_5H_{11}$ | $OCHFCF_3$ | F | H | H | H |
| $n\text{-}C_6H_{13}$ | $OCHFCF_3$ | F | H | H | H |
| H | $OCHFCF_3$ | F | F | H | H |
| $CH_3$ | $OCHFCF_3$ | F | F | H | H |
| $C_2H_5$ | $OCHFCF_3$ | F | F | H | H |
| $n\text{-}C_3H_7$ | $OCHFCF_3$ | F | F | H | H |
| $n\text{-}C_4H_9$ | $OCHFCF_3$ | F | F | H | H |
| $n\text{-}C_5H_{11}$ | $OCHFCF_3$ | F | F | H | H |
| $n\text{-}C_6H_{13}$ | $OCHFCF_3$ | F | F | H | H |
| H | $OCF_2CHFCF_3$ | H | H | H | H |
| $CH_3$ | $OCF_2CHFCF_3$ | H | H | H | H |
| $C_2H_5$ | $OCF_2CHFCF_3$ | H | H | H | H |
| $n\text{-}C_3H_7$ | $OCF_2CHFCF_3$ | H | H | H | H |
| $n\text{-}C_4H_9$ | $OCF_2CHFCF_3$ | H | H | H | H |
| $n\text{-}C_5H_{11}$ | $OCF_2CHFCF_3$ | H | H | H | H |
| $n\text{-}C_6H_{13}$ | $OCF_2CHFCF_3$ | H | H | H | H |
| H | $OCF_2CHFCF_3$ | F | H | H | H |
| $CH_3$ | $OCF_2CHFCF_3$ | F | H | H | H |
| $C_2H_5$ | $OCF_2CHFCF_3$ | F | H | H | H |
| $n\text{-}C_3H_7$ | $OCF_2CHFCF_3$ | F | H | H | H |
| $n\text{-}C_4H_9$ | $OCF_2CHFCF_3$ | F | H | H | H |
| $n\text{-}C_5H_{11}$ | $OCF_2CHFCF_3$ | F | H | H | H |
| $n\text{-}C_6H_{13}$ | $OCF_2CHFCF_3$ | F | H | H | H |
| H | $OCF_2CHFCF_3$ | F | F | H | H |
| $CH_3$ | $OCF_2CHFCF_3$ | F | F | H | H |

-continued

| $R^1$ | X | $L^1$ | $L^2$ | $L^3$ | $L^4$ |
|---|---|---|---|---|---|
| $C_2H_5$ | $OCF_2CHFCF_3$ | F | F | H | H |
| n-$C_3H_7$ | $OCF_2CHFCF_3$ | F | F | H | H |
| n-$C_4H_9$ | $OCF_2CHFCF_3$ | F | F | H | H |
| n-$C_5H_{11}$ | $OCF_2CHFCF_3$ | F | F | H | H |
| n-$C_6H_{13}$ | $OCF_2CHFCF_3$ | F | F | H | H |
| H | NCS | H | H | H | H |
| $CH_3$ | NCS | H | H | H | H |
| $C_2H_5$ | NCS | H | H | H | H |
| n-$C_3H_7$ | NCS | H | H | H | H |
| n-$C_4H_9$ | NCS | H | H | H | H |
| n-$C_5H_{11}$ | NCS | H | H | H | H |
| n-$C_6H_{13}$ | NCS | H | H | H | H |
| H | NCS | F | H | H | H |
| $CH_3$ | NCS | F | H | H | H |
| $C_2H_5$ | NCS | F | H | H | H |
| n-$C_3H_7$ | NCS | F | H | H | H |
| n-$C_4H_9$ | NCS | F | H | H | H |
| n-$C_5H_{11}$ | NCS | F | H | H | H |
| n-$C_6H_{13}$ | NCS | F | H | H | H |
| H | NCS | F | F | H | H |
| $CH_3$ | NCS | F | F | H | H |
| $C_2H_5$ | NCS | F | F | H | H |
| n-$C_3H_7$ | NCS | F | F | H | H |
| n-$C_4H_9$ | NCS | F | F | H | H |
| n-$C_5H_{11}$ | NCS | F | F | H | H |
| n-$C_6H_{13}$ | NCS | F | F | H | H |
| H | $C_2F_5$ | H | H | H | H |
| $CH_3$ | $C_2F_5$ | H | H | H | H |
| $C_2H_5$ | $C_2F_5$ | H | H | H | H |
| n-$C_3H_7$ | $C_2F_5$ | H | H | H | H |
| n-$C_4H_9$ | $C_2F_5$ | H | H | H | H |
| n-$C_5H_{11}$ | $C_2F_5$ | H | H | H | H |
| n-$C_6H_{13}$ | $C_2F_5$ | H | H | H | H |
| H | $C_2F_5$ | F | H | H | H |
| $CH_3$ | $C_2F_5$ | F | H | H | H |
| $C_2H_5$ | $C_2F_5$ | F | H | H | H |
| n-$C_3H_7$ | $C_2F_5$ | F | H | H | H |
| n-$C_4H_9$ | $C_2F_5$ | F | H | H | H |
| n-$C_5H_{11}$ | $C_2F_5$ | F | H | H | H |
| n-$C_6H_{13}$ | $C_2F_5$ | F | H | H | H |
| H | $C_2F_5$ | F | F | H | H |
| $CH_3$ | $C_2F_5$ | F | F | H | H |
| $C_2H_5$ | $C_2F_5$ | F | F | H | H |
| n-$C_3H_7$ | $C_2F_5$ | F | F | H | H |
| n-$C_4H_9$ | $C_2F_5$ | F | F | H | H |
| n-$C_5H_{11}$ | $C_2F_5$ | F | F | H | H |
| n-$C_6H_{13}$ | $C_2F_5$ | F | F | H | H |
| H | $C_3F_7$ | H | H | H | H |
| $CH_3$ | $C_3F_7$ | H | H | H | H |
| $C_2H_5$ | $C_3F_7$ | H | H | H | H |
| n-$C_3H_7$ | $C_3F_7$ | H | H | H | H |
| n-$C_4H_9$ | $C_3F_7$ | H | H | H | H |
| n-$C_5H_{11}$ | $C_3F_7$ | H | H | H | H |
| n-$C_6H_{13}$ | $C_3F_7$ | H | H | H | H |
| H | $C_3F_7$ | F | H | H | H |
| $CH_3$ | $C_3F_7$ | F | H | H | H |
| $C_2H_5$ | $C_3F_7$ | F | H | H | H |
| n-$C_3H_7$ | $C_3F_7$ | F | H | H | H |
| n-$C_4H_9$ | $C_3F_7$ | F | H | H | H |
| n-$C_5H_{11}$ | $C_3F_7$ | F | H | H | H |
| n-$C_6H_{13}$ | $C_3F_7$ | F | H | H | H |
| H | $C_3F_7$ | F | F | H | H |
| $CH_3$ | $C_3F_7$ | F | F | H | H |
| $C_2H_5$ | $C_3F_7$ | F | F | H | H |
| n-$C_3H_7$ | $C_3F_7$ | F | F | H | H |
| n-$C_4H_9$ | $C_3F_7$ | F | F | H | H |
| n-$C_5H_{11}$ | $C_3F_7$ | F | F | H | H |
| n-$C_6H_{13}$ | $C_3F_7$ | F | F | H | H |
| H | $SF_5$ | H | H | H | H |
| $CH_3$ | $SF_5$ | H | H | H | H |
| $C_2H_5$ | $SF_5$ | H | H | H | H |
| n-$C_3H_7$ | $SF_5$ | H | H | H | H |
| n-$C_4H_9$ | $SF_5$ | H | H | H | H |
| n-$C_5H_{11}$ | $SF_5$ | H | H | H | H |
| n-$C_6H_{13}$ | $SF_5$ | H | H | H | H |
| H | $SF_5$ | F | H | H | H |
| $CH_3$ | $SF_5$ | F | H | H | H |

-continued

| $R^1$ | X | $L^1$ | $L^2$ | $L^3$ | $L^4$ | |
|---|---|---|---|---|---|---|
| $C_2H_5$ | $SF_5$ | F | H | H | H | |
| n-$C_3H_7$ | $SF_5$ | F | H | H | H | |
| n-$C_4H_9$ | $SF_5$ | F | H | H | H | |
| n-$C_5H_{11}$ | $SF_5$ | F | H | H | H | |
| n-$C_6H_{13}$ | $SF_5$ | F | H | H | H | |
| H | $SF_5$ | F | F | H | H | |
| $CH_3$ | $SF_5$ | F | F | H | H | |
| $C_2H_5$ | $SF_5$ | F | F | H | H | |
| n-$C_3H_7$ | $SF_5$ | F | F | H | H | |
| n-$C_4H_9$ | $SF_5$ | F | F | H | H | |
| n-$C_5H_{11}$ | $SF_5$ | F | F | H | H | |
| n-$C_6H_{13}$ | $SF_5$ | F | F | H | H | |
| H | CN | H | H | H | H | |
| $CH_3$ | CN | H | H | H | H | |
| $C_2H_5$ | CN | H | H | H | H | |
| n-$C_3H_7$ | CN | H | H | H | H | |
| n-$C_4H_9$ | CN | H | H | H | H | |
| n-$C_5H_{11}$ | CN | H | H | H | H | |
| n-$C_6H_{13}$ | CN | H | H | H | H | |
| H | CN | F | H | H | H | |
| $CH_3$ | CN | F | H | H | H | |
| $C_2H_5$ | CN | F | H | H | H | |
| n-$C_3H_7$ | CN | F | H | H | H | |
| n-$C_4H_9$ | CN | F | H | H | H | |
| n-$C_5H_{11}$ | CN | F | H | H | H | |
| n-$C_6H_{13}$ | CN | F | H | H | H | |
| H | CN | F | F | H | H | |
| $CH_3$ | CN | F | F | H | H | |
| $C_2H_5$ | CN | F | F | H | H | |
| n-$C_3H_7$ | CN | F | F | H | H | |
| n-$C_4H_9$ | CN | F | F | H | H | |
| n-$C_5H_{11}$ | CN | F | F | H | H | |
| n-$C_6H_{13}$ | CN | F | F | H | H | |
| H | F | H | H | F | H | |
| $CH_3$ | F | H | H | F | H | |
| $C_2H_5$ | F | H | H | F | H | |
| $C_3H_7$ | F | H | H | F | H | |
| n-$C_4H_9$ | F | H | H | F | H | |
| n-$C_5H_{11}$ | F | H | H | F | H | |
| n-$C_6H_{13}$ | F | H | H | F | H | |
| H | F | F | H | F | H | |
| $CH_3$ | F | F | H | F | H | |
| $C_2H_5$ | F | F | H | F | H | |
| n-$C_3H_7$ | F | F | H | F | H | |
| n-$C_4H_9$ | F | F | H | F | H | |
| n-$C_5H_{11}$ | F | F | H | F | H | |
| n-$C_6H_{13}$ | F | F | H | F | H | |
| H | F | F | F | F | H | |
| $CH_3$ | F | F | F | F | H | |
| $C_2H_5$ | F | F | F | F | H | C 89 N (76.8) I; $\Delta\epsilon$ = 29.9; $\Delta n$ = 0.1310 |
| n-$C_3H_7$ | F | F | F | F | H | C 70 N 102.3 I; $\Delta\epsilon$ = 29.7; $\Delta n$ = 0.1364 |
| n-$C_4H_9$ | F | F | F | F | H | |
| n-$C_5H_{11}$ | F | F | F | F | H | |
| n-$C_6H_{13}$ | F | F | F | F | H | |
| H | Cl | H | H | F | H | |
| $CH_3$ | Cl | H | H | F | H | |
| $C_2H_5$ | Cl | H | H | F | H | |
| n-$C_3H_7$ | Cl | H | H | F | H | |
| n-$C_4H_9$ | Cl | H | H | F | H | |
| n-$C_5H_{11}$ | Cl | H | H | F | H | |
| n-$C_6H_{13}$ | Cl | H | H | F | H | |
| H | Cl | F | H | F | H | |
| $CH_3$ | Cl | F | H | F | H | |
| $C_2H_5$ | Cl | F | H | F | H | |
| n-$C_3H_7$ | Cl | F | H | F | H | |
| n-$C_4H_9$ | Cl | F | H | F | H | |
| n-$C_5H_{11}$ | Cl | F | H | F | H | |
| n-$C_6H_{13}$ | Cl | F | H | F | H | |
| H | Cl | F | F | F | H | |
| $CH_3$ | Cl | F | F | F | H | |
| $C_2H_5$ | Cl | F | F | F | H | |
| n-$C_3H_7$ | Cl | F | F | F | H | |
| n-$C_4H_9$ | Cl | F | F | F | H | |
| n-$C_5H_{11}$ | Cl | F | F | F | H | |
| n-$C_6H_{13}$ | Cl | F | F | F | H | |

-continued

| $R^1$ | X | $L^1$ | $L^2$ | $L^3$ | $L^4$ |
|---|---|---|---|---|---|
| H | $OCF_3$ | H | H | F | H |
| $CH_3$ | $OCF_3$ | H | H | F | H |
| $C_2H_5$ | $OCF_3$ | H | H | F | H |
| n-$C_3H_7$ | $OCF_3$ | H | H | F | H |
| n-$C_4H_9$ | $OCF_3$ | H | H | F | H |
| n-$C_5H_{11}$ | $OCF_3$ | H | H | F | H |
| n-$C_6H_{13}$ | $OCF_3$ | H | H | F | H |
| H | $OCF_3$ | F | H | F | H |
| $CH_3$ | $OCF_3$ | F | H | F | H |
| $C_2H_5$ | $OCF_3$ | F | H | F | H |
| n-$C_3H_7$ | $OCF_3$ | F | H | F | H |
| n-$C_4H_9$ | $OCF_3$ | F | H | F | H |
| n-$C_5H_{11}$ | $OCF_3$ | F | H | F | H |
| n-$C_6H_{13}$ | $OCF_3$ | F | H | F | H |
| H | $OCF_3$ | F | F | F | H |
| $CH_3$ | $OCF_3$ | F | F | F | H |
| $C_2H_5$ | $OCF_3$ | F | F | F | H |
| n-$C_3H_7$ | $OCF_3$ | F | F | F | H |
| n-$C_4H_9$ | $OCF_3$ | F | F | F | H |
| n-$C_5H_{11}$ | $OCF_3$ | F | F | F | H |
| n-$C_6H_{13}$ | $OCF_3$ | F | F | F | H |
| H | $OCHF_2$ | H | H | F | H |
| $CH_3$ | $OCHF_2$ | H | H | F | H |
| $C_2H_5$ | $OCHF_2$ | H | H | F | H |
| n-$C_3H_7$ | $OCHF_2$ | H | H | F | H |
| n-$C_4H_9$ | $OCHF_2$ | H | H | F | H |
| n-$C_5H_{11}$ | $OCHF_2$ | H | H | F | H |
| n-$C_6H_{13}$ | $OCHF_2$ | H | H | F | H |
| H | $OCHF_2$ | F | H | F | H |
| $CH_3$ | $OCHF_2$ | F | H | F | H |
| $C_2H_5$ | $OCHF_2$ | F | H | F | H |
| n-$C_3H_7$ | $OCHF_2$ | F | H | F | H |
| n-$C_4H_9$ | $OCHF_2$ | F | H | F | H |
| n-$C_5H_{11}$ | $OCHF_2$ | F | H | F | H |
| n-$C_6H_{13}$ | $OCHF_2$ | F | H | F | H |
| H | $OCHF_2$ | F | F | F | H |
| $CH_3$ | $OCHF_2$ | F | F | F | H |
| $C_2H_5$ | $OCHF_2$ | F | F | F | H |
| n-$C_3H_7$ | $OCHF_2$ | F | F | F | H |
| n-$C_4H_9$ | $OCHF_2$ | F | F | F | H |
| n-$C_5H_{11}$ | $OCHF_2$ | F | F | F | H |
| n-$C_6H_{13}$ | $OCHF_2$ | F | F | F | H |
| H | $OCHFCF_3$ | H | H | F | H |
| $CH_3$ | $OCHFCF_3$ | H | H | F | H |
| $C_2H_5$ | $OCHFCF_3$ | H | H | F | H |
| n-$C_3H_7$ | $OCHFCF_3$ | H | H | F | H |
| n-$C_4H_9$ | $OCHFCF_3$ | H | H | F | H |
| n-$C_5H_{11}$ | $OCHFCF_3$ | H | H | F | H |
| n-$C_6H_{13}$ | $OCHFCF_3$ | H | H | F | H |
| H | $OCHFCF_3$ | F | H | F | H |
| $CH_3$ | $OCHFCF_3$ | F | H | F | H |
| $C_2H_5$ | $OCHFCF_3$ | F | H | F | H |
| n-$C_3H_7$ | $OCHFCF_3$ | F | H | F | H |
| n-$C_4H_9$ | $OCHFCF_3$ | F | H | F | H |
| n-$C_5H_{11}$ | $OCHFCF_3$ | F | H | F | H |
| n-$C_6H_{13}$ | $OCHFCF_3$ | F | H | F | H |
| H | $OCHFCF_3$ | F | F | F | H |
| $CH_3$ | $OCHFCF_3$ | F | F | F | H |
| $C_2H_5$ | $OCHFCF_3$ | F | F | F | H |
| n-$C_3H_7$ | $OCHFCF_3$ | F | F | F | H |
| n-$C_4H_9$ | $OCHFCF_3$ | F | F | F | H |
| n-$C_5H_{11}$ | $OCHFCF_3$ | F | F | F | H |
| n-$C_6H_{13}$ | $OCHFCF_3$ | F | F | F | H |
| H | $OCHFCF_3$ | H | H | F | H |
| $CH_3$ | $OCHFCF_3$ | H | H | F | H |
| $C_2H_5$ | $OCHFCF_3$ | H | H | F | H |
| n-$C_3H_7$ | $OCHFCF_3$ | H | H | F | H |
| n-$C_4H_9$ | $OCHFCF_3$ | H | H | F | H |
| n-$C_5H_{11}$ | $OCHFCF_3$ | H | H | F | H |
| n-$C_6H_{13}$ | $OCHFCF_3$ | H | H | F | H |
| H | $OCHFCF_3$ | F | H | F | H |
| $CH_3$ | $OCHFCF_3$ | F | H | F | H |
| $C_2H_5$ | $OCHFCF_3$ | F | H | F | H |
| n-$C_3H_7$ | $OCHFCF_3$ | F | H | F | H |
| n-$C_4H_9$ | $OCHFCF_3$ | F | H | F | H |
| n-$C_5H_{11}$ | $OCHFCF_3$ | F | H | F | H |
| n-$C_6H_{13}$ | $OCHFCF_3$ | F | H | F | H |

-continued

| $R^1$ | X | $L^1$ | $L^2$ | $L^3$ | $L^4$ |
|---|---|---|---|---|---|
| H | $OCHFCF_3$ | F | F | F | H |
| $CH_3$ | $OCHFCF_3$ | F | F | F | H |
| $C_2H_5$ | $OCHFCF_3$ | F | F | F | H |
| n-$C_3H_7$ | $OCHFCF_3$ | F | F | F | H |
| n-$C_4H_9$ | $OCHFCF_3$ | F | F | F | H |
| n-$C_5H_{11}$ | $OCHFCF_3$ | F | F | F | H |
| n-$C_6H_{13}$ | $OCHFCF_3$ | F | F | F | H |
| H | $OCF_2CHFCF_3$ | H | H | F | H |
| $CH_3$ | $OCF_2CHFCF_3$ | H | H | F | H |
| $C_2H_5$ | $OCF_2CHFCF_3$ | H | H | F | H |
| n-$C_3H_7$ | $OCF_2CHFCF_3$ | H | H | F | H |
| n-$C_4H_9$ | $OCF_2CHFCF_3$ | H | H | F | H |
| n-$C_5H_{11}$ | $OCF_2CHFCF_3$ | H | H | F | H |
| n-$C_6H_{13}$ | $OCF_2CHFCF_3$ | H | H | F | H |
| H | $OCF_2CHFCF_3$ | F | H | F | H |
| $CH_3$ | $OCF_2CHFCF_3$ | F | H | F | H |
| $C_2H_5$ | $OCF_2CHFCF_3$ | F | H | F | H |
| n-$C_3H_7$ | $OCF_2CHFCF_3$ | F | H | F | H |
| n-$C_4H_9$ | $OCF_2CHFCF_3$ | F | H | F | H |
| n-$C_5H_{11}$ | $OCF_2CHFCF_3$ | F | H | F | H |
| n-$C_6H_{13}$ | $OCF_2CHFCF_3$ | F | H | F | H |
| H | $OCF_2CHFCF_3$ | F | F | F | H |
| $CH_3$ | $OCF_2CHFCF_3$ | F | F | F | H |
| $C_2H_5$ | $OCF_2CHFCF_3$ | F | F | F | H |
| n-$C_3H_7$ | $OCF_2CHFCF_3$ | F | F | F | H |
| n-$C_4H_9$ | $OCF_2CHFCF_3$ | F | F | F | H |
| n-$C_5H_{11}$ | $OCF_2CHFCF_3$ | F | F | F | H |
| n-$C_6H_{13}$ | $OCF_2CHFCF_3$ | F | F | F | H |
| H | NCS | H | H | F | H |
| $CH_3$ | NCS | H | H | F | H |
| $C_2H_5$ | NCS | H | H | F | H |
| n-$C_3H_7$ | NCS | H | H | F | H |
| n-$C_4H_9$ | NCS | H | H | F | H |
| n-$C_5H_{11}$ | NCS | H | H | F | H |
| n-$C_6H_{13}$ | NCS | H | H | F | H |
| H | NCS | F | H | F | H |
| $CH_3$ | NCS | F | H | F | H |
| $C_2H_5$ | NCS | F | H | F | H |
| n-$C_3H_7$ | NCS | F | H | F | H |
| n-$C_4H_9$ | NCS | F | H | F | H |
| n-$C_5H_{11}$ | NCS | F | H | F | H |
| n-$C_6H_{13}$ | NCS | F | H | F | H |
| H | NCS | F | F | F | H |
| $CH_3$ | NCS | F | F | F | H |
| $C_2H_5$ | NCS | F | F | F | H |
| n-$C_3H_7$ | NCS | F | F | F | H |
| n-$C_4H_9$ | NCS | F | F | F | H |
| n-$C_5H_{11}$ | NCS | F | F | F | H |
| n-$C_6H_{13}$ | NCS | F | F | F | H |
| H | $C_2F_5$ | H | H | F | H |
| $CH_3$ | $C_2F_5$ | H | H | F | H |
| $C_2H_5$ | $C_2F_5$ | H | H | F | H |
| n-$C_3H_7$ | $C_2F_5$ | H | H | F | H |
| n-$C_4H_9$ | $C_2F_5$ | H | H | F | H |
| n-$C_5H_{11}$ | $C_2F_5$ | H | H | F | H |
| n-$C_6H_{13}$ | $C_2F_5$ | H | H | F | H |
| H | $C_2F_5$ | F | H | F | H |
| $CH_3$ | $C_2F_5$ | F | H | F | H |
| $C_2H_5$ | $C_2F_5$ | F | H | F | H |
| n-$C_3H_7$ | $C_2F_5$ | F | H | F | H |
| n-$C_4H_9$ | $C_2F_5$ | F | H | F | H |
| n-$C_5H_{11}$ | $C_2F_5$ | F | H | F | H |
| n-$C_6H_{13}$ | $C_2F_5$ | F | H | F | H |
| H | $C_2F_5$ | F | F | F | H |
| $CH_3$ | $C_2F_5$ | F | F | F | H |
| $C_2H_5$ | $C_2F_5$ | F | F | F | H |
| n-$C_3H_7$ | $C_2F_5$ | F | F | F | H |
| n-$C_4H_9$ | $C_2F_5$ | F | F | F | H |
| n-$C_5H_{11}$ | $C_2F_5$ | F | F | F | H |
| n-$C_6H_{13}$ | $C_2F_5$ | F | F | F | H |
| H | $C_3F_7$ | H | H | F | H |
| $CH_3$ | $C_3F_7$ | H | H | F | H |
| $C_2H_5$ | $C_3F_7$ | H | H | F | H |
| n-$C_3H_7$ | $C_3F_7$ | H | H | F | H |
| n-$C_4H_9$ | $C_3F_7$ | H | H | F | H |
| n-$C_5H_{11}$ | $C_3F_7$ | H | H | F | H |
| n-$C_6H_{13}$ | $C_3F_7$ | H | H | F | H |

-continued

| $R^1$ | X | $L^1$ | $L^2$ | $L^3$ | $L^4$ | |
|---|---|---|---|---|---|---|
| H | $C_3F_7$ | F | H | F | H | |
| $CH_3$ | $C_3F_7$ | F | H | F | H | |
| $C_2H_5$ | $C_3F_7$ | F | H | F | H | |
| n-$C_3H_7$ | $C_3F_7$ | F | H | F | H | |
| n-$C_4H_9$ | $C_3F_7$ | F | H | F | H | |
| n-$C_5H_{11}$ | $C_3F_7$ | F | H | F | H | |
| n-$C_6H_{13}$ | $C_3F_7$ | F | H | F | H | |
| H | $C_3F_7$ | F | F | F | H | |
| $CH_3$ | $C_3F_7$ | F | F | F | H | |
| $C_2H_5$ | $C_3F_7$ | F | F | F | H | |
| n-$C_3H_7$ | $C_3F_7$ | F | F | F | H | |
| n-$C_4H_9$ | $C_3F_7$ | F | F | F | H | |
| n-$C_5H_{11}$ | $C_3F_7$ | F | F | F | H | |
| n-$C_6H_{13}$ | $C_3H_7$ | F | F | F | H | |
| H | $SF_5$ | H | H | F | H | |
| $CH_3$ | $SF_5$ | H | H | F | H | |
| $C_2H_5$ | $SF_5$ | H | H | F | H | |
| n-$C_3H_7$ | $SF_5$ | H | H | F | H | |
| n-$C_4H_9$ | $SF_5$ | H | H | F | H | |
| n-$C_5H_{11}$ | $SF_5$ | H | H | F | H | |
| n-$C_6H_{13}$ | $SF_5$ | H | H | F | H | |
| H | $SF_5$ | F | H | F | H | |
| $CH_3$ | $SF_5$ | F | H | F | H | |
| $C_2H_5$ | $SF_5$ | F | H | F | H | |
| n-$C_3H_7$ | $SF_5$ | F | H | F | H | |
| n-$C_4H_9$ | $SF_5$ | F | H | F | H | |
| n-$C_5H_{11}$ | $SF_5$ | F | H | F | H | |
| n-$C_6H_{13}$ | $SF_5$ | F | H | F | H | |
| H | $SF_5$ | F | F | F | H | |
| $CH_3$ | $SF_5$ | F | F | F | H | |
| $C_2H_5$ | $SF_5$ | F | F | F | H | |
| n-$C_3H_7$ | $SF_5$ | F | F | F | H | |
| n-$C_4H_9$ | $SF_5$ | F | F | F | H | |
| n-$C_5H_{11}$ | $SF_5$ | F | F | F | H | |
| n-$C_6H_{13}$ | $SF_5$ | F | F | F | H | |
| H | CN | H | H | F | H | |
| $CH_3$ | CN | H | H | F | H | |
| $C_2H_5$ | CN | H | H | F | H | |
| n-$C_3H_7$ | CN | H | H | F | H | |
| n-$C_4H_9$ | CN | H | H | F | H | |
| n-$C_5H_{11}$ | CN | H | H | F | H | |
| n-$C_6H_{13}$ | CN | H | H | F | H | |
| H | CN | F | H | F | H | |
| $CH_3$ | CN | F | H | F | H | |
| $C_2H_5$ | CN | F | H | F | H | |
| n-$C_3H_7$ | CN | F | H | F | H | |
| n-$C_4H_9$ | CN | F | H | F | H | |
| n-$C_5H_{11}$ | CN | F | H | F | H | |
| n-$C_6H_{13}$ | CN | F | H | F | H | |
| H | CN | F | F | F | H | |
| $CH_3$ | CN | F | F | F | H | |
| $C_2H_5$ | CN | F | F | F | H | |
| n-$C_3H_7$ | CN | F | F | F | H | |
| n-$C_4H_9$ | CN | F | F | F | H | |
| n-$C_5H_{11}$ | CN | F | F | F | H | |
| n-$C_6H_{13}$ | CN | F | F | F | H | |
| H | F | H | H | F | F | |
| $CH_3$ | F | H | H | F | F | |
| $C_2H_5$ | F | H | H | F | F | |
| n-$C_4H_9$ | F | H | H | F | F | |
| n-$C_5H_{11}$ | F | H | H | F | F | |
| n-$C_6H_{13}$ | F | H | H | F | F | |
| H | F | F | H | F | F | |
| $CH_3$ | F | F | H | F | F | |
| $C_2H_5$ | F | F | H | F | F | |
| n-$C_3H_7$ | F | F | H | F | F | |
| n-$C_4H_9$ | F | F | H | F | F | |
| n-$C_5H_{11}$ | F | F | H | F | F | |
| n-$C_6H_{13}$ | F | F | H | F | F | |
| H | F | F | F | F | F | |
| $CH_3$ | F | F | F | F | F | |
| $C_2H_5$ | F | F | F | F | F | |
| $C_2H_5$ | F | F | F | F | F | C 91 N (58.8) I; $\Delta\epsilon$ = 35.0; $\Delta n$ = 0.1149 |
| n-$C_3H_7$ | F | F | F | F | F | C 83 N (83.0) I; $\Delta\epsilon$ = 34.9; $\Delta n$ = 0.1231 |
| n-$C_4H_9$ | F | F | F | F | F | C 90 N 79.4 I; $\Delta\epsilon$ = 32.4; $\Delta n$ = 0.1171 |
| n-$C_5H_{11}$ | F | F | F | F | F | C 82 N 84.3 I; $\Delta\epsilon$ = 31.9; $\Delta n$ = 0.1205 |
| n-$C_6H_{13}$ | F | F | F | F | F | C 89 N (83.4) I; $\Delta\epsilon$ = 30.6; $\Delta n$ = 0.1116 |
| n-$C_7H_{15}$ | F | F | F | F | F | C 82 N 84.3 I; $\Delta\epsilon$ = 30.3; $\Delta n$ = 0.1130 |
| H | Cl | H | H | F | F | |
| $CH_3$ | Cl | H | H | F | F | |
| $C_2H_5$ | Cl | H | H | F | F | |
| n-$C_3H_7$ | Cl | H | H | F | F | |
| n-$C_4H_9$ | Cl | H | H | F | F | |
| n-$C_5H_{11}$ | Cl | H | H | F | F | |
| n-$C_6H_{13}$ | Cl | H | H | F | F | |
| H | Cl | F | H | F | F | |
| $CH_3$ | Cl | F | H | F | F | |
| $C_2H_5$ | Cl | F | H | F | F | |
| n-$C_3H_7$ | Cl | F | H | F | F | |
| n-$C_4H_9$ | Cl | F | H | F | F | |
| n-$C_5H_{11}$ | Cl | F | H | F | F | |
| n-$C_6H_{13}$ | Cl | F | H | F | F | |
| H | Cl | F | F | F | F | |
| $CH_3$ | Cl | F | F | F | F | |
| $C_2H_5$ | Cl | F | F | F | F | |
| n-$C_3H_7$ | Cl | F | F | F | F | C 80 N 106.7 I; $\Delta\epsilon$ = 31.5; $\Delta n$ = 0.1372 |
| n-$C_4H_9$ | Cl | F | F | F | F | |
| n-$C_5H_{11}$ | Cl | F | F | F | F | |
| n-$C_6H_{13}$ | Cl | F | F | F | F | |
| H | $OCF_3$ | H | H | F | F | |
| $CH_3$ | $OCF_3$ | H | H | F | F | |
| $C_2H_5$ | $OCF_3$ | H | H | F | F | |
| n-$C_3H_7$ | $OCF_3$ | H | H | F | F | C 80 N 119.8 I; $\Delta\epsilon$ = 25.3; $\Delta n$ = 0.1330 |
| n-$C_4H_9$ | $OCF_3$ | H | H | F | F | |
| n-$C_5H_{11}$ | $OCF_3$ | H | H | F | F | |
| n-$C_6H_{13}$ | $OCF_3$ | H | H | F | F | |
| H | $OCF_3$ | F | H | F | F | |
| $CH_3$ | $OCF_3$ | F | H | F | F | |
| $C_2H_5$ | $OCF_3$ | F | H | F | F | |
| n-$C_3H_7$ | $OCF_3$ | F | H | F | F | C 48 $S_A$ (46) N 105.1 I; $\Delta\epsilon$ = 29.8; $\Delta n$ = 0.1180 |
| n-$C_4H_9$ | $OCF_3$ | F | H | F | F | |
| n-$C_5H_{11}$ | $OCF_3$ | F | H | F | F | |
| n-$C_6H_{13}$ | $OCF_3$ | F | H | F | F | |
| H | $OCF_3$ | F | F | F | F | |
| $CH_3$ | $OCF_3$ | F | F | F | F | |
| $C_2H_5$ | $OCF_3$ | F | F | F | F | |
| n-$C_3H_7$ | $OCF_3$ | F | F | F | F | C 73 N 97.5 I; $\Delta\epsilon$ = 35.6; $\Delta n$ = 0.1158 |
| n-$C_4H_9$ | $OCF_3$ | F | F | F | F | |
| n-$C_5H_{11}$ | $OCF_3$ | F | F | F | F | |
| n-$C_6H_{13}$ | $OCF_3$ | F | F | F | F | |
| H | $OCHF_2$ | H | H | F | F | |
| $CH_3$ | $OCHF_2$ | H | H | F | F | |
| $C_2H_5$ | $OCHF_2$ | H | H | F | F | |
| n-$C_3H_7$ | $OCHF_2$ | H | H | F | F | |
| n-$C_4H_9$ | $OCHF_2$ | H | H | F | F | |
| n-$C_5H_{11}$ | $OCHF_2$ | H | H | F | F | |
| n-$C_6H_{13}$ | $OCHF_2$ | H | H | F | F | |
| H | $OCHF_2$ | F | H | F | F | |
| $CH_3$ | $OCHF_2$ | F | H | F | F | |
| $C_2H_5$ | $OCHF_2$ | F | H | F | F | |
| n-$C_3H_7$ | $OCHF_2$ | F | H | F | F | |
| n-C4H9 | $OOHF_2$ | F | H | F | F | |
| n-$C_5H_{11}$ | $OCHF_2$ | F | H | F | F | |
| n-$C_6H_{13}$ | $OCHF_2$ | F | H | F | F | |
| H | $OCHF_2$ | F | F | F | F | |
| $CH_3$ | $OCHF_2$ | F | F | F | F | |
| $C_2H_5$ | $OCHF_2$ | F | F | F | F | |
| n-$C_3H_7$ | $OCHF_2$ | F | F | F | F | |
| n-$C_4H_9$ | $OCHF_2$ | F | F | F | F | |
| n-$C_5H_{11}$ | $OCHF_2$ | F | F | F | F | |
| n-$C_6H_{13}$ | $OCHF_2$ | F | F | F | F | |
| H | $OCHFCF_3$ | H | H | F | F | |
| $CH_3$ | $OCHFCF_3$ | H | H | F | F | |
| $C_2H_5$ | $OCHFCF_3$ | H | H | F | F | |

-continued

| $R^1$ | X | $L^1$ | $L^2$ | $L^3$ | $L^4$ | |
|---|---|---|---|---|---|---|
| n-$C_3H_7$ | $OCHFCF_3$ | H | H | F | F | |
| n-$C_4H_9$ | $OCHFCF_3$ | H | H | F | F | |
| n-$C_5H_{11}$ | $OCHFCF_3$ | H | H | F | F | |
| n-$C_6H_{13}$ | $OCHFCF_3$ | H | H | F | F | |
| H | $OCHFCF_3$ | F | H | F | F | |
| $CH_3$ | $OCHFCF_3$ | F | H | F | F | |
| $C_2H_5$ | $OCHFCF_3$ | F | H | F | F | |
| n-$C_3H_7$ | $OCHFCF_3$ | F | H | F | F | |
| n-$C_4H_9$ | $OCHFCF_3$ | F | H | F | F | |
| n-$C_5H_{11}$ | $OCHFCF_3$ | F | H | F | F | |
| n-$C_6H_{13}$ | $OCHFCF_3$ | F | H | F | F | |
| H | $OCHFCF_3$ | F | F | F | F | |
| $CH_3$ | $OCHFCF_3$ | F | F | F | F | |
| $C_2H_5$ | $OCHFCF_3$ | F | F | F | F | |
| n-$C_3H_7$ | $OCHFCF_3$ | F | F | F | F | |
| n-$C_4H_9$ | $OCHFCF_3$ | F | F | F | F | |
| n-$C_5H_{11}$ | $OCHFCF_3$ | F | F | F | F | |
| n-$C_6H_{13}$ | $OCHFCF_3$ | F | F | F | F | |
| H | $OCHFCF_3$ | H | H | F | F | |
| $CH_3$ | $OCHFCF_3$ | H | H | F | F | |
| $C_2H_5$ | $OCHFCF_3$ | H | H | F | F | |
| n-$C_3H_7$ | $OCHFCF_3$ | H | H | F | F | |
| n-$C_4H_9$ | $OCHFCF_3$ | H | H | F | F | |
| n-$C_5H_{11}$ | $OCHFCF_3$ | H | H | F | F | |
| n-$C_6H_{13}$ | $OCHFCF_3$ | H | H | F | F | |
| H | $OCHFCF_3$ | F | H | F | F | |
| $CH_3$ | $OCHFCF_3$ | F | H | F | F | |
| $C_2H_5$ | $OCHFCF_3$ | F | H | F | F | |
| n-$C_3H_7$ | $OCHFCF_3$ | F | H | F | F | |
| n-$C_4H_9$ | $OCHFCF_3$ | F | H | F | F | |
| n-$C_5H_{11}$ | $OCHFCF_3$ | F | H | F | F | |
| n-$C_6H_{13}$ | $OCHFCF_3$ | F | H | F | F | |
| H | $OCHFCF_3$ | F | F | F | F | |
| $CH_3$ | $OCHFCF_3$ | F | F | F | F | |
| $C_2H_5$ | $OCHFCF_3$ | F | F | F | F | |
| n-$C_3H_7$ | $OCHFCF_3$ | F | F | F | F | |
| n-$C_4H_9$ | $OCHFCF_3$ | F | F | F | F | |
| n-$C_5H_{11}$ | $OCHFCF_3$ | F | F | F | F | |
| n-$C_6H_{13}$ | $OCHFCF_3$ | F | F | F | F | |
| H | $OCF_2CHFCF_3$ | H | H | F | F | |
| $CH_3$ | $OCF_2CHFCF_3$ | H | H | F | F | |
| $C_2H_5$ | $OCF_2CHFCF_3$ | H | H | F | F | |
| n-$C_3H_7$ | $OCF_2CHFCF_3$ | H | H | F | F | |
| n-$C_4H_9$ | $OCF_2CHFCF_3$ | H | H | F | F | |
| n-$C_5H_{11}$ | $OCF_2CHFCF_3$ | H | H | F | F | |
| n-$C_6H_{13}$ | $OCF_2CHFCF_3$ | H | H | F | F | |
| H | $OCF_2CHFCF_3$ | F | H | F | F | |
| $CH_3$ | $OCF_2CHFCF_3$ | F | H | F | F | |
| $C_2H_5$ | $OCF_2CHFCF_3$ | F | H | F | F | |
| n-$C_3H_7$ | $OCF_2CHFCF_3$ | F | H | F | F | |
| n-$C_4H_9$ | $OCF_2CHFCF_3$ | F | H | F | F | |
| n-$C_5H_{11}$ | $OCF_2CHFCF_3$ | F | H | F | F | |
| n-$C_6H_{13}$ | $OCF_2CHFCF_3$ | F | H | F | F | |
| H | $OCF_2CHFCF_3$ | F | F | F | F | |
| $CH_3$ | $OCF_2CHFCF_3$ | F | F | F | F | |
| $C_2H_5$ | $OCF_2CHFCF_3$ | F | F | F | F | |
| n-$C_3H_7$ | $OCF_2CHFCF_3$ | F | F | F | F | |
| n-$C_4H_9$ | $OCF_2CHFCF_3$ | F | F | F | F | |
| n-$C_5H_{11}$ | $OCF_2CHFCF_3$ | F | F | F | F | |
| n-$C_6H_{13}$ | $OCF_2CHFCF_3$ | F | F | F | F | |
| H | NCS | H | H | F | F | |
| $CH_3$ | NCS | H | H | F | F | |
| $C_2H_5$ | NCS | H | H | F | F | |
| n-$C_3H_7$ | NCS | H | H | F | F | C 107 N 185.5 I; $\Delta\epsilon = 31.4$; $\Delta n = 0.2052$ |
| n-$C_4H_9$ | NCS | H | H | F | F | |
| n-$C_5H_{11}$ | NCS | H | H | F | F | |
| n-$C_6H_{13}$ | NCS | H | H | F | F | |
| H | NCS | F | H | F | F | |
| $CH_3$ | NCS | F | H | F | F | |
| $C_2H_5$ | NCS | F | H | F | F | |
| n-$C_3H_7$ | NCS | F | H | F | F | |
| n-$C_4H_9$ | NCS | F | H | F | F | |
| n-$C_5H_{11}$ | NCS | F | H | F | F | |
| n-$C_6H_{13}$ | NCS | F | H | F | F | |
| H | NCS | F | F | F | F | |
| $CH_3$ | NCS | F | F | F | F | |

-continued

| $R^1$ | X | $L^1$ | $L^2$ | $L^3$ | $L^4$ | |
|---|---|---|---|---|---|---|
| $C_2H_5$ | NCS | F | F | F | F | |
| n-$C_3H_7$ | NCS | F | F | F | F | |
| n-$C_4H_9$ | NCS | F | F | F | F | |
| n-$C_5H_{11}$ | NCS | F | F | F | F | |
| n-$C_6H_{13}$ | NCS | F | F | F | F | |
| H | $C_2F_5$ | H | H | F | F | |
| $CH_3$ | $C_2F_5$ | H | H | F | F | |
| $C_2H_5$ | $C_2F_5$ | H | H | F | F | |
| n-$C_3H_7$ | $C_2F_5$ | H | H | F | F | |
| n-$C_4H_9$ | $C_2F_5$ | H | H | F | F | |
| n-$C_5H_{11}$ | $C_2F_5$ | H | H | F | F | |
| n-$C_6H_{13}$ | $C_2F_5$ | H | H | F | F | |
| H | $C_2F_5$ | F | H | F | F | |
| $CH_3$ | $C_2F_5$ | F | H | F | F | |
| $C_2H_5$ | $C_2F_5$ | F | H | F | F | |
| n-$C_3H_7$ | $C_2F_5$ | F | H | F | F | |
| n-$C_4H_9$ | $C_2F_5$ | F | H | F | F | |
| n-$C_5H_{11}$ | $C_2F_5$ | F | H | F | F | |
| n-$C_6H_{13}$ | $C_2F_5$ | F | H | F | F | |
| H | $C_2F_5$ | F | F | F | F | |
| $CH_3$ | $C_2F_5$ | F | F | F | F | |
| $C_2H_5$ | $C_2F_5$ | F | F | F | F | |
| n-$C_3H_7$ | $C_2F_5$ | F | F | F | F | |
| n-$C_4H_9$ | $C_2F_5$ | F | F | F | F | |
| n-$C_5H_{11}$ | $C_2F_5$ | F | F | F | F | |
| n-$C_6H_{13}$ | $C_2F_5$ | F | F | F | F | |
| H | $C_3F_7$ | H | H | F | F | |
| $CH_3$ | $C_3F_7$ | H | H | F | F | |
| $C_2H_5$ | $C_3F_7$ | H | H | F | F | |
| n-$C_3H_7$ | $C_3F_7$ | H | H | F | F | |
| n-$C_4H_9$ | $C_3F_7$ | H | H | F | F | |
| n-$C_5H_{11}$ | $C_3F_7$ | H | H | F | F | |
| n-$C_6H_{13}$ | $C_3F_7$ | H | H | F | F | |
| H | $C_3F_7$ | F | H | F | F | |
| $CH_3$ | $C_3F_7$ | F | H | F | F | |
| $C_2H_5$ | $C_3F_7$ | F | H | F | F | |
| n-$C_3H_7$ | $C_3F_7$ | F | H | F | F | |
| n-$C_4H_9$ | $C_3F_7$ | F | H | F | F | |
| n-$C_5H_{11}$ | $C_3F_7$ | F | H | F | F | |
| n-$C_6H_{13}$ | $C_3F_7$ | F | H | F | F | |
| H | $C_3F_7$ | F | F | F | F | |
| $CH_3$ | $C_3F_7$ | F | F | F | F | |
| $C_2H_5$ | $C_3F_7$ | F | F | F | F | |
| n-$C_3H_7$ | $C_3F_7$ | F | F | F | F | |
| n-$C_4H_9$ | $C_3F_7$ | F | F | F | F | |
| n-$C_5H_{11}$ | $C_3F_7$ | F | F | F | F | |
| n-$C_6H_{13}$ | $C_3F_7$ | F | F | F | F | |
| H | $SF_5$ | H | H | F | F | |
| $CH_3$ | $SF_5$ | H | H | F | F | |
| $C_2H_5$ | $SF_5$ | H | H | F | F | |
| n-$C_3H_7$ | $SF_5$ | H | H | F | F | |
| n-$C_4H_9$ | $SF_5$ | H | H | F | F | |
| n-$C_5H_{11}$ | $SF_5$ | H | H | F | F | |
| n-$C_6H_{13}$ | $SF_5$ | H | H | F | F | |
| H | $SF_5$ | F | H | F | F | |
| $CH_3$ | $SF_5$ | F | H | F | F | |
| $C_2H_5$ | $SF_5$ | F | H | F | F | |
| n-$C_3H_7$ | $SF_5$ | F | H | F | F | |
| n-$C_4H_9$ | $SF_5$ | F | H | F | F | |
| n-$C_5H_{11}$ | $SF_5$ | F | H | F | F | |
| n-$C_6H_{13}$ | $SF_5$ | F | H | F | F | |
| H | $SF_5$ | F | F | F | F | |
| $CH_3$ | $SF_5$ | F | F | F | F | |
| $C_2H_5$ | $SF_5$ | F | F | F | F | |
| n-$C_3H_7$ | $SF_5$ | F | F | F | F | C 110 N (83.4) I; $\Delta\epsilon = 33.8$; $\Delta n = 0.1211$ |
| n-$C_4H_9$ | $SF_5$ | F | F | F | F | |
| n-$C_5H_{11}$ | $SF_5$ | F | F | F | F | |
| n-$C_6H_{13}$ | $SF_5$ | F | F | F | F | |
| H | CN | H | H | F | F | |
| $CH_3$ | CN | H | H | F | F | |
| $C_2H_5$ | CN | H | H | F | F | |
| n-$C_3H_7$ | CN | H | H | F | F | |
| n-$C_4H_9$ | CN | H | H | F | F | |
| n-$C_5H_{11}$ | CN | H | H | F | F | |
| n-$C_6H_{13}$ | CN | H | H | F | F | |
| H | CN | F | H | F | F | |

-continued

| $R^1$ | X | $L^1$ | $L^2$ | $L^3$ | $L^4$ | |
|---|---|---|---|---|---|---|
| $CH_3$ | CN | F | H | F | F | |
| $C_2H_5$ | CN | F | H | F | F | |
| n-$C_3H_7$ | CN | F | H | F | F | |
| n-$C_4H_9$ | CN | F | H | F | F | |
| n-$C_5H_{11}$ | CN | F | H | F | F | |
| n-$C_6H_{13}$ | CN | F | H | F | F | |
| H | CN | F | F | F | F | |
| $CH_3$ | CN | F | F | F | F | |
| $C_2H_5$ | CN | F | F | F | F | C 98 $N_{Re}$ (71) $S_C$ (84) N 127.6 I $\Delta\epsilon$ = 67.8; $\Delta n$ = 0.1459 |
| n-$C_3H_7$ | CN | F | F | F | F | C 75 $S_c$? (65) N 144.1 I $\Delta n$ = 0.1561; $\Delta\epsilon$ = 66.5 |
| n-$C_4H_9$ | CN | F | F | F | F | C 79 N 139.3 I; $\Delta\epsilon$ = 64.2; $\Delta n$ = 0.1477 |
| n-$C_5H_{11}$ | CN | F | F | F | F | C 65 $S_C$ (44) N 141.5 I; $\Delta\epsilon$ = 61.8; $\Delta n$ = 0.1490 |
| n-$C_6H_{13}$ | CN | F | F | F | F | |
| n-$C_7H_{15}$ | CN | F | F | F | F | C 51 N 130.8 I; $\Delta\epsilon$ = 58.4; $\Delta n$ = 0.1459 |
| H | $CF_3$ | H | H | F | F | |
| $C_2H_5$ | $CF_3$ | H | H | F | F | |
| n-$C_3H_7$ | $CF_3$ | H | H | F | F | C 95 N (87.5) I; $\Delta\epsilon$ = 31.5; $\Delta n$ = 0.1330 |
| n-$C_4H_9$ | $CF_3$ | H | H | F | F | |
| n-$C_5H_{11}$ | $CF_3$ | H | H | F | F | |
| n-$C_6H_{13}$ | $CF_3$ | H | H | F | F | |
| $CH_2$=CH | $CF_3$ | H | H | F | F | |
| H | $CF_3$ | F | F | F | F | |
| $C_2H_5$ | $CF_3$ | F | F | F | F | |
| n-$C_3H_7$ | $CF_3$ | F | F | F | F | C 91 I; $\Delta n$ = 0.1190; $\Delta\epsilon$ = 40.8 |
| n-$C_4H_9$ | $CF_3$ | F | F | F | F | |
| n-$C_5H_{11}$ | $CF_3$ | F | F | F | F | |
| n-$C_6H_{13}$ | $CF_3$ | F | F | F | F | |
| $CH_2$=CH | $CF_3$ | F | F | F | F | |
| H | F | H | H | F | F | |
| $C_2H_5$ | F | H | H | F | F | |
| n-$C_3H_7$ | F | H | H | F | F | |
| n-$C_4H_9$ | F | H | H | F | F | |
| n-$C_5H_{11}$ | F | H | H | F | F | |
| n-$C_6H_{13}$ | F | H | H | F | F | |
| $CH_2$=CH | F | H | H | F | F | |

EXAMPLE 3

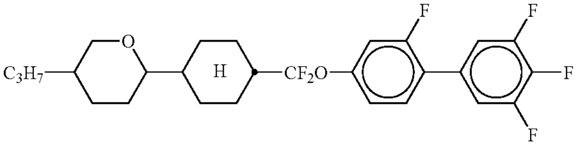

Step 3.1

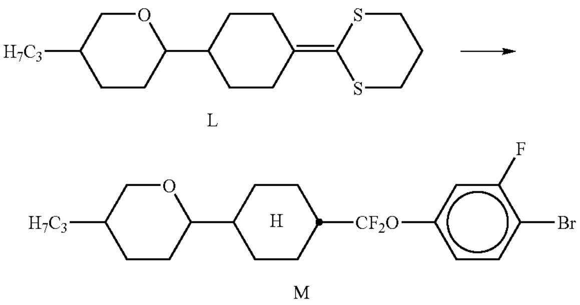

62.7 mmol of trifluoromethanesulfonic acid are added dropwise at −20° C. to a solution of 61.2 mmol of L in 500 ml of $CH_2Cl_2$. The mixture is allowed to come to room temperature for 30 minutes and then cooled to −70° C. Firstly a solution of 91 mmol of 4-bromo-3-fluorophenol and 101 mmol of triethylamine in 200 ml of $CH_2Cl_2$ and 5 minutes later 310 mmol of triethylamine tris(hydrofluoride) are then added. After a further 5 minutes, a suspension of 315 mmol of 1,3-dibromo-5,5-dimethylhydanthoin is added in small portions, and the mixture is stirred at −70° C. for a further 1 hour. The reaction mixture is allowed to come to −10° C. and is poured into ice-cold NaOH. The mixture is subjected to conventional aqueous work-up, and the crude product is purified by chromatography on silica gel (heptane/MTB ether 4:1) and crystallisation from ethanol at −20° C.

Step 3.2

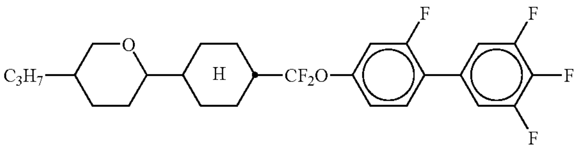

A mixture of 50 mmol of M, 50 mmol of 3,4,5-trifluorobenzeneboronic acid, 2.5 mmol of $Pd(PPh_3)_4$, 300 ml of toluene and 300 ml of Na borate buffer (pH=9) is stirred at 80° C. for 18 hours. The mixture is poured into 500 ml of 0.1 N HCl, and the product is extracted with $CH_2Cl_2$, dried over $Na_2SO_4$ and evaporated to dryness in a rotary evaporator. The crude product is chromatographed over silica gel in n-heptane and subsequently recrystallised from n-heptane at −20° C. C 61 N 191.8 l; $\Delta n$=0.1220; $\Delta\epsilon$=19.1

The following compounds of the formula

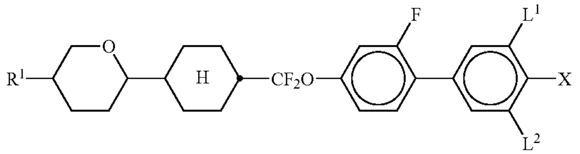

are prepared analogously:

| $R^1$ | X | $L^1$ | $L^2$ | |
|---|---|---|---|---|
| H | F | H | H | |
| $CH_3$ | F | H | H | |
| $C_2H_5$ | F | H | H | |
| n-$C_3H_7$ | F | H | H | C 84 N 232.4 I; $\Delta\epsilon$ = 9.4; $\Delta n$ = 0.1390 |
| n-$C_4H_9$ | F | H | H | |
| n-$C_5H_{11}$ | F | H | H | |
| n-$C_6H_{13}$ | F | H | H | |
| H | F | F | H | |
| $CH_3$ | F | F | H | |
| $C_2H_5$ | F | F | H | |
| n-$C_3H_7$ | F | F | H | C 44 $S_M$? 45 N 212.6 I; $\Delta\epsilon$ = 13.4; $\Delta n$ = 0.1328 |
| n-$C_4H_9$ | F | F | H | |
| n-$C_5H_{11}$ | F | F | H | |
| n-$C_6H_{13}$ | F | F | H | |
| H | F | F | F | |
| $CH_3$ | F | F | F | |
| $C_2H_5$ | F | F | F | |
| n-$C_4H_9$ | F | F | F | |
| n-$C_5H_{11}$ | F | F | F | |
| n-$C_6H_{13}$ | F | F | F | |
| H | Cl | H | H | |
| $CH_3$ | Cl | H | H | |
| $C_2H_5$ | Cl | H | H | |
| n-$C_3H_7$ | Cl | H | H | |
| n-$C_4H_9$ | Cl | H | H | |

-continued

| $R^1$ | X | $L^1$ | $L^2$ |
|---|---|---|---|
| n-$C_5H_{11}$ | Cl | H | H |
| n-$C_6H_{13}$ | Cl | H | H |
| H | Cl | F | H |
| $CH_3$ | Cl | F | H |
| $C_2H_5$ | Cl | F | H |
| n-$C_3H_7$ | Cl | F | H |
| n-$C_4H_9$ | Cl | F | H |
| n-$C_5H_{11}$ | Cl | F | H |
| n-$C_6H_{13}$ | Cl | F | H |
| H | Cl | F | F |
| $CH_3$ | Cl | F | F |
| $C_2H_5$ | Cl | F | F |
| n-$C_3H_7$ | Cl | F | F |
| n-$C_4H_9$ | Cl | F | F |
| n-$C_5H_{11}$ | Cl | F | F |
| n-$C_6H_{13}$ | Cl | F | F |
| H | $OCF_3$ | H | H |
| $CH_3$ | $OCF_3$ | H | H |
| $C_2H_5$ | $OCF_3$ | H | H |
| n-$C_3H_7$ | $OCF_3$ | H | H |
| n-$C_4H_9$ | $OCF_3$ | H | H |
| n-$C_5H_{11}$ | $OCF_3$ | H | H |
| n-$C_6H_{13}$ | $OCF_3$ | H | H |
| H | $OCF_3$ | F | H |
| $CH_3$ | $OCF_3$ | F | H |
| $C_2H_5$ | $OCF_3$ | F | H |
| n-$C_3H_7$ | $OCF_3$ | F | H |
| n-$C_4H_9$ | $OCF_3$ | F | H |
| n-$C_5H_{11}$ | $OCF_3$ | F | H |
| n-$C_6H_{13}$ | $OCF_3$ | F | H |
| H | $OCF_3$ | F | F |
| $CH_3$ | $OCF_3$ | F | F |
| $C_2H_5$ | $OCF_3$ | F | F |
| n-$C_3H_7$ | $OCF_3$ | F | F |
| n-$C_4H_9$ | $OCF_3$ | F | F |
| n-$C_5H_{11}$ | $OCF_3$ | F | F |
| n-$C_6H_{13}$ | $OCF_3$ | F | F |
| H | $OCHF_2$ | H | H |
| $CH_3$ | $OCHF_2$ | H | H |
| $C_2H_5$ | $OCHF_2$ | H | H |
| n-$C_3H_7$ | $OCHF_2$ | H | H |
| n-$C_4H_9$ | $OCHF_2$ | H | H |
| n-$C_5H_{11}$ | $OCHF_2$ | H | H |
| n-$C_6H_{13}$ | $OCHF_2$ | H | H |
| H | $OCHF_2$ | F | H |
| $CH_3$ | $OCHF_2$ | F | H |
| $C_2H_5$ | $OCHF_2$ | F | H |
| n-$C_3H_7$ | $OCHF_2$ | F | H |
| n-$C_4H_9$ | $OCHF_2$ | F | H |
| n-$C_5H_{11}$ | $OCHF_2$ | F | H |
| n-$C_6H_{13}$ | $OCHF_2$ | F | H |
| H | $OCHF_2$ | F | F |
| $CH_3$ | $OCHF_2$ | F | F |
| $C_2H_5$ | $OCHF_2$ | F | F |
| n-$C_3H_7$ | $OCHF_2$ | F | F |
| n-$C_4H_9$ | $OCHF_2$ | F | F |
| n-$C_5H_{11}$ | $OCHF_2$ | F | F |
| n-$C_6H_{13}$ | $OCHF_2$ | F | F |
| H | $OCHFCF_3$ | H | H |
| $CH_3$ | $OCHFCF_3$ | H | H |
| $C_2H_5$ | $OCHFCF_3$ | H | H |
| n-$C_3H_7$ | $OCHFCF_3$ | H | H |
| n-$C_4H_9$ | $OCHFCF_3$ | H | H |
| n-$C_5H_{11}$ | $OCHFCF_3$ | H | H |
| n-$C_6H_{13}$ | $OCHFCF_3$ | H | H |
| H | $OCHFCF_3$ | F | H |
| $CH_3$ | $OCHFCF_3$ | F | H |
| $C_2H_5$ | $OCHFCF_3$ | F | H |
| n-$C_3H_7$ | $OCHFCF_3$ | F | H |
| n-$C_4H_9$ | $OCHFCF_3$ | F | H |
| n-$C_5H_{11}$ | $OCHFCF_3$ | F | H |
| n-$C_6H_{13}$ | $OCHFCF_3$ | F | H |
| H | $OCHFCF_3$ | F | F |
| $CH_3$ | $OCHFCF_3$ | F | F |
| $C_2H_5$ | $OCHFCF_3$ | F | F |
| n-$C_3H_7$ | $OCHFCF_3$ | F | F |
| n-$C_4H_9$ | $OCHFCF_3$ | F | F |

-continued

| $R^1$ | X | $L^1$ | $L^2$ |
|---|---|---|---|
| n-$C_5H_{11}$ | $OCHFCF_3$ | F | F |
| n-$C_6H_{13}$ | $OCHFCF_3$ | F | F |
| H | $OCHFCF_3$ | H | H |
| $CH_3$ | $OCHFCF_3$ | H | H |
| $C_2H_5$ | $OCHFCF_3$ | H | H |
| n-$C_3H_7$ | $OCHFCF_3$ | H | H |
| n-$C_4H_9$ | $OCHFCF_3$ | H | H |
| n-$C_5H_{11}$ | $OCHFCF_3$ | H | H |
| n-$C_6H_{13}$ | $OCHFCF_3$ | H | H |
| H | $OCHFCF_3$ | F | H |
| $CH_3$ | $OCHFCF_3$ | F | H |
| $C_2H_5$ | $OCHFCF_3$ | F | H |
| n-$C_3H_7$ | $OCHFCF_3$ | F | H |
| n-$C_4H_9$ | $OCHFCF_3$ | F | H |
| n-$C_5H_{11}$ | $OCHFCF_3$ | F | H |
| n-$C_6H_{13}$ | $OCHFCF_3$ | F | H |
| H | $OCHFCF_3$ | F | F |
| $CH_3$ | $OCHFCF_3$ | F | F |
| $C_2H_5$ | $OCHFCF_3$ | F | F |
| n-$C_3H_7$ | $OCHFCF_3$ | F | F |
| n-$C_4H_9$ | $OCHFCF_3$ | F | F |
| n-$C_5H_{11}$ | $OCHFCF_3$ | F | F |
| n-$C_6H_{13}$ | $OCHFCF_3$ | F | F |
| H | $OCF_2CHFCF_3$ | H | H |
| $CH_3$ | $OCF_2CHFCF_3$ | H | H |
| $C_2H_5$ | $OCF_2CHFCF_3$ | H | H |
| n-$C_3H_7$ | $OCF_2CHFCF_3$ | H | H |
| n-$C_4H_9$ | $OCF_2CHFCF_3$ | H | H |
| n-$C_5H_{11}$ | $OCF_2CHFCF_3$ | H | H |
| n-$C_6H_{13}$ | $OCF_2CHFCF_3$ | H | H |
| H | $OCF_2CHFCF_3$ | F | H |
| $CH_3$ | $OCF_2CHFCF_3$ | F | H |
| $C_2H_5$ | $OCF_2CHFCF_3$ | F | H |
| n-$C_3H_7$ | $OCF_2CHFCF_3$ | F | H |
| n-$C_4H_9$ | $OCF_2CHFCF_3$ | F | H |
| n-$C_5H_{11}$ | $OCF_2CHFCF_3$ | F | H |
| n-$C_6H_{13}$ | $OCF_2CHFCF_3$ | F | H |
| H | $OCF_2CHFCF_3$ | F | F |
| $CH_3$ | $OCF_2CHFCF_3$ | F | F |
| $C_2H_5$ | $OCF_2CHFCF_3$ | F | F |
| n-$C_3H_7$ | $OCF_2CHFCF_3$ | F | F |
| n-$C_4H_9$ | $OCF_2CHFCF_3$ | F | F |
| n-$C_5H_{11}$ | $OCF_2CHFCF_3$ | F | F |
| n-$C_6H_{13}$ | $OCF_2CHFCF_3$ | F | F |
| H | NCS | H | H |
| $CH_3$ | NCS | H | H |
| $C_2H_5$ | NCS | H | H |
| n-$C_3H_7$ | NCS | H | H |
| n-$C_4H_9$ | NCS | H | H |
| n-$C_5H_{11}$ | NCS | H | H |
| n-$C_6H_{13}$ | NCS | H | H |
| H | NCS | F | H |
| $CH_3$ | NCS | F | H |
| $C_2H_5$ | NCS | F | H |
| n-$C_3H_7$ | NCS | F | H |
| n-$C_4H_9$ | NCS | F | H |
| n-$C_5H_{11}$ | NCS | F | H |
| n-$C_6H_{13}$ | NCS | F | H |
| H | NCS | F | F |
| $CH_3$ | NCS | F | F |
| $C_2H_5$ | NCS | F | F |
| n-$C_3H_7$ | NCS | F | F |
| n-$C_4H_9$ | NCS | F | F |
| n-$C_5H_{11}$ | NCS | F | F |
| n-$C_6H_{13}$ | NCS | F | F |
| H | $C_2F_5$ | H | H |
| $CH_3$ | $C_2F_5$ | H | H |
| $C_2H_5$ | $C_2F_5$ | H | H |
| n-$C_3H_7$ | $C_2F_5$ | H | H |
| n-$C_4H_9$ | $C_2F_5$ | H | H |
| n-$C_5H_{11}$ | $C_2F_5$ | H | H |
| n-$C_6H_{13}$ | $C_2F_5$ | H | H |
| H | $C_2F_5$ | F | H |
| $CH_3$ | $C_2F_5$ | F | H |
| $C_2H_5$ | $C_2F_5$ | F | H |
| n-$C_3H_7$ | $C_2F_5$ | F | H |
| n-$C_4H_9$ | $C_2F_5$ | F | H |

-continued

| $R^1$ | X | $L^1$ | $L^2$ |
|---|---|---|---|
| $n\text{-}C_5H_{11}$ | $C_2F_5$ | F | H |
| $n\text{-}C_6H_{13}$ | $C_2F_5$ | F | H |
| H | $C_2F_5$ | F | F |
| $CH_3$ | $C_2F_5$ | F | F |
| $C_2H_5$ | $C_2F_5$ | F | F |
| $n\text{-}C_3H_7$ | $C_2F_5$ | F | F |
| $n\text{-}C_4H_9$ | $C_2F_5$ | F | F |
| $n\text{-}C_5H_{11}$ | $C_2F_5$ | F | F |
| $n\text{-}C_6H_{13}$ | $C_2F_5$ | F | F |
| H | $C_3F_7$ | H | H |
| $CH_3$ | $C_3F_7$ | H | H |
| $C_2H_5$ | $C_3F_7$ | H | H |
| $n\text{-}C_3H_7$ | $C_3F_7$ | H | H |
| $n\text{-}C_4H_9$ | $C_3F_7$ | H | H |
| $n\text{-}C_5H_{11}$ | $C_3F_7$ | H | H |
| $n\text{-}C_6H_{13}$ | $C_3F_7$ | H | H |
| H | $C_3F_7$ | F | H |
| $CH_3$ | $C_3F_7$ | F | H |
| $C_2H_5$ | $C_3F_7$ | F | H |
| $n\text{-}C_3H_7$ | $C_3F_7$ | F | H |
| $n\text{-}C_4H_9$ | $C_3F_7$ | F | H |
| $n\text{-}C_5H_{11}$ | $C_3F_7$ | F | H |
| $n\text{-}C_6H_{13}$ | $C_3F_7$ | F | H |
| H | $C_3H_7$ | F | F |
| $CH_3$ | $C_3F_7$ | F | F |
| $C_2H_5$ | $C_3F_7$ | F | F |
| $n\text{-}C_3H_7$ | $C_3F_7$ | F | F |
| $n\text{-}C_4H_9$ | $C_3F_7$ | F | F |
| $n\text{-}C_5H_{11}$ | $C_3F_7$ | F | F |
| $n\text{-}C_6H_{13}$ | $C_3F_7$ | F | F |
| H | $SF_5$ | H | H |
| $CH_3$ | $SF_5$ | H | H |
| $C_2H_5$ | $SF_5$ | H | H |
| $n\text{-}C_3H_7$ | $SF_5$ | H | H |
| $n\text{-}C_4H_9$ | $SF_5$ | H | H |
| $n\text{-}C_5H_{11}$ | $SF_5$ | H | H |
| $n\text{-}C_6H_{13}$ | $SF_5$ | H | H |
| H | $SF_5$ | F | H |
| $CH_3$ | $SF_5$ | F | H |
| $C_2H_5$ | $SF_5$ | F | H |
| $n\text{-}C_3H_7$ | $SF_5$ | F | H |
| $n\text{-}C_4H_9$ | $SF_5$ | F | H |
| $n\text{-}C_5H_{11}$ | $SF_5$ | F | H |
| $n\text{-}C_6H_{13}$ | $SF_5$ | F | H |
| H | $SF_5$ | F | F |
| $CH_3$ | $SF_5$ | F | F |
| $C_2H_5$ | $SF_5$ | F | F |
| $n\text{-}C_3H_7$ | $SF_5$ | F | F |
| $n\text{-}C_4H_9$ | $SF_5$ | F | F |
| $n\text{-}C_5H_{11}$ | $SF_5$ | F | F |
| $n\text{-}C_6H_{13}$ | $SF_5$ | F | F |
| H | CN | H | H |
| $CH_3$ | CN | H | H |
| $C_2H_5$ | CN | H | H |
| $n\text{-}C_3H_7$ | CN | H | H |
| $n\text{-}C_4H_9$ | CN | H | H |
| $n\text{-}C_5H_{11}$ | CN | H | H |
| $n\text{-}C_6H_{13}$ | CN | H | H |
| H | CN | F | H |
| $CH_3$ | CN | F | H |
| $C_2H_5$ | CN | F | H |
| $n\text{-}C_3H_7$ | CN | F | H |
| $n\text{-}C_4H_9$ | CN | F | H |

EXAMPLE 4

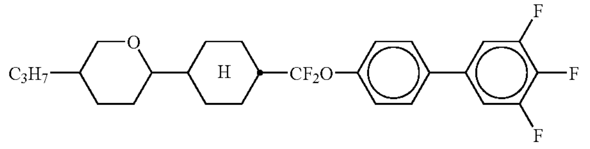

Step 4.1

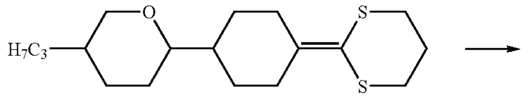

N

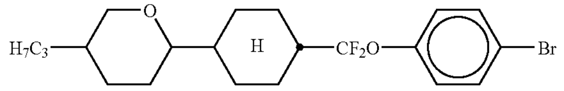

O 62.7 mmol of trifluoromethanesulfonic acid are added dropwise at −20° C. to a solution of 61.2 mmol of N in 500 ml of $CH_2Cl_2$.The mixture is allowed to come to room temperature for 30 minutes and is then cooled to −70° C. Then, firstly a solution of 91 mmol of 4-bromophenol and 101 mmol of triethylamine in 200 ml of $CH_2Cl_2$ and, 5 minutes later, 310 mmol of triethylamine tris(hydrofluoride) are added. After a further 5 minutes, a suspension of 315 mmol of 1,3-dibromo-5,5-dimethylhydanthoin is added in small portions, and the mixture is stirred at −70° C. for a further 1 hour. The reaction mixture is allowed to come to −10° C. and is poured into ice-cold NaOH. The mixture is subjected to conventional aqueous work-up, and the crude product is purified by chromatography on silica gel (heptane/MTB ether 4:1) and crystallization from ethanol at −20° C.

Step 4.2

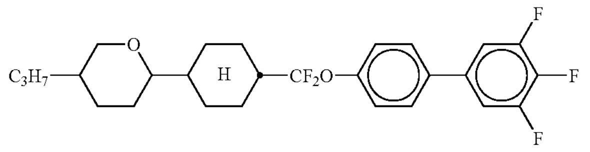

A mixture of 50 mmol of O, 50 mmol of 3,4,5-trifluorobenzeneboronic acid, 2.5 mmol of $Pd(PPh_3)_4$, 300 ml of toluene and 300 ml of Na borate buffer (pH=9) is stirred at 80° C. for 18 hours. The mixture is poured into 500 ml of 0.1 N HCl, the product is extracted with $CH_2Cl_2$, and the extracts are dried over $Na_2SO_4$ and evaporated to dryness in a rotary evaporator. The crude product is chromatographed over silica gel in n-heptane and subsequently recrystallized from n-heptane at −20° C. C 60 $S_B$ 81 N 206.6 I; $\Delta n$=0.1291; $\Delta\epsilon$=15.7

The following compounds of the formula

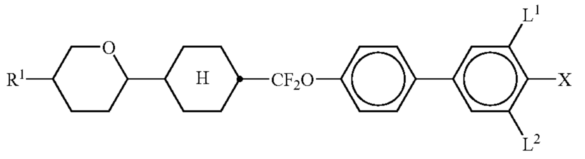

are prepared analogously:

| $R^1$ | X | $L^1$ | $L^2$ | |
|---|---|---|---|---|
| H | F | H | H | |
| $CH_3$ | F | H | H | |
| $C_2H_5$ | F | H | H | |
| n-$C_3H_7$ | F | H | H | |
| n-$C_4H_9$ | F | H | H | |
| n-$C_5H_{11}$ | F | H | H | |
| n-$C_6H_{13}$ | F | H | H | |
| H | F | F | H | |
| $CH_3$ | F | F | H | |
| $C_2H_5$ | F | F | H | |
| n-$C_3H_7$ | F | F | H | C 47 $S_B$ 91 N 238.0 I; $\Delta\epsilon$ = 10.7; $\Delta n$ = 0.1370 |
| n-$C_4H_9$ | F | F | H | |
| n-$C_5H_{11}$ | F | F | H | |
| n-$C_6H_{13}$ | F | F | H | |
| H | F | F | F | |
| $CH_3$ | F | F | F | |
| $C_2H_5$ | F | F | F | |
| n-$C_4H_9$ | F | F | F | |
| n-$C_5H_{11}$ | F | F | F | |
| n-$C_6H_{13}$ | F | F | F | |
| H | Cl | H | H | |
| $CH_3$ | Cl | H | H | |
| $C_2H_5$ | Cl | H | H | |
| n-$C_3H_7$ | Cl | H | H | |
| n-$C_4H_9$ | Cl | H | H | |
| n-$C_5H_{11}$ | Cl | H | H | |
| n-$C_6H_{13}$ | Cl | H | H | |
| H | Cl | F | H | |
| $CH_3$ | Cl | F | H | |
| $C_2H_5$ | Cl | F | H | |
| n-$C_3H_7$ | Cl | F | H | |
| n-$C_4H_9$ | Cl | F | H | |
| n-$C_5H_{11}$ | Cl | F | H | |
| n-$C_6H_{13}$ | Cl | F | H | |
| H | Cl | F | F | |
| $CH_3$ | Cl | F | F | |
| $C_2H_5$ | Cl | F | F | |
| n-$C_3H_7$ | Cl | F | F | |
| n-$C_4H_9$ | Cl | F | F | |
| n-$C_5H_{11}$ | Cl | F | F | |
| n-$C_6H_{13}$ | Cl | F | F | |
| H | $OCF_3$ | H | H | |
| $CH_3$ | $OCF_3$ | H | H | |
| $C_2H_5$ | $OCF_3$ | H | H | |
| n-$C_3H_7$ | $OCF_3$ | H | H | |
| n-$C_4H_9$ | $OCF_3$ | H | H | |
| n-$C_5H_{11}$ | $OCF_3$ | H | H | |
| n-$C_6H_{13}$ | $OCF_3$ | H | H | |
| H | $OCF_3$ | F | H | |
| $CH_3$ | $OCF_3$ | F | H | |
| $C_2H_5$ | $OCF_3$ | F | H | |
| n-$C_3H_7$ | $OCF_3$ | F | H | |
| n-$C_4H_9$ | $OCF_3$ | F | H | |
| n-$C_5H_{11}$ | $OCF_3$ | F | H | |
| n-$C_6H_{13}$ | $OCF_3$ | F | H | |
| H | $OCF_3$ | F | F | |
| $CH_3$ | $OCF_3$ | F | F | |
| $C_2H_5$ | $OCF_3$ | F | F | |
| n-$C_3H_7$ | $OCF_3$ | F | F | |
| n-$C_4H_9$ | $OCF_3$ | F | F | |
| n-$C_5H_{11}$ | $OCF_3$ | F | F | |
| n-$C_6H_{13}$ | $OCF_3$ | F | F | |
| H | $OCHF_2$ | H | H | |
| $CH_3$ | $OCHF_2$ | H | H | |
| $C_2H_5$ | $OCHF_2$ | H | H | |
| n-$C_3H_7$ | $OCHF_2$ | H | H | |
| n-$C_4H_9$ | $OCHF_2$ | H | H | |
| n-$C_5H_{11}$ | $OCHF_2$ | H | H | |
| n-$C_6H_{13}$ | $OCHF_2$ | H | H | |
| H | $OCHF_2$ | F | H | |
| $CH_3$ | $OCHF_2$ | F | H | |
| $C_2H_5$ | $OCHF_2$ | F | H | |
| n-$C_3H_7$ | $OCHF_2$ | F | H | |
| n-$C_4H_9$ | $OCHF_2$ | F | H | |
| n-$C_5H_{11}$ | $OCHF_2$ | F | H | |
| n-$C_6H_{13}$ | $OCHF_2$ | F | H | |

-continued

| $R^1$ | X | $L^1$ | $L^2$ |
|---|---|---|---|
| H | $OCHF_2$ | F | F |
| $CH_3$ | $OCHF_2$ | F | F |
| $C_2H_5$ | $OCHF_2$ | F | F |
| n-$C_3H_7$ | $OCHF_2$ | F | F |
| n-$C_4H_9$ | $OCHF_2$ | F | F |
| n-$C_5H_{11}$ | $OCHF_2$ | F | F |
| n-$C_6H_{13}$ | $OCHF_2$ | F | F |
| H | $OCHFCF_3$ | H | H |
| $CH_3$ | $OCHFCF_3$ | H | H |
| $C_2H_5$ | $OCHFCF_3$ | H | H |
| n-$C_3H_7$ | $OCHFCF_3$ | H | H |
| n-$C_4H_9$ | $OCHFCF_3$ | H | H |
| n-$C_5H_{11}$ | $OCHFCF_3$ | H | H |
| n-$C_6H_{13}$ | $OCHFCF_3$ | H | H |
| H | $OCHFCF_3$ | F | H |
| $CH_3$ | $OCHFCF_3$ | F | H |
| $C_2H_5$ | $OCHFCF_3$ | F | H |
| n-$C_3H_7$ | $OCHFCF_3$ | F | H |
| n-$C_4H_9$ | $OCHFCF_3$ | F | H |
| n-$C_5H_{11}$ | $OCHFCF_3$ | F | H |
| n-$C_6H_{13}$ | $OCHFCF_3$ | F | H |
| H | $OCHFCF_3$ | F | F |
| $CH_3$ | $OCHFCF_3$ | F | F |
| $C_2H_5$ | $OCHFCF_3$ | F | F |
| n-$C_3H_7$ | $OCHFCF_3$ | F | F |
| n-$C_4H_9$ | $OCHFCF_3$ | F | F |
| n-$C_5H_{11}$ | $OCHFCF_3$ | F | F |
| n-$C_6H_{13}$ | $OCHFCF_3$ | F | F |
| H | $OCHFCF_3$ | H | H |
| $CH_3$ | $OCHFCF_3$ | H | H |
| $C_2H_5$ | $OCHFCF_3$ | H | H |
| n-$C_3H_7$ | $OCHFCF_3$ | H | H |
| n-$C_4H_9$ | $OCHFCF_3$ | H | H |
| n-$C_5H_{11}$ | $OCHFCF_3$ | H | H |
| n-$C_6H_{13}$ | $OCHFCF_3$ | H | H |
| H | $OCHFCF_3$ | F | H |
| $CH_3$ | $OCHFCF_3$ | F | H |
| $C_2H_5$ | $OCHFCF_3$ | F | H |
| n-$C_3H_7$ | $OCHFCF_3$ | F | H |
| n-$C_4H_9$ | $OCHFCF_3$ | F | H |
| n-$C_5H_{11}$ | $OCHFCF_3$ | F | H |
| n-$C_6H_{13}$ | $OCHFCF_3$ | F | H |
| H | $OCHFCF_3$ | F | F |
| $CH_3$ | $OCHFCF_3$ | F | F |
| $C_2H_5$ | $OCHFCF_3$ | F | F |
| n-$C_3H_7$ | $OCHFCF_3$ | F | F |
| n-$C_4H_9$ | $OCHFCF_3$ | F | F |
| n-$C_5H_{11}$ | $OCHFCF_3$ | F | F |
| n-$C_6H_{13}$ | $OCHFCF_3$ | F | F |
| H | $OCF_2CHFCF_3$ | H | H |
| $CH_3$ | $OCF_2CHFCF_3$ | H | H |
| $C_2H_5$ | $OCF_2CHFCF_3$ | H | H |
| n-$C_3H_7$ | $OCF_2CHFCF_3$ | H | H |
| n-$C_4H_9$ | $OCF_2CHFCF_3$ | H | H |
| n-$C_5H_{11}$ | $OCF_2CHFCF_3$ | H | H |
| n-$C_6H_{13}$ | $OCF_2CHFCF_3$ | H | H |
| H | $OCF_2CHFCF_3$ | F | H |
| $CH_3$ | $OCF_2CHFCF_3$ | F | H |
| $C_2H_5$ | $OCF_2CHFCF_3$ | F | H |
| n-$C_3H_7$ | $OCF_2CHFCF_3$ | F | H |
| n-$C_4H_9$ | $OCF_2CHFCF_3$ | F | H |
| n-$C_5H_{11}$ | $OCF_2CHFCF_3$ | F | H |
| n-$C_6H_{13}$ | $OCF_2CHFCF_3$ | F | H |
| H | $OCF_2CHFCF_3$ | F | F |
| $CH_3$ | $OCF_2CHFCF_3$ | F | F |
| $C_2H_5$ | $OCF_2CHFCF_3$ | F | F |
| n-$C_3H_7$ | $OCF_2CHFCF_3$ | F | F |
| n-$C_4H_9$ | $OCF_2CHFCF_3$ | F | F |
| n-$C_5H_{11}$ | $OCF_2CHFCF_3$ | F | F |
| n-$C_6H_{13}$ | $OCF_2CHFCF_3$ | F | F |
| H | NCS | H | H |
| $CH_3$ | NCS | H | H |
| $C_2H_5$ | NCS | H | H |
| n-$C_3H_7$ | NCS | H | H |
| n-$C_4H_9$ | NCS | H | H |
| n-$C_5H_{11}$ | NCS | H | H |
| n-$C_6H_{13}$ | NCS | H | H |

-continued

| $R^1$ | X | $L^1$ | $L^2$ |
|---|---|---|---|
| H | NCS | F | H |
| $CH_3$ | NCS | F | H |
| $C_2H_5$ | NCS | F | H |
| n-$C_3H_7$ | NCS | F | H |
| n-$C_4H_9$ | NCS | F | H |
| n-$C_5H_{11}$ | NCS | F | H |
| n-$C_6H_{13}$ | NCS | F | H |
| H | NCS | F | F |
| $CH_3$ | NCS | F | F |
| $C_2H_5$ | NCS | F | F |
| n-$C_3H_7$ | NCS | F | F |
| n-$C_4H_9$ | NCS | F | F |
| n-$C_5H_{11}$ | NCS | F | F |
| n-$C_6H_{13}$ | NCS | F | F |
| H | $C_2F_5$ | H | H |
| $CH_3$ | $C_2F_5$ | H | H |
| $C_2H_5$ | $C_2F_5$ | H | H |
| n-$C_3H_7$ | $C_2F_5$ | H | H |
| n-$C_4H_9$ | $C_2F_5$ | H | H |
| n-$C_5H_{11}$ | $C_2F_5$ | H | H |
| n-$C_6H_{13}$ | $C_2F_5$ | H | H |
| H | $C_2F_5$ | F | H |
| $CH_3$ | $C_2F_5$ | F | H |
| $C_2H_5$ | $C_2F_5$ | F | H |
| n-$C_3H_7$ | $C_2F_5$ | F | H |
| n-$C_4H_9$ | $C_2F_5$ | F | H |
| n-$C_5H_{11}$ | $C_2F_5$ | F | H |
| n-$C_6H_{13}$ | $C_2F_5$ | F | H |
| H | $C_2F_5$ | F | F |
| $CH_3$ | $C_2F_5$ | F | F |
| $C_2H_5$ | $C_2F_5$ | F | F |
| n-$C_3H_7$ | $C_2F_5$ | F | F |
| n-$C_4H_9$ | $C_2F_5$ | F | F |
| n-$C_5H_{11}$ | $C_2F_5$ | F | F |
| n-$C_6H_{13}$ | $C_2F_5$ | F | F |
| H | $C_3F_7$ | H | H |
| $CH_3$ | $C_3F_7$ | H | H |
| $C_2H_5$ | $C_3F_7$ | H | H |
| n-$C_3H_7$ | $C_3F_7$ | H | H |
| n-$C_4H_9$ | $C_3F_7$ | H | H |
| n-$C_5H_{11}$ | $C_3F_7$ | H | H |
| n-$C_6H_{13}$ | $C_3F_7$ | H | H |
| H | $C_3F_7$ | F | H |
| $CH_3$ | $C_3F_7$ | F | H |
| $C_2H_5$ | $C_3F_7$ | F | H |

-continued

| $R^1$ | X | $L^1$ | $L^2$ |
|---|---|---|---|
| n-$C_3H_7$ | $C_3F_7$ | F | H |
| n-$C_4H_9$ | $C_3F_7$ | F | H |
| n-$C_5H_{11}$ | $C_3F_7$ | F | H |
| n-$C_6H_{13}$ | $C_3F_7$ | F | H |
| H | $C_3F_7$ | F | F |
| $CH_3$ | $C_3F_7$ | F | F |
| $C_2H_5$ | $C_3F_7$ | F | F |
| n-$C_3H_7$ | $C_3F_7$ | F | F |
| n-$C_4H_9$ | $C_3F_7$ | F | F |
| n-$C_5H_{11}$ | $C_3F_7$ | F | F |
| n-$C_6H_{13}$ | $C_3F_7$ | F | F |

-continued

| $R^1$ | X | $L^1$ | $L^2$ |
|---|---|---|---|
| H | $SF_5$ | H | H |
| $CH_3$ | $SF_5$ | H | H |
| $C_2H_5$ | $SF_5$ | H | H |
| n-$C_3H_7$ | $SF_5$ | H | H |
| n-$C_4H_9$ | $SF_5$ | H | H |
| n-$C_5H_{11}$ | $SF_5$ | H | H |
| n-$C_6H_{13}$ | $SF_5$ | H | H |
| H | $SF_5$ | F | H |
| $CH_3$ | $SF_5$ | F | H |
| $C_2H_5$ | $SF_5$ | F | H |
| n-$C_3H_7$ | $SF_5$ | F | H |
| n-$C_4H_9$ | $SF_5$ | F | H |
| n-$C_5H_{11}$ | $SF_5$ | F | H |
| n-$C_6H_{13}$ | $SF_5$ | F | H |
| H | $SF_5$ | F | F |
| $CH_3$ | $SF_5$ | F | F |
| $C_2H_5$ | $SF_5$ | F | F |
| n-$C_3H_7$ | $SF_5$ | F | F |
| n-$C_4H_9$ | $SF_5$ | F | F |
| n-$C_5H_{11}$ | $SF_5$ | F | F |
| n-$C_6H_{13}$ | $SF_5$ | F | F |
| H | CN | H | H |
| $CH_3$ | CN | H | H |
| $C_2H_5$ | CN | H | H |
| n-$C_3H_7$ | CN | H | H |
| n-$C_4H_9$ | CN | H | H |
| n-$C_5H_{11}$ | CN | H | H |
| n-$C_6H_{13}$ | CN | H | H |

EXAMPLE 5

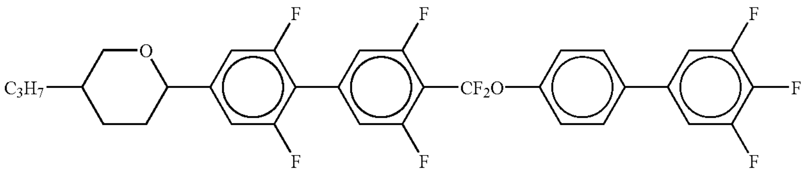

Step 5.1

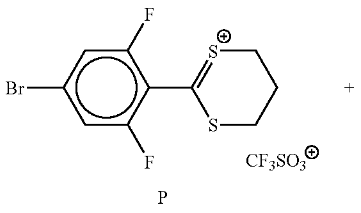

-continued

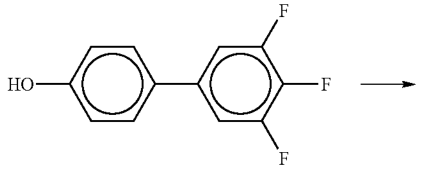

Q

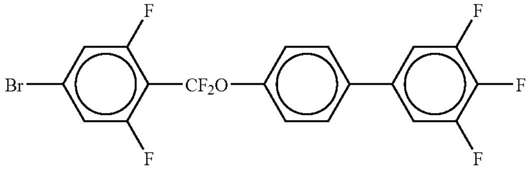

S

A mixture of 98 mmol of Q and 16.3 ml of triethylamine (117 mmol) in 80 ml of dichloromethane is added dropwise with stirring to a solution, cooled to −70° C., of 65 mmol of P in 100 ml of dichloromethane. When the addition is complete, the mixture is stirred at −70° C. for a further 1 hour. 325 mmol of triethylamine trishydrofluoride are subsequently added dropwise at the same temperature. 325 mmol of bromine are subsequently added dropwise at −70° C. After stirring at −70° C. for one hour, the reaction mixture is allowed to warm to 10° C. and is poured into a mixture of 500 ml of ice-water and 95 ml of 32% sodium hydroxide solution. The phases are separated, and the aqueous phase is extracted with dichloromethane. The combined organic phases are subjected to conventional work-up.

Step 5.2

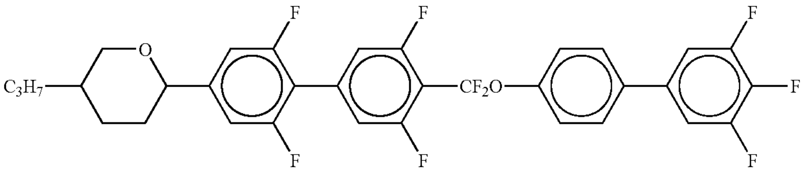

A mixture of 10 mmol of S and 10 mmol of 2,6-difluoro-4-(trans-5'-propyltetrahydropyranyl-(2))-phenylboronic acid in 60 ml of toluene and 60 ml of sodium borate buffer solution (pH=9) is warmed at 80° C. for 16 hours with stirring with 0.5 mmol of $Pd(PPh_3)_4$. After cooling, the two-phase reaction mixture is poured into 100 ml of 0.1 N HCl with stirring, the organic phase is separated off, and the aqueous phase is extracted twice with toluene. The combined toluene phases are dried and evaporated, and the residue is filtered through silica gel (heptane/methyl tert-butyl ether). Finally, the product is recrystallized first from ethanol and then from n-heptane. C 115 N 197.7 I; $\Delta\epsilon$=35.4; $\Delta n$=0.1706

The following compounds of the formula

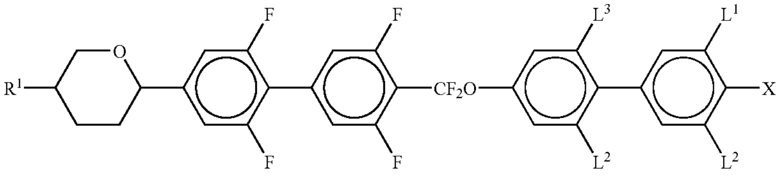

are prepared analogously:

| $R^1$ | X | $L^1$ | $L^2$ | $L^3$ | $L^4$ |
|---|---|---|---|---|---|
| H | F | H | H | H | H |
| $CH_3$ | F | H | H | H | H |
| $C_2H_5$ | F | H | H | H | H |
| $C_3H_7$ | F | H | H | H | H |
| n-$C_4H_9$ | F | H | H | H | H |
| n-$C_5H_{11}$ | F | H | H | H | H |
| n-$C_6H_{13}$ | F | H | H | H | H |
| H | F | F | H | H | H |
| $CH_3$ | F | F | H | H | H |
| $C_2H_5$ | F | F | H | H | H |
| n-$C_3H_7$ | F | F | H | H | H |
| n-$C_4H_9$ | F | F | H | H | H |
| n-$C_5H_{11}$ | F | F | H | H | H |
| n-$C_6H_{13}$ | F | F | H | H | H |
| H | F | F | F | H | H |
| $CH_3$ | F | F | F | H | H |
| n-$C_4H_9$ | F | F | F | H | H |
| n-$C_5H_{11}$ | F | F | F | H | H |
| n-$C_6H_{13}$ | F | F | F | H | H |
| H | Cl | H | H | H | H |
| $CH_3$ | Cl | H | H | H | H |
| $C_2H_5$ | Cl | H | H | H | H |
| n-$C_3H_7$ | Cl | H | H | H | H |
| n-$C_4H_9$ | Cl | H | H | H | H |
| n-$C_5H_{11}$ | Cl | H | H | H | H |
| n-$C_6H_{13}$ | Cl | H | H | H | H |
| H | Cl | F | H | H | H |
| $CH_3$ | Cl | F | H | H | H |
| $C_2H_5$ | Cl | F | H | H | H |
| n-$C_3H_7$ | Cl | F | H | H | H |
| n-$C_4H_9$ | Cl | F | H | H | H |
| n-$C_5H_{11}$ | Cl | F | H | H | H |
| n-$C_6H_{13}$ | Cl | F | H | H | H |

-continued

| $R^1$ | X | $L^1$ | $L^2$ | $L^3$ | $L^4$ |
|---|---|---|---|---|---|
| H | Cl | F | F | H | H |
| $CH_3$ | Cl | F | F | H | H |
| $C_2H_5$ | Cl | F | F | H | H |
| n-$C_3H_7$ | Cl | F | F | H | H |
| n-$C_4H_9$ | Cl | F | F | H | H |
| n-$C_5H_{11}$ | Cl | F | F | H | H |
| n-$C_6H_{13}$ | Cl | F | F | H | H |
| H | $OCF_3$ | H | H | H | H |
| $CH_3$ | $OCF_3$ | H | H | H | H |
| $C_2H_5$ | $OCF_3$ | H | H | H | H |

-continued

| $R^1$ | X | $L^1$ | $L^2$ | $L^3$ | $L^4$ |
|---|---|---|---|---|---|
| n-$C_3H_7$ | $OCF_3$ | H | H | H | H |
| n-$C_4H_9$ | $OCF_3$ | H | H | H | H |
| n-$C_5H_{11}$ | $OCF_3$ | H | H | H | H |
| n-$C_6H_{13}$ | $OCF_3$ | H | H | H | H |
| H | $OCF_3$ | F | H | H | H |
| $CH_3$ | $OCF_3$ | F | H | H | H |
| $C_2H_5$ | $OCF_3$ | F | H | H | H |
| n-$C_3H_7$ | $OCF_3$ | F | H | H | H |
| n-$C_4H_9$ | $OCF_3$ | F | H | H | H |
| n-$C_5H_{11}$ | $OCF_3$ | F | H | H | H |
| n-$C_6H_{13}$ | $OCF_3$ | F | H | H | H |
| H | $OCF_3$ | F | F | H | H |
| $CH_3$ | $OCF_3$ | F | F | H | H |
| $C_2H_5$ | $OCF_3$ | F | F | H | H |
| n-$C_3H_7$ | $OCF_3$ | F | F | H | H |
| n-$C_4H_9$ | $OCF_3$ | F | F | H | H |
| n-$C_5H_{11}$ | $OCF_3$ | F | F | H | H |
| n-$C_6H_{13}$ | $OCF_3$ | F | F | H | H |
| H | $OCHF_2$ | H | H | H | H |
| $CH_3$ | $OCHF_2$ | H | H | H | H |
| $C_2H_5$ | $OCHF_2$ | H | H | H | H |
| n-$C_3H_7$ | $OCHF_2$ | H | H | H | H |
| n-$C_4H_9$ | $OCHF_2$ | H | H | H | H |
| n-$C_5H_{11}$ | $OCHF_2$ | H | H | H | H |
| n-$C_6H_{13}$ | $OCHF_2$ | H | H | H | H |
| H | $OCHF_2$ | F | H | H | H |
| $CH_3$ | $OCHF_2$ | F | H | H | H |
| $C_2H_5$ | $OCHF_2$ | F | H | H | H |
| n-$C_3H_7$ | $OCHF_2$ | F | H | H | H |
| n-$C_4H_9$ | $OCHF_2$ | F | H | H | H |
| n-$C_5H_{11}$ | $OCHF_2$ | F | H | H | H |
| n-$C_6H_{13}$ | $OCHF_2$ | F | H | H | H |
| H | $OCHF_2$ | F | F | H | H |
| $CH_3$ | $OCHF_2$ | F | F | H | H |
| $C_2H_5$ | $OCHF_2$ | F | F | H | H |
| n-$C_3H_7$ | $OCHF_2$ | F | F | H | H |
| n-$C_4H_9$ | $OCHF_2$ | F | F | H | H |
| n-$C_5H_{11}$ | $OCHF_2$ | F | F | H | H |
| n-$C_6H_{13}$ | $OCHF_2$ | F | F | H | H |
| H | $OCHFCF_3$ | H | H | H | H |
| $CH_3$ | $OCHFCF_3$ | H | H | H | H |
| $C_2H_5$ | $OCHFCF_3$ | H | H | H | H |
| n-$C_3H_7$ | $OCHFCF_3$ | H | H | H | H |
| n-$C_4H_9$ | $OCHFCF_3$ | H | H | H | H |
| n-$C_5H_{11}$ | $OCHFCF_3$ | H | H | H | H |
| n-$C_6H_{13}$ | $OCHFCF_3$ | H | H | H | H |
| H | $OCHFCF_3$ | F | H | H | H |
| $CH_3$ | $OCHFCF_3$ | F | H | H | H |
| $C_2H_5$ | $OCHFCF_3$ | F | H | H | H |
| n-$C_3H_7$ | $OCHFCF_3$ | F | H | H | H |
| n-$C_4H_9$ | $OCHFCF_3$ | F | H | H | H |
| n-$C_5H_{11}$ | $OCHFCF_3$ | F | H | H | H |
| n-$C_6H_{13}$ | $OCHFCF_3$ | F | H | H | H |
| H | $OCHFCF_3$ | F | F | H | H |
| $CH_3$ | $OCHFCF_3$ | F | F | H | H |
| $C_2H_5$ | $OCHFCF_3$ | F | F | H | H |
| n-$C_3H_7$ | $OCHFCF_3$ | F | F | H | H |
| n-$C_4H_9$ | $OCHFCF_3$ | F | F | H | H |
| n-$C_5H_{11}$ | $OCHFCF_3$ | F | F | H | H |
| n-$C_6H_{13}$ | $OCHFCF_3$ | F | F | H | H |
| H | $OCHFCF_3$ | H | H | H | H |
| $CH_3$ | $OCHFCF_3$ | H | H | H | H |
| $C_2H_5$ | $OCHFCF_3$ | H | H | H | H |
| n-$C_3H_7$ | $OCHFCF_3$ | H | H | H | H |
| n-$C_4H_9$ | $OCHFCF_3$ | H | H | H | H |
| n-$C_5H_{11}$ | $OCHFCF_3$ | H | H | H | H |
| n-$C_6H_{13}$ | $OCHFCF_3$ | H | H | H | H |
| H | $OCHFCF_3$ | F | H | H | H |
| $CH_3$ | $OCHFCF_3$ | F | H | H | H |
| $C_2H_5$ | $OCHFCF_3$ | F | H | H | H |
| n-$C_3H_7$ | $OCHFCF_3$ | F | H | H | H |
| n-$C_4H_9$ | $OCHFCF_3$ | F | H | H | H |
| n-$C_5H_{11}$ | $OCHFCF_3$ | F | H | H | H |
| n-$C_6H_{13}$ | $OCHFCF_3$ | F | H | H | H |
| H | $OCHFCF_3$ | F | F | H | H |
| $CH_3$ | $OCHFCF_3$ | F | F | H | H |
| $C_2H_5$ | $OCHFCF_3$ | F | F | H | H |

-continued

| $R^1$ | X | $L^1$ | $L^2$ | $L^3$ | $L^4$ |
|---|---|---|---|---|---|
| n-$C_3H_7$ | $OCHFCF_3$ | F | F | H | H |
| n-$C_4H_9$ | $OCHFCF_3$ | F | F | H | H |
| n-$C_5H_{11}$ | $OCHFCF_3$ | F | F | H | H |
| n-$C_6H_{13}$ | $OCHFCF_3$ | F | F | H | H |
| H | $OCF_2CHFCF_3$ | H | H | H | H |
| $CH_3$ | $OCF_2CHFCF_3$ | H | H | H | H |
| $C_2H_5$ | $OCF_2CHFCF_3$ | H | H | H | H |
| n-$C_3H_7$ | $OCF_2CHFCF_3$ | H | H | H | H |
| n-$C_4H_9$ | $OCF_2CHFCF_3$ | H | H | H | H |
| n-$C_5H_{11}$ | $OCF_2CHFCF_3$ | H | H | H | H |
| n-$C_6H_{13}$ | $OCF_2CHFCF_3$ | H | H | H | H |
| H | $OCF_2CHFCF_3$ | F | H | H | H |
| $CH_3$ | $OCF_2CHFCF_3$ | F | H | H | H |
| $C_2H_5$ | $OCF_2CHFCF_3$ | F | H | H | H |
| n-$C_3H_7$ | $OCF_2CHFCF_3$ | F | H | H | H |
| n-$C_4H_9$ | $OCF_2CHFCF_3$ | F | H | H | H |
| n-$C_5H_{11}$ | $OCF_2CHFCF_3$ | F | H | H | H |
| n-$C_6H_{13}$ | $OCF_2CHFCF_3$ | F | H | H | H |
| H | $OCF_2CHFCF_3$ | F | F | H | H |
| $CH_3$ | $OCF_2CHFCF_3$ | F | F | H | H |
| $C_2H_5$ | $OCF_2CHFCF_3$ | F | F | H | H |
| n-$C_3H_7$ | $OCF_2CHFCF_3$ | F | F | H | H |
| n-$C_4H_9$ | $OCF_2CHFCF_3$ | F | F | H | H |
| n-$C_5H_{11}$ | $OCF_2CHFCF_3$ | F | F | H | H |
| n-$C_6H_{13}$ | $OCF_2CHFCF_3$ | F | F | H | H |
| H | NCS | H | H | H | H |
| $CH_3$ | NCS | H | H | H | H |
| $C_2H_5$ | NCS | H | H | H | H |
| n-$C_3H_7$ | NCS | H | H | H | H |
| n-$C_4H_9$ | NCS | H | H | H | H |
| n-$C_5H_{11}$ | NCS | H | H | H | H |
| n-$C_6H_{13}$ | NCS | H | H | H | H |
| H | NCS | F | H | H | H |
| $CH_3$ | NCS | F | H | H | H |
| $C_2H_5$ | NCS | F | H | H | H |
| n-$C_3H_7$ | NCS | F | H | H | H |
| n-$C_4H_9$ | NCS | F | H | H | H |
| n-$C_5H_{11}$ | NCS | F | H | H | H |
| n-$C_6H_{13}$ | NCS | F | H | H | H |
| H | NCS | F | F | H | H |
| $CH_3$ | NCS | F | F | H | H |
| $C_2H_5$ | NCS | F | F | H | H |
| n-$C_3H_7$ | NCS | F | F | H | H |
| n-$C_4H_9$ | NCS | F | F | H | H |
| n-$C_5H_{11}$ | NCS | F | F | H | H |
| n-$C_6H_{13}$ | NCS | F | F | H | H |
| H | $C_2F_5$ | H | H | H | H |
| $CH_3$ | $C_2F_5$ | H | H | H | H |
| $C_2H_5$ | $C_2F_5$ | H | H | H | H |
| n-$C_3H_7$ | $C_2F_5$ | H | H | H | H |
| n-$C_4H_9$ | $C_2F_5$ | H | H | H | H |
| n-$C_5H_{11}$ | $C_2F_5$ | H | H | H | H |
| n-$C_6H_{13}$ | $C_2F_5$ | H | H | H | H |
| H | $C_2F_5$ | F | H | H | H |
| $CH_3$ | $C_2F_5$ | F | H | H | H |
| $C_2H_5$ | $C_2F_5$ | F | H | H | H |
| n-$C_3H_7$ | $C_2F_5$ | F | H | H | H |
| n-$C_4H_9$ | $C_2F_5$ | F | H | H | H |
| n-$C_5H_{11}$ | $C_2F_5$ | F | H | H | H |
| n-$C_6H_{13}$ | $C_2F_5$ | F | H | H | H |
| H | $C_2F_5$ | F | F | H | H |
| $CH_3$ | $C_2F_5$ | F | F | H | H |
| $C_2H_5$ | $C_2F_5$ | F | F | H | H |
| n-$C_3H_7$ | $C_2F_5$ | F | F | H | H |
| n-$C_4H_9$ | $C_2F_5$ | F | F | H | H |
| n-$C_5H_{11}$ | $C_2F_5$ | F | F | H | H |
| n-$C_6H_{13}$ | $C_2F_5$ | F | F | H | H |
| H | $C_3F_7$ | H | H | H | H |
| $CH_3$ | $C_3F_7$ | H | H | H | H |
| $C_2H_5$ | $C_3F_7$ | H | H | H | H |
| n-$C_3H_7$ | $C_3F_7$ | H | H | H | H |
| n-$C_4H_9$ | $C_3F_7$ | H | H | H | H |
| n-$C_5H_{11}$ | $C_3F_7$ | H | H | H | H |
| n-$C_6H_{13}$ | $C_3F_7$ | H | H | H | H |
| H | $C_3F_7$ | F | H | H | H |
| $CH_3$ | $C_3F_7$ | F | H | H | H |
| $C_2H_5$ | $C_3F_7$ | F | H | H | H |

-continued

| $R^1$ | X | $L^1$ | $L^2$ | $L^3$ | $L^4$ | |
|---|---|---|---|---|---|---|
| n-$C_3H_7$ | $C_3F_7$ | F | H | H | H | |
| n-$C_4H_9$ | $C_3F_7$ | F | H | H | H | |
| n-$C_5H_{11}$ | $C_3F_7$ | F | H | H | H | |
| n-$C_6H_{13}$ | $C_3F_7$ | F | H | H | H | |
| H | $C_3F_7$ | F | F | H | H | |
| $CH_3$ | $C_3F_7$ | F | F | H | H | |
| $C_2H_5$ | $C_3F_7$ | F | F | H | H | |
| n-$C_3H_7$ | $C_3F_7$ | F | F | H | H | |
| n-$C_4H_9$ | $C_3F_7$ | F | F | H | H | |
| n-$C_5H_{11}$ | $C_3F_7$ | F | F | H | H | |
| n-$C_6H_{13}$ | $C_3F_7$ | F | F | H | H | |
| H | $SF_5$ | H | H | H | H | |
| $CH_3$ | $SF_5$ | H | H | H | H | |
| $C_2H_5$ | $SF_5$ | H | H | H | H | |
| n-$C_3H_7$ | $SF_5$ | H | H | H | H | |
| n-$C_4H_9$ | $SF_5$ | H | H | H | H | |
| n-$C_5H_{11}$ | $SF_5$ | H | H | H | H | |
| n-$C_6H_{13}$ | $SF_5$ | H | H | H | H | |
| H | $SF_5$ | F | H | H | H | |
| $CH_3$ | $SF_5$ | F | H | H | H | |
| $C_2H_5$ | $SF_5$ | F | H | H | H | |
| n-$C_3H_7$ | $SF_5$ | F | H | H | H | |
| n-$C_4H_9$ | $SF_5$ | F | H | H | H | |
| n-$C_5H_{11}$ | $SF_5$ | F | H | H | H | |
| n-$C_6H_{13}$ | $SF_5$ | F | H | H | H | |
| H | $SF_5$ | F | F | H | H | |
| $CH_3$ | $SF_5$ | F | F | H | H | |
| $C_2H_5$ | $SF_5$ | F | F | H | H | |
| n-$C_3H_7$ | $SF_5$ | F | F | H | H | |
| n-$C_4H_9$ | $SF_5$ | F | F | H | H | |
| n-$C_5H_{11}$ | $SF_5$ | F | F | H | H | |
| n-$C_6H_{13}$ | $SF_5$ | F | F | H | H | |
| H | CN | H | H | H | H | |
| CH3 | CN | H | H | H | H | |
| $C_2H_5$ | CN | H | H | H | H | |
| n-$C_3H_7$ | CN | H | H | H | H | |
| n-$C_4H_9$ | CN | H | H | H | H | |
| n-$C_5H_{11}$ | CN | H | H | H | H | |
| n-$C_6H_{13}$ | CN | H | H | H | H | |
| H | CN | F | H | H | H | |
| $CH_3$ | CN | F | H | H | H | |
| $C_2H_5$ | CN | F | H | H | H | |
| n-$C_3H_7$ | CN | F | H | H | H | |
| n-$C_4H_9$ | CN | F | H | H | H | |
| n-$C_5H_{11}$ | CN | F | H | H | H | |
| n-$C_6H_{13}$ | CN | F | H | H | H | |
| H | CN | F | F | H | H | |
| $CH_3$ | CN | F | F | H | H | |
| $C_2H_5$ | CN | F | F | H | H | |
| n-$C_3H_7$ | CN | F | F | H | H | |
| n-$C_4H_9$ | CN | F | F | H | H | |
| n-$C_5H_{11}$ | CN | F | F | H | H | |
| n-$C_6H_{13}$ | CN | F | F | H | H | |
| H | F | H | H | F | H | |
| $CH_3$ | F | H | H | F | H | |
| $C_2H_5$ | F | H | H | F | H | |
| $C_3H_7$ | F | H | H | F | H | |
| n-$C_4H_9$ | F | H | H | F | H | |
| n-$C_5H_{11}$ | F | H | H | F | H | |
| n-$C_6H_{13}$ | F | H | H | F | H | |
| H | F | F | H | F | H | |
| $CH_3$ | F | F | H | F | H | |
| $C_2H_5$ | F | F | H | F | H | |
| n-$C_3H_7$ | F | F | H | F | H | |
| n-$C_4H_9$ | F | F | H | F | H | |
| n-$C_5H_{11}$ | F | F | H | F | H | |
| n-$C_6H_{13}$ | F | F | H | F | H | |
| H | F | F | F | F | H | |
| $CH_3$ | F | F | F | F | H | |
| $C_2H_5$ | F | F | F | F | H | |
| n-$C_3H_7$ | F | F | F | F | H | C 98 N 193.0 I; $\Delta\epsilon = 37.9$; $\Delta n = 0.1649$ |
| n-$C_4H_9$ | F | F | F | F | H | |
| n-$C_5H_{11}$ | F | F | F | F | H | |
| n-$C_6H_{13}$ | F | F | F | F | H | |
| H | Cl | H | H | F | H | |
| $CH_3$ | Cl | H | H | F | H | |

-continued

| $R^1$ | X | $L^1$ | $L^2$ | $L^3$ | $L^4$ |
|---|---|---|---|---|---|
| $C_2H_5$ | Cl | H | H | F | H |
| n-$C_3H_7$ | Cl | H | H | F | H |
| n-$C_4H_9$ | Cl | H | H | F | H |
| n-$C_5H_{11}$ | Cl | H | H | F | H |
| n-$C_6H_{13}$ | Cl | H | H | F | H |
| H | Cl | F | H | F | H |
| $CH_3$ | Cl | F | H | F | H |
| $C_2H_5$ | Cl | F | H | F | H |
| n-$C_3H_7$ | Cl | F | H | F | H |
| n-$C_4H_9$ | Cl | F | H | F | H |
| n-$C_5H_{11}$ | Cl | F | H | F | H |
| n-$C_6H_{13}$ | Cl | F | H | F | H |
| H | Cl | F | F | F | H |
| $CH_3$ | Cl | F | F | F | H |
| $C_2H_5$ | Cl | F | F | F | H |
| n-$C_3H_7$ | Cl | F | F | F | H |
| n-$C_4H_9$ | Cl | F | F | F | H |
| n-$C_5H_{11}$ | Cl | F | F | F | H |
| n-$C_6H_{13}$ | Cl | F | F | F | H |
| H | $OCF_3$ | H | H | F | H |
| $CH_3$ | $OCF_3$ | H | H | F | H |
| $C_2H_5$ | $OCF_3$ | H | H | F | H |
| n-$C_3H_7$ | $OCF_3$ | H | H | F | H |
| n-$C_4H_9$ | $OCF_3$ | H | H | F | H |
| n-$C_5H_{11}$ | $OCF_3$ | H | H | F | H |
| n-$C_6H_{13}$ | $OCF_3$ | H | H | F | H |
| H | $OCF_3$ | F | H | F | H |
| $CH_3$ | $OCF_3$ | F | H | F | H |
| $C_2H_5$ | $OCF_3$ | F | H | F | H |
| n-$C_3H_7$ | $OCF_3$ | F | H | F | H |
| n-$C_4H_9$ | $OCF_3$ | F | H | F | H |
| n-$C_5H_{11}$ | $OCF_3$ | F | H | F | H |
| n-$C_6H_{13}$ | $OCF_3$ | F | H | F | H |
| H | $OCF_3$ | F | F | F | H |
| $CH_3$ | $OCF_3$ | F | F | F | H |
| $C_2H_5$ | $OCF_3$ | F | F | F | H |
| n-$C_3H_7$ | $OCF_3$ | F | F | F | H |
| n-$C_4H_9$ | $OCF_3$ | F | F | F | H |
| n-$C_5H_{11}$ | $OCF_3$ | F | F | F | H |
| n-$C_6H_{13}$ | $OCF_3$ | F | F | F | H |
| H | $OCHF_2$ | H | H | F | H |
| $CH_3$ | $OCHF_2$ | H | H | F | H |
| $C_2H_5$ | $OCHF_2$ | H | H | F | H |
| n-$C_3H_7$ | $OCHF_2$ | H | H | F | H |
| n-$C_4H_9$ | $OCHF_2$ | H | H | F | H |
| n-$C_5H_{11}$ | $OCHF_2$ | H | H | F | H |
| n-$C_6H_{13}$ | $OCHF_2$ | H | H | F | H |
| H | $OCHF_2$ | F | H | F | H |
| $CH_3$ | $OCHF_2$ | F | H | F | H |
| $C_2H_5$ | $OCHF_2$ | F | H | F | H |
| n-$C_3H_7$ | $OCHF_2$ | F | H | F | H |
| n-$C_4H_9$ | $OCHF_2$ | F | H | F | H |
| n-$C_5H_{11}$ | $OCHF_2$ | F | H | F | H |
| n-$C_6H_{13}$ | $OCHF_2$ | F | H | F | H |
| H | $OCHF_2$ | F | F | F | H |
| $CH_3$ | $OCHF_2$ | F | F | F | H |
| $C_2H_5$ | $OCHF_2$ | F | F | F | H |
| n-$C_3H_7$ | $OCHF_2$ | F | F | F | H |
| n-$C_4H_9$ | $OCHF_2$ | F | F | F | H |
| n-$C_5H_{11}$ | $OCHF_2$ | F | F | F | H |
| n-$C_6H_{13}$ | $OCHF_2$ | F | F | F | H |
| H | $OCHFCF_3$ | H | H | F | H |
| $CH_3$ | $OCHFCF_3$ | H | H | F | H |
| $C_2H_5$ | $OCHFCF_3$ | H | H | F | H |
| n-$C_3H_7$ | $OCHFCF_3$ | H | H | F | H |
| n-$C_4H_9$ | $OCHFCF_3$ | H | H | F | H |
| n-$C_5H_{11}$ | $OCHFCF_3$ | H | H | F | H |
| n-$C_6H_{13}$ | $OCHFCF_3$ | H | H | F | H |
| H | $OCHFCF_3$ | F | H | F | H |
| $CH_3$ | $OCHFCF_3$ | F | H | F | H |
| $C_2H_5$ | $OCHFCF_3$ | F | H | F | H |
| n-$C_3H_7$ | $OCHFCF_3$ | F | H | F | H |
| n-$C_4H_9$ | $OCHFCF_3$ | F | H | F | H |
| n-$C_5H_{11}$ | $OCHFCF_3$ | F | H | F | H |
| n-$C_6H_{13}$ | $OCHFCF_3$ | F | H | F | H |
| H | $OCHFCF_3$ | F | F | F | H |
| $CH_3$ | $OCHFCF_3$ | F | F | F | H |

-continued

| $R^1$ | X | $L^1$ | $L^2$ | $L^3$ | $L^4$ |
|---|---|---|---|---|---|
| $C_2H_5$ | $OCHFCF_3$ | F | F | F | H |
| n-$C_3H_7$ | $OCHFCF_3$ | F | F | F | H |
| n-$C_4H_9$ | $OCHFCF_3$ | F | F | F | H |
| n-$C_5H_{11}$ | $OCHFCF_3$ | F | F | F | H |
| n-$C_6H_{13}$ | $OCHFCF_3$ | F | F | F | H |
| H | $OCHFCF_3$ | H | H | F | H |
| $CH_3$ | $OCHFCF_3$ | H | H | F | H |
| $C_2H_5$ | $OCHFCF_3$ | H | H | F | H |
| n-$C_3H_7$ | $OCHFCF_3$ | H | H | F | H |
| n-$C_4H_9$ | $OCHFCF_3$ | H | H | F | H |
| n-$C_5H_{11}$ | $OCHFCF_3$ | H | H | F | H |
| n-$C_6H_{13}$ | $OCHFCF_3$ | H | H | F | H |
| H | $OCHFCF_3$ | F | H | F | H |
| $CH_3$ | $OCHFCF_3$ | F | H | F | H |
| $C_2H_5$ | $OCHFCF_3$ | F | H | F | H |
| n-$C_3H_7$ | $OCHFCF_3$ | F | H | F | H |
| n-$C_4H_9$ | $OCHFCF_3$ | F | H | F | H |
| n-$C_5H_{11}$ | $OCHFCF_3$ | F | H | F | H |
| n-$C_6H_{13}$ | $OCHFCF_3$ | F | H | F | H |
| H | $OCHFCF_3$ | F | F | F | H |
| $CH_3$ | $OCHFCF_3$ | F | F | F | H |
| $C_2H_5$ | $OCHFCF_3$ | F | F | F | H |
| n-$C_3H_7$ | $OCHFCF_3$ | F | F | F | H |
| n-$C_4H_9$ | $OCHFCF_3$ | F | F | F | H |
| n-$C_5H_{11}$ | $OCHFCF_3$ | F | F | F | H |
| n-$C_6H_{13}$ | $OCHFCF_3$ | F | F | F | H |
| H | $OCF_2CHFCF_3$ | H | H | F | H |
| $CH_3$ | $OCF_2CHFCF_3$ | H | H | F | H |
| $C_2H_5$ | $OCF_2CHFCF_3$ | H | H | F | H |
| n-$C_3H_7$ | $OCF_2CHFCF_3$ | H | H | F | H |
| n-$C_4H_9$ | $OCF_2CHFCF_3$ | H | H | F | H |
| n-$C_5H_{11}$ | $OCF_2CHFCF_3$ | H | H | F | H |
| n-$C_6H_{13}$ | $OCF_2CHFCF_3$ | H | H | F | H |
| H | $OCF_2CHFCF_3$ | F | H | F | H |
| $CH_3$ | $OCF_2CHFCF_3$ | F | H | F | H |
| $C_2H_5$ | $OCF_2CHFCF_3$ | F | H | F | H |
| n-$C_3H_7$ | $OCF_2CHFCF_3$ | F | H | F | H |
| n-$C_4H_9$ | $OCF_2CHFCF_3$ | F | H | F | H |
| n-$C_5H_{11}$ | $OCF_2CHFCF_3$ | F | H | F | H |
| n-$C_6H_{13}$ | $OCF_2CHFCF_3$ | F | H | F | H |
| H | $OCF_2CHFCF_3$ | F | F | F | H |
| $CH_3$ | $OCF_2CHFCF_3$ | F | F | F | H |
| $C_2H_5$ | $OCF_2CHFCF_3$ | F | F | F | H |
| n-$C_3H_7$ | $OCF_2CHFCF_3$ | F | F | F | H |
| n-$C_4H_9$ | $OCF_2CHFCF_3$ | F | F | F | H |
| n-$C_5H_{11}$ | $OCF_2CHFCF_3$ | F | F | F | H |
| n-$C_6H_{13}$ | $OCF_2CHFCF_3$ | F | F | F | H |
| H | NCS | H | H | F | H |
| $CH_3$ | NCS | H | H | F | H |
| $C_2H_5$ | NCS | H | H | F | H |
| n-$C_3H_7$ | NCS | H | H | F | H |
| n-$C_4H_9$ | NCS | H | H | F | H |
| n-$C_5H_{11}$ | NCS | H | H | F | H |
| n-$C_6H_{13}$ | NCS | H | H | F | H |
| H | NCS | F | H | F | H |
| $CH_3$ | NCS | F | H | F | H |
| $C_2H_5$ | NCS | F | H | F | H |
| n-$C_3H_7$ | NCS | F | H | F | H |
| n-$C_4H_9$ | NCS | F | H | F | H |
| n-$C_5H_{11}$ | NCS | F | H | F | H |
| n-$C_6H_{13}$ | NCS | F | H | F | H |
| H | NCS | F | F | F | H |
| $CH_3$ | NCS | F | F | F | H |
| $C_2H_5$ | NCS | F | F | F | H |
| n-$C_3H_7$ | NCS | F | F | F | H |
| n-$C_4H_9$ | NCS | F | F | F | H |
| n-$C_5H_{11}$ | NCS | F | F | F | H |
| n-$C_6H_{13}$ | NCS | F | F | F | H |
| H | $C_2F_5$ | H | H | F | H |
| $CH_3$ | $C_2F_5$ | H | H | F | H |
| $C_2H_5$ | $C_2F_5$ | H | H | F | H |
| n-$C_3H_7$ | $C_2F_5$ | H | H | F | H |
| n-$C_4H_9$ | $C_2F_5$ | H | H | F | H |
| n-$C_5H_{11}$ | $C_2F_5$ | H | H | F | H |
| n-$C_6H_{13}$ | $C_2F_5$ | H | H | F | H |
| H | $C_2F_5$ | F | H | F | H |
| $CH_3$ | $C_2F_5$ | F | H | F | H |

-continued

| $R^1$ | X | $L^1$ | $L^2$ | $L^3$ | $L^4$ |
|---|---|---|---|---|---|
| $C_2H_5$ | $C_2F_5$ | F | H | F | H |
| n-$C_3H_7$ | $C_2F_5$ | F | H | F | H |
| n-$C_4H_9$ | $C_2F_5$ | F | H | F | H |
| n-$C_5H_{11}$ | $C_2F_5$ | F | H | F | H |
| n-$C_6H_{13}$ | $C_2F_5$ | F | H | F | H |
| H | $C_2F_5$ | F | F | F | H |
| $CH_3$ | $C_2F_5$ | F | F | F | H |
| $C_2H_5$ | $C_2F_5$ | F | F | F | H |
| n-$C_3H_7$ | $C_2F_5$ | F | F | F | H |
| n-$C_4H_9$ | $C_2F_5$ | F | F | F | H |
| n-$C_5H_{11}$ | $C_2F_5$ | F | F | F | H |
| n-$C_6H_{13}$ | $C_2F_5$ | F | F | F | H |
| H | $C_3F_7$ | H | H | F | H |
| $CH_3$ | $C_3F_7$ | H | H | F | H |
| $C_2H_5$ | $C_3F_7$ | H | H | F | H |
| n-$C_3H_7$ | $C_3F_7$ | H | H | F | H |
| n-$C_4H_9$ | $C_3F_7$ | H | H | F | H |
| n-$C_5H_{11}$ | $C_3F_7$ | H | H | F | H |
| n-$C_6H_{13}$ | $C_3F_7$ | H | H | F | H |
| H | $C_3F_7$ | F | H | F | H |
| $CH_3$ | $C_3F_7$ | F | H | F | H |
| $C_2H_5$ | $C_3F_7$ | F | H | F | H |
| n-$C_3H_7$ | $C_3F_7$ | F | H | F | H |
| n-$C_4H_9$ | $C_3F_7$ | F | H | F | H |
| n-$C_5H_{11}$ | $C_3F_7$ | F | H | F | H |
| n-$C_6H_{13}$ | $C_3F_7$ | F | H | F | H |
| H | $C_3F_7$ | F | F | F | H |
| $CH_3$ | $C_3F_7$ | F | F | F | H |
| $C_2H_5$ | $C_3F_7$ | F | F | F | H |
| n-$C_3H_7$ | $C_3F_7$ | F | F | F | H |
| n-$C_4H_9$ | $C_3F_7$ | F | F | F | H |
| n-$C_5H_{11}$ | $C_3F_7$ | F | F | F | H |
| n-$C_6H_{13}$ | $C_3H_7$ | F | F | F | H |
| H | $SF_5$ | H | H | F | H |
| $CH_3$ | $SF_5$ | H | H | F | H |
| $C_2H_5$ | $SF_5$ | H | H | F | H |
| n-$C_3H_7$ | $SF_5$ | H | H | F | H |
| n-$C_4H_9$ | $SF_5$ | H | H | F | H |
| n-$C_5H_{11}$ | $SF_5$ | H | H | F | H |
| n-$C_6H_{13}$ | $SF_5$ | H | H | F | H |
| H | $SF_5$ | F | H | F | H |
| $CH_3$ | $SF_5$ | F | H | F | H |
| $C_2H_5$ | $SF_5$ | F | H | F | H |
| n-$C_3H_7$ | $SF_5$ | F | H | F | H |
| n-$C_4H_9$ | $SF_5$ | F | H | F | H |
| n-$C_5H_{11}$ | $SF_5$ | F | H | F | H |
| n-$C_6H_{13}$ | $SF_5$ | F | H | F | H |
| H | $SF_5$ | F | F | F | H |
| $CH_3$ | $SF_5$ | F | F | F | H |
| $C_2H_5$ | $SF_5$ | F | F | F | H |
| n-$C_3H_7$ | $SF_5$ | F | F | F | H |
| n-$C_4H_9$ | $SF_5$ | F | F | F | H |
| n-$C_5H_{11}$ | $SF_5$ | F | F | F | H |
| n-$C_6H_{13}$ | $SF_5$ | F | F | F | H |
| H | CN | H | H | F | H |
| $CH_3$ | CN | H | H | F | H |
| $C_2H_5$ | CN | H | H | F | H |
| n-$C_3H_7$ | CN | H | H | F | H |
| n-$C_4H_9$ | CN | H | H | F | H |
| n-$C_5H_{11}$ | CN | H | H | F | H |
| n-$C_6H_{13}$ | CN | H | H | F | H |
| H | CN | F | H | F | H |
| $CH_3$ | CN | F | H | F | H |
| $C_2H_5$ | CN | F | H | F | H |
| n-$C_3H_7$ | CN | F | H | F | H |
| n-$C_4H_9$ | CN | F | H | F | H |
| n-$C_5H_{11}$ | CN | F | H | F | H |
| n-$C_6H_{13}$ | CN | F | H | F | H |
| H | CN | F | F | F | H |
| $CH_3$ | CN | F | F | F | H |
| $C_2H_5$ | CN | F | F | F | H |
| n-$C_3H_7$ | CN | F | F | F | H |
| n-$C_4H_9$ | CN | F | F | F | H |
| n-$C_5H_{11}$ | CN | F | F | F | H |
| n-$C_6H_{13}$ | CN | F | F | F | H |
| H | F | H | H | F | F |
| $CH_3$ | F | H | H | F | F |

-continued

| $R^1$ | X | $L^1$ | $L^2$ | $L^3$ | $L^4$ | |
|---|---|---|---|---|---|---|
| $C_2H_5$ | F | H | H | F | F | |
| n-$C_4H_9$ | F | H | H | F | F | |
| n-$C_5H_{11}$ | F | H | H | F | F | |
| n-$C_6H_{13}$ | F | H | H | F | F | |
| H | F | F | H | F | F | |
| $CH_3$ | F | F | H | F | F | |
| $C_2H_5$ | F | F | H | F | F | |
| n-$C_3H_7$ | F | F | H | F | F | |
| n-$C_4H_9$ | F | F | H | F | F | |
| n-$C_5H_{11}$ | F | F | H | F | F | |
| n-$C_6H_{13}$ | F | F | H | F | F | |
| H | F | F | F | F | F | |
| $CH_3$ | F | F | F | F | F | |
| $C_2H_5$ | F | F | F | F | F | |
| $C_2H_5$ | F | F | F | F | F | |
| n-$C_3H_7$ | F | F | F | F | F | C 144 N 181.4 I; $\Delta\epsilon = 42.1$; $\Delta n = 0.1510$ |
| n-$C_4H_9$ | F | F | F | F | F | |
| n-$C_5H_{11}$ | F | F | F | F | F | |
| n-$C_6H_{13}$ | F | F | F | F | F | |
| H | Cl | H | H | F | F | |
| $CH_3$ | Cl | H | H | F | F | |
| $C_2H_5$ | Cl | H | H | F | F | |
| n-$C_3H_7$ | Cl | H | H | F | F | |
| n-$C_4H_9$ | Cl | H | H | F | F | |
| n-$C_5H_{11}$ | Cl | H | H | F | F | |
| n-$C_6H_{13}$ | Cl | H | H | F | F | |
| H | Cl | F | H | F | F | |
| $CH_3$ | Cl | F | H | F | F | |
| $C_2H_5$ | Cl | F | H | F | F | |
| n-$C_3H_7$ | Cl | F | H | F | F | |
| n-$C_4H_9$ | Cl | F | H | F | F | |
| n-$C_5H_{11}$ | Cl | F | H | F | F | |
| n-$C_6H_{13}$ | Cl | F | H | F | F | |
| H | Cl | F | F | F | F | |
| $CH_3$ | Cl | F | F | F | F | |
| $C_2H_5$ | Cl | F | F | F | F | |
| n-$C_3H_7$ | Cl | F | F | F | F | |
| n-$C_4H_9$ | Cl | F | F | F | F | |
| n-$C_5H_{11}$ | Cl | F | F | F | F | |
| n-$C_6H_{13}$ | Cl | F | F | F | F | |
| H | $OCF_3$ | H | H | F | F | |
| $CH_3$ | $OCF_3$ | H | H | F | F | |
| $C_2H_5$ | $OCF_3$ | H | H | F | F | |
| n-$C_3H_7$ | $OCF_3$ | H | H | F | F | |
| n-$C_4H_9$ | $OCF_3$ | H | H | F | F | |
| n-$C_5H_{11}$ | $OCF_3$ | H | H | F | F | |
| n-$C_6H_{13}$ | $OCF_3$ | H | H | F | F | |
| H | $OCF_3$ | F | H | F | F | |
| $CH_3$ | $OCF_3$ | F | H | F | F | |
| $C_2H_5$ | $OCF_3$ | F | H | F | F | |
| n-$C_3H_7$ | $OCF_3$ | F | H | F | F | C 121 N 205.2 I; $\Delta\epsilon = 37.7$; $\Delta n = 0.1634$ |
| n-$C_4H_9$ | $OCF_3$ | F | H | F | F | |
| n-$C_5H_{11}$ | $OCF_3$ | F | H | F | F | |
| n-$C_6H_{13}$ | $OCF_3$ | F | H | F | F | |
| H | $OCF_3$ | F | F | F | F | |
| $CH_3$ | $OCF_3$ | F | F | F | F | |
| $C_2H_5$ | $OCF_3$ | F | F | F | F | |
| n-$C_3H_7$ | $OCF_3$ | F | F | F | F | C 128 N 201.2 I; $\Delta\epsilon = 43.8$; $\Delta n = 0.1411$ |
| n-$C_4H_9$ | $OCF_3$ | F | F | F | F | |
| n-$C_5H_{11}$ | $OCF_3$ | F | F | F | F | |
| n-$C_6H_{13}$ | $OCF_3$ | F | F | F | F | |
| H | $OCHF_2$ | H | H | F | F | |
| $CH_3$ | $OCHF_2$ | H | H | F | F | |
| $C_2H_5$ | $OCHF_2$ | H | H | F | F | |
| n-$C_3H_7$ | $OCHF_2$ | H | H | F | F | |
| n-$C_4H_9$ | $OCHF_2$ | H | H | F | F | |
| n-$C_5H_{11}$ | $OCHF_2$ | H | H | F | F | |
| n-$C_6H_{13}$ | $OCHF_2$ | H | H | F | F | |
| H | $OCHF_2$ | F | H | F | F | |
| $CH_3$ | $OCHF_2$ | F | H | F | F | |
| $C_2H_5$ | $OCHF_2$ | F | H | F | F | |
| n-$C_3H_7$ | $OCHF_2$ | F | H | F | F | |
| n-$C_4H_9$ | $OCHF_2$ | F | H | F | F | |
| n-$C_5H_{11}$ | $OCHF_2$ | F | H | F | F | |

-continued

| $R^1$ | X | $L^1$ | $L^2$ | $L^3$ | $L^4$ |
|---|---|---|---|---|---|
| n-$C_6H_{13}$ | $OCHF_2$ | F | H | F | F |
| H | $OCHF_2$ | F | F | F | F |
| $CH_3$ | $OCHF_2$ | F | F | F | F |
| $C_2H_5$ | $OCHF_2$ | F | F | F | F |
| n-$C_3H_7$ | $OCHF_2$ | F | F | F | F |
| n-$C_4H_9$ | $OCHF_2$ | F | F | F | F |
| n-$C_5H_{11}$ | $OCHF_2$ | F | F | F | F |
| n-$C_6H_{13}$ | $OCHF_2$ | F | F | F | F |
| H | $OCHFCF_3$ | H | H | F | F |
| $CH_3$ | $OCHFCF_3$ | H | H | F | F |
| $C_2H_5$ | $OCHFCF_3$ | H | H | F | F |
| n-$C_3H_7$ | $OCHFCF_3$ | H | H | F | F |
| n-$C_4H_9$ | $OCHFCF_3$ | H | H | F | F |
| n-$C_5H_{11}$ | $OCHFCF_3$ | H | H | F | F |
| n-$C_6H_{13}$ | $OCHFCF_3$ | H | H | F | F |
| H | $OCHFCF_3$ | F | H | F | F |
| $CH_3$ | $OCHFCF_3$ | F | H | F | F |
| $C_2H_5$ | $OCHFCF_3$ | F | H | F | F |
| n-$C_3H_7$ | $OCHFCF_3$ | F | H | F | F |
| n-$C_4H_9$ | $OCHFCF_3$ | F | H | F | F |
| n-$C_5H_{11}$ | $OCHFCF_3$ | F | H | F | F |
| n-$C_6H_{13}$ | $OCHFCF_3$ | F | H | F | F |
| H | $OCHFCF_3$ | F | F | F | F |
| $CH_3$ | $OCHFCF_3$ | F | F | F | F |
| $C_2H_5$ | $OCHFCF_3$ | F | F | F | F |
| n-$C_3H_7$ | $OCHFCF_3$ | F | F | F | F |
| n-$C_4H_9$ | $OCHFCF_3$ | F | F | F | F |
| n-$C_5H_{11}$ | $OCHFCF_3$ | F | F | F | F |
| n-$C_6H_{13}$ | $OCHFCF_3$ | F | F | F | F |
| H | $OCHFCF_3$ | H | H | F | F |
| $CH_3$ | $OCHFCF_3$ | H | H | F | F |
| $C_2H_5$ | $OCHFCF_3$ | H | H | F | F |
| n-$C_3H_7$ | $OCHFCF_3$ | H | H | F | F |
| n-$C_4H_9$ | $OCHFCF_3$ | H | H | F | F |
| n-$C_5H_{11}$ | $OCHFCF_3$ | H | H | F | F |
| n-$C_6H_{13}$ | $OCHFCF_3$ | H | H | F | F |
| H | $OCHFCF_3$ | F | H | F | F |
| $CH_3$ | $OCHFCF_3$ | F | H | F | F |
| $C_2H_5$ | $OCHFCF_3$ | F | H | F | F |
| n-$C_3H_7$ | $OCHFCF_3$ | F | H | F | F |
| n-$C_4H_9$ | $OCHFCF_3$ | F | H | F | F |
| n-$C_5H_{11}$ | $OCHFCF_3$ | F | H | F | F |
| n-$C_6H_{13}$ | $OCHFCF_3$ | F | H | F | F |
| H | $OCHFCF_3$ | F | F | F | F |
| $CH_3$ | $OCHFCF_3$ | F | F | F | F |
| $C_2H_5$ | $OCHFCF_3$ | F | F | F | F |
| n-$C_3H_7$ | $OCHFCF_3$ | F | F | F | F |
| n-$C_4H_9$ | $OCHFCF_3$ | F | F | F | F |
| n-$C_5H_{11}$ | $OCHFCF_3$ | F | F | F | F |
| n-$C_6H_{13}$ | $OCHFCF_3$ | F | F | F | F |
| H | $OCF_2CHFCF_3$ | H | H | F | F |
| $CH_3$ | $OCF_2CHFCF_3$ | H | H | F | F |
| $C_2H_5$ | $OCF_2CHFCF_3$ | H | H | F | F |
| n-$C_3H_7$ | $OCF_2CHFCF_3$ | H | H | F | F |
| n-$C_4H_9$ | $OCF_2CHFCF_3$ | H | H | F | F |
| n-$C_5H_{11}$ | $OCF_2CHFCF_3$ | H | H | F | F |
| n-$C_6H_{13}$ | $OCF_2CHFCF_3$ | H | H | F | F |
| H | $OCF_2CHFCF_3$ | F | H | F | F |
| $CH_3$ | $OCF_2CHFCF_3$ | F | H | F | F |
| $C_2H_5$ | $OCF_2CHFCF_3$ | F | H | F | F |
| n-$C_3H_7$ | $OCF_2CHFCF_3$ | F | H | F | F |
| n-$C_4H_9$ | $OCF_2CHFCF_3$ | F | H | F | F |
| n-$C_5H_{11}$ | $OCF_2CHFCF_3$ | F | H | F | F |
| n-$C_6H_{13}$ | $OCF_2CHFCF_3$ | F | H | F | F |
| H | $OCF_2CHFCF_3$ | F | F | F | F |
| $CH_3$ | $OCF_2CHFCF_3$ | F | F | F | F |
| $C_2H_5$ | $OCF_2CHFCF_3$ | F | F | F | F |
| n-$C_3H_7$ | $OCF_2CHFCF_3$ | F | F | F | F |
| n-$C_4H_9$ | $OCF_2CHFCF_3$ | F | F | F | F |
| n-$C_5H_{11}$ | $OCF_2CHFCF_3$ | F | F | F | F |
| n-$C_6H_{13}$ | $OCF_2CHFCF_3$ | F | F | F | F |
| H | NCS | H | H | F | F |
| $CH_3$ | NCS | H | H | F | F |
| $C_2H_5$ | NCS | H | H | F | F |
| n-$C_3H_7$ | NCS | H | H | F | F |
| n-$C_4H_9$ | NCS | H | H | F | F |
| n-$C_5H_{11}$ | NCS | H | H | F | F |

-continued

| $R^1$ | X | $L^1$ | $L^2$ | $L^3$ | $L^4$ |
|---|---|---|---|---|---|
| n-$C_6H_{13}$ | NCS | H | H | F | F |
| H | NCS | F | H | F | F |
| $CH_3$ | NCS | F | H | F | F |
| $C_2H_5$ | NCS | F | H | F | F |
| n-$C_3H_7$ | NCS | F | H | F | F |
| n-$C_4H_9$ | NCS | F | H | F | F |
| n-$C_5H_{11}$ | NCS | F | H | F | F |
| n-$C_6H_{13}$ | NCS | F | H | F | F |
| H | NCS | F | F | F | F |
| $CH_3$ | NCS | F | F | F | F |
| $C_2H_5$ | NCS | F | F | F | F |
| n-$C_3H_7$ | NCS | F | F | F | F |
| n-$C_4H_9$ | NCS | F | F | F | F |
| n-$C_5H_{11}$ | NCS | F | F | F | F |
| n-$C_6H_{13}$ | NCS | F | F | F | F |
| H | $C_2F_5$ | H | H | F | F |
| $CH_3$ | $C_2F_5$ | H | H | F | F |
| $C_2H_5$ | $C_2F_5$ | H | H | F | F |
| n-$C_3H_7$ | $C_2F_5$ | H | H | F | F |
| n-$C_4H_9$ | $C_2F_5$ | H | H | F | F |
| n-$C_5H_{11}$ | $C_2F_5$ | H | H | F | F |
| n-$C_6H_{13}$ | $C_2F_5$ | H | H | F | F |
| H | $C_2F_5$ | F | H | F | F |
| $CH_3$ | $C_2F_5$ | F | H | F | F |
| $C_2H_5$ | $C_2F_5$ | F | H | F | F |
| n-$C_3H_7$ | $C_2F_5$ | F | H | F | F |
| n-$C_4H_9$ | $C_2F_5$ | F | H | F | F |
| n-$C_5H_{11}$ | $C_2F_5$ | F | H | F | F |
| n-$C_6H_{13}$ | $C_2F_5$ | F | H | F | F |
| H | $C_2F_5$ | F | F | F | F |
| $CH_3$ | $C_2F_5$ | F | F | F | F |
| $C_2H_5$ | $C_2F_5$ | F | F | F | F |
| n-$C_3H_7$ | $C_2F_5$ | F | F | F | F |
| n-$C_4H_9$ | $C_2F_5$ | F | F | F | F |
| n-$C_5H_{11}$ | $C_2F_5$ | F | F | F | F |
| n-$C_6H_{13}$ | $C_2F_5$ | F | F | F | F |
| H | $C_3F_7$ | H | H | F | F |
| $CH_3$ | $C_3F_7$ | H | H | F | F |
| $C_2H_5$ | $C_3F_7$ | H | H | F | F |
| n-$C_3H_7$ | $C_3F_7$ | H | H | F | F |
| n-$C_4H_9$ | $C_3F_7$ | H | H | F | F |
| n-$C_5H_{11}$ | $C_3F_7$ | H | H | F | F |
| n-$C_6H_{13}$ | $C_3F_7$ | H | H | F | F |
| H | $C_3F_7$ | F | H | F | F |
| $CH_3$ | $C_3F_7$ | F | H | F | F |
| $C_2H_5$ | $C_3F_7$ | F | H | F | F |
| n-$C_3H_7$ | $C_3F_7$ | F | H | F | F |
| n-$C_4H_9$ | $C_3F_7$ | F | H | F | F |
| n-$C_5H_{11}$ | $C_3F_7$ | F | H | F | F |
| n-$C_6H_{13}$ | $C_3F_7$ | F | H | F | F |
| H | $C_3F_7$ | F | F | F | F |
| $CH_3$ | $C_3F_7$ | F | F | F | F |
| $C_2H_5$ | $C_3F_7$ | F | F | F | F |
| n-$C_3H_7$ | $C_3F_7$ | F | F | F | F |
| n-$C_4H_9$ | $C_3F_7$ | F | F | F | F |
| n-$C_5H_{11}$ | $C_3F_7$ | F | F | F | F |
| n-$C_6H_{13}$ | $C_3F_7$ | F | F | F | F |
| H | $SF_5$ | H | H | F | F |
| $CH_3$ | $SF_5$ | H | H | F | F |
| $C_2H_5$ | $SF_5$ | H | H | F | F |
| n-$C_3H_7$ | $SF_5$ | H | H | F | F |
| n-$C_4H_9$ | $SF_5$ | H | H | F | F |
| n-$C_5H_{11}$ | $SF_5$ | H | H | F | F |
| n-$C_6H_{13}$ | $SF_5$ | H | H | F | F |
| H | $SF_5$ | F | H | F | F |
| $CH_3$ | $SF_5$ | F | H | F | F |
| $C_2H_5$ | $SF_5$ | F | H | F | F |
| n-$C_3H_7$ | $SF_5$ | F | H | F | F |
| n-$C_4H_9$ | $SF_5$ | F | H | F | F |
| n-$C_5H_{11}$ | $SF_5$ | F | H | F | F |
| n-$C_6H_{13}$ | $SF_5$ | F | H | F | F |
| H | $SF_5$ | F | F | F | F |
| $CH_3$ | $SF_5$ | F | F | F | F |
| $C_2H_5$ | $SF_5$ | F | F | F | F |
| n-$C_3H_7$ | $SF_5$ | F | F | F | F |
| n-$C_4H_9$ | $SF_5$ | F | F | F | F |
| n-$C_5H_{11}$ | $SF_5$ | F | F | F | F |

-continued

| $R^1$ | X | $L^1$ | $L^2$ | $L^3$ | $L^4$ |
|---|---|---|---|---|---|
| n-$C_6$H13 | $SF_5$ | F | F | F | F |
| H | CN | H | H | F | F |
| $CH_3$ | CN | H | H | F | F |
| $C_2H_5$ | CN | H | H | F | F |
| n-$C_3H_7$ | CN | H | H | F | F |
| n-$C_4$H9 | CN | H | H | F | F |
| n-$C_5H_{11}$ | CN | H | H | F | F |
| n-$C_6H_{13}$ | CN | H | H | F | F |
| H | CN | F | H | F | F |
| $CH_3$ | CN | F | H | F | F |
| $C_2H_5$ | CN | F | H | F | F |
| n-$C_3H_7$ | CN | F | H | F | F |
| n-$C_4H_9$ | CN | F | H | F | F |
| n-$C_5H_{11}$ | CN | F | H | F | F |
| n-$C_6H_{13}$ | CN | F | H | F | F |
| H | CN | F | F | F | F |
| $CH_3$ | CN | F | F | F | F |
| $C_2H_5$ | CN | F | F | F | F |
| n-$C_3H_7$ | CN | F | F | F | F |
| n-$C_4H_9$ | CN | F | F | F | F |
| n-$C_5H_{11}$ | CN | F | F | F | F |
| n-$C_6H_{13}$ | CN | F | F | F | F |
| H | $CF_3$ | H | H | F | F |
| $C_2H_5$ | $CF_3$ | H | H | F | F |
| n-$C_3H_7$ | $CF_3$ | H | H | F | F |
| n-$C_4H_9$ | $CF_3$ | H | H | F | F |
| n-$C_5H_{11}$ | $CF_3$ | H | H | F | F |
| n-$C_6H_{13}$ | $CF_3$ | H | H | F | F |
| $CH_2$=CH | $CF_3$ | H | H | F | F |
| H | $CF_3$ | F | F | F | F |
| $C_2H_5$ | $CF_3$ | F | F | F | F |
| n-$C_3H_7$ | $CF_3$ | F | F | F | F |
| n-$C_4H_9$ | $CF_3$ | F | F | F | F |
| n-$C_5H_{11}$ | $CF_3$ | F | F | F | F |
| n-$C_6H_{13}$ | $CF_3$ | F | F | F | F |
| $CH_2$=CH | $CF_3$ | F | F | F | F |
| H | F | H | H | F | F |
| $C_2H_5$ | F | H | H | F | F |
| n-$C_3H_7$ | F | H | H | F | F |
| n-$C_4H_9$ | F | H | H | F | F |
| n-$C_5H_{11}$ | F | H | H | F | F |
| n-$C_6H_{13}$ | F | H | H | F | F |
| $CH_2$=CH | F | H | H | F | F |

EXAMPLE 6

Separation of the enantiomers of

T

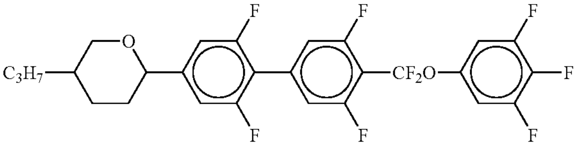

In order to separate the enantiomers, 8.7 g of T are passed through a preparative enantio-HPLC column. After the two fractions have been obtained, each is recrystallized from ethanol and its optical rotation is determined.

| | | |
|---|---|---|
| 3.18 g enantio-HPLC: | 99.68% - optical rotation: | +29.0° |
| 3.74 g enantio-HPLC: | 98.25% - optical rotation: | −28.0° |

The following racemates are separated into the enantiomers by an analogous method:

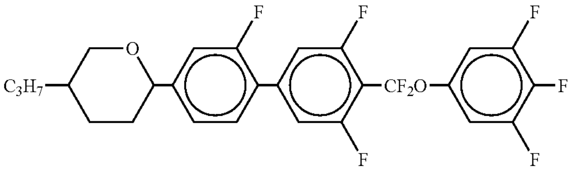

Enantio-HPLC: 99.97% - optical rotation: +32.0°
Enantio-HPLC: 99.40% - optical rotation: −32.1°

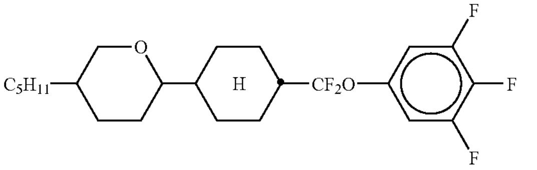

Enantio-HPLC: 100.0% - optical rotation: +4.5°
Enantio-HPLC: 99.9% - optical rotation: −4.9°

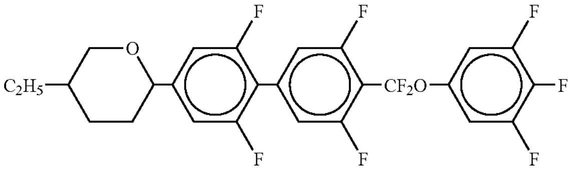

Enantio-HPLC: 99.98% - optical rotation: +28.5°
Enantio-HPLC: 100.00% - optical rotation: −31.4°

MIXTURE EXAMPLES

Example M1

| | | | |
|---|---|---|---|
| CCH-5CF$_3$ | 3.00% | Clearing point [° C.]: | +80.0 |
| CCP-1F.F.F | 3.00% | Δn [589 nm, 20° C.]: | +0.0660 |
| CCP-2F.F.F | 8.00% | Δε [kHz, 20° C.]: | +10.4 |
| CCP-3F.F.F | 8.00% | d · Δn [20° C., μm]: | 0.50 |
| CCP-5F.F.F | 5.00% | Twist [°]: | 90 |
| CCP-20CF$_3$.F | 8.00% | V$_{10}$ [V]: | 1.31 |
| CCP-50CF$_3$.F | 8.00% | | |
| CCOC-3-3 | 2.00% | | |
| CCOC-4-3 | 2.00% | | |
| CCQU-2-F | 10.00% | | |
| CCQU-3-F | 12.00% | | |
| CCQU-5-F | 8.00% | | |
| ACQU-3-F | 15.00% | | |
| CCH-301 | 3.00% | | |
| CCH-501 | 5.00% | | |

Example M2

| | | | |
|---|---|---|---|
| CCH-501 | 7.00% | Clearing point [° C.]: | +88.5 |
| CCH-5CF$_3$ | 7.00% | Δn [589 nm, 20° C.]: | +0.0657 |
| CCP-2F.F.F | 4.00% | Δε [kHz, 20° C.]: | +9.9 |
| CCP-3F.F.F | 7.00% | d · Δn [20° C., μm]: | 0.50 |
| CCP-5F.F.F | 5.00% | Twist [°]: | 90 |
| CCP-30CF$_3$.F | 8.00% | V$_{10}$ [V]: | 1.45 |
| CCP-50CF$_3$.F | 8.00% | | |
| CCOC-3-3 | 3.00% | | |
| CCOC-3-5 | 2.00% | | |
| CCOC-4-3 | 4.00% | | |
| CCQU-2-F | 10.00% | | |
| CCQU-3-F | 12.00% | | |
| CCQU-5-F | 8.00% | | |
| ACQU-3-F | 15.00% | | |

Example M3

| | | | |
|---|---|---|---|
| CCH-301 | 7.00% | Clearing point [° C.]: | +81.0 |
| CCH-501 | 10.00% | Δn [589 nm, 20° C.]: | +0.0608 |
| CCH-5CF$_3$ | 2.00% | Δε [kHz, 20° C.]: | +8.4 |
| CCP-2F.F.F | 9.00% | d · Δn [20° C., μm]: | 0.50 |
| CCP-3F.F.F | 4.00% | Twist [°]: | 90 |
| CCP-5F.F.F | 4.00% | V$_{10}$ [V]: | 1.49 |
| CCP-30CF$_3$.F | 2.00% | | |
| CCP-50CF$_3$.F | 4.00% | | |
| CCOC-3-3 | 3.00% | | |
| CCOC-3-5 | 2.00% | | |
| CCOC-4-3 | 4.00% | | |
| ACQU-3-F | 15.00% | | |
| CCQU-2-F | 10.00% | | |
| CCQU-3-F | 12.00% | | |
| CCQU-5-F | 8.00% | | |
| CCH-35 | 4.00% | | |

Example M4

| | | | |
|---|---|---|---|
| CCP-1F.F.F | 4.00% | Clearing point [° C.]: | +79.0 |
| CCP-2F.F.F | 10.00% | Δn [589 nm, 20° C.]: | +0.0808 |
| CCP-3F.F.F | 9.00% | Δε [kHz, 20° C.]: | +15.5 |
| CCP-5F.F.F | 5.00% | d · Δn [20° C., μm]: | 0.50 |
| CCP-30CF$_3$.F | 5.00% | Twist [°]: | 90 |
| CCP-50CF$_3$.F | 7.00% | $\gamma_1$ [20° C., mPa · s]: | 150 |
| PUQU-2-F | 5.00% | V$_{10}$ [V]: | 0.98 |
| PUQU-3-F | 5.00% | | |
| CCQU-2-F | 11.00% | | |
| CCQU-3-F | 12.00% | | |
| CCQU-5-F | 8.00% | | |
| CCGU-3-F | 4.00% | | |
| ACQU-3-F | 15.00% | | |

Example M5

| | | | |
|---|---|---|---|
| BCH-3F.F | 10.80% | Clearing point [° C.]: | +89.0 |
| BCH-5F.F | 9.00% | Δn [589 nm, 20° C.]: | +0.0930 |
| ECCP-30CF$_3$ | 4.50% | Δε [kHz, 20° C.]: | +6.2 |
| ECCP-50CF$_3$ | 4.50% | | |
| CBC-33F | 1.80% | | |
| CBC-53F | 1.80% | | |
| CBC-55F | 1.80% | | |
| PCH-6F | 7.20% | | |
| PCH-7F | 5.40% | | |
| CCP-20CF$_3$ | 7.20% | | |
| CCP-30CF$_3$ | 10.80% | | |
| CCP-40CF$_3$ | 6.30% | | |
| CCP-50CF$_3$ | 9.90% | | |
| PCH-5F | 9.00% | | |
| ACQU-3-F | 10.00% | | |

Example M6

| | | | |
|---|---|---|---|
| CCH-35 | 3.00% | Clearing point [° C.]: | +81.0 |
| CC-3-V1 | 4.00% | Δn [589 nm, 20° C.]: | +0.0912 |
| CCP-1F.F.F | 10.00% | d · Δn [20° C., μm]: | 0.50 |
| CCP-2F.F.F | 9.00% | Twist [°]: | 90 |
| CCP-3F.F.F | 9.00% | γ$_1$ [20° C., mPa · s]: | 129 |
| CCP-20CF$_3$.F | 6.00% | V$_{10}$ [V]: | 1.30 |
| CCG-V-F | 9.00% | | |
| CCP-20CF$_3$ | 8.00% | | |
| CCP-30CF$_3$ | 8.00% | | |
| CCP-40CF$_3$ | 6.00% | | |
| CCP-50CF$_3$ | 7.00% | | |
| PUQU-2-F | 5.00% | | |
| PUQU-3-F | 7.00% | | |
| APUQU-2-F | 4.50% | | |
| CGUQU-3-F | 3.50% | | |
| CBC-33 | 1.00% | | |

Example M7

| | | | |
|---|---|---|---|
| CCP-2F.F.F | 11.00% | Clearing point [° C.]: | +80.0 |
| CCP-20CF$_3$ | 7.00% | Δn [589 nm, 20° C.]: | +0.1034 |
| CCP-30CF$_3$ | 8.00% | d · Δn [20° C., μm]: | 0.50 |
| CCP-40CF$_3$ | 5.00% | Twist [°]: | 90 |
| PGU-2-F | 8.00% | V$_{10}$ [V]: | 1.22 |
| PGU-3-F | 7.00% | | |
| CC-3-V1 | 10.00% | | |
| CCH-35 | 3.00% | | |
| CCP-V-1 | 5.00% | | |
| CCP-20CF$_3$.F | 8.00% | | |
| CCP-30CF$_3$.F | 11.00% | | |
| PUQU-2-F | 4.00% | | |
| PUQU-3-F | 6.00% | | |
| ACQU-3-F | 7.00% | | |

Example M8

| | | | |
|---|---|---|---|
| CCP-1F.F.F | 6.00% | S → N [° C.]: | −40.0 |
| CCP-2F.F.F | 10.00% | Clearing point [° C.]: | +80.0 |
| CCP-20CF$_3$ | 8.00% | Δn [589 nm, 20° C.]: | +0.1029 |
| CCP-30CF$_3$ | 8.00% | d · Δn [20° C., μm]: | 0.50 |
| CCP-40CF$_3$ | 6.00% | Twist [°]: | 90 |
| CCP-50CF$_3$ | 8.00% | V$_{10}$ [V]: | 1.24 |
| PGU-2-F | 8.00% | | |
| PGU-3-F | 7.00% | | |
| CC-3-V1 | 8.00% | | |
| CCH-35 | 5.00% | | |
| CCP-V-1 | 5.00% | | |
| CCP-30CF$_3$.F | 3.00% | | |
| PUQU-2-F | 4.00% | | |
| PUQU-3-F | 6.00% | | |
| ACQU-3-F | 8.00% | | |

Example M9

| | | | |
|---|---|---|---|
| CC-3-V1 | 5.00% | S → N [° C.]: | −30.0 |
| CCP-1F.F.F | 5.00% | Clearing point [° C.]: | +85.5 |
| CCP-2F.F.F | 8.00% | Δn [589 nm, 20° C.]: | +0.0931 |
| CCP-20CF$_3$.F | 8.00% | Δε [kHz, 20° C.]: | 12.1 |
| CCP-20CF$_3$ | 5.00% | γ$_1$ [20° C., mPa · s]: | 135 |
| CCP-30CF$_3$ | 8.00% | d · Δn [20° C., μm]: | 0.50 |
| CCP-40CF$_3$ | 6.00% | Twist [°]: | 90 |
| CCP-50CF$_3$ | 8.00% | V$_{10}$ [V]: | 1.23 |
| PUQU-2-F | 5.00% | | |
| PUQU-3-F | 7.00% | | |
| PGU-2-F | 5.00% | | |
| CCP-V-1 | 10.00% | | |
| ACQU-3-F | 12.00% | | |
| ACQU-4-F | 8.00% | | |

Example M10

| | | | |
|---|---|---|---|
| CC-3-V1 | 6.00% | S → N [° C.]: | −40.0 |
| CCP-1F.F.F | 6.00% | Clearing point [° C.]: | +83.5 |
| CCP-2F.F.F | 7.00% | Δn [589 nm, 20° C.]: | +0.0917 |
| CCP-20CF$_3$.F | 10.00% | Δε [kHz, 20° C.]: | 11.7 |
| CCP-20CF$_3$ | 8.00% | γ$_1$ [20° C., mPa · s]: | 125 |
| CCP-30CF$_3$ | 8.00% | d · Δn [20° C., μm]: | 0.50 |
| CCP-40CF$_3$ | 6.00% | Twist [°]: | 90 |
| CCP-50CF$_3$ | 4.00% | V$_{10}$ [V]: | 1.25 |
| PUQU-2-F | 5.00% | | |
| PUQU-3-F | 8.00% | | |
| PGU-2-F | 4.00% | | |
| CCP-V-1 | 10.00% | | |
| ACQU-3-F | 10.00% | | |
| ACQU-4-F | 8.00% | | |

Example M11 (IPS)

| | | | |
|---|---|---|---|
| CDU-2-F | 5.00% | Clearing point [° C.]: | +81 |
| PGU-2-F | 2.50% | Δn [589 nm, 20° C.]: | +0.0850 |
| CCZU-2-F | 4.00% | Δε [kHz, 20° C.]: | 10.1 |
| CCZU-3-F | 11.00% | γ$_1$ [20° C., mPa · s]: | 98 |
| CCP-V-1 | 15.00% | | |
| CCQU-3-F | 10.00% | | |
| PUQU-2-F | 4.00% | | |
| PUQU-3-F | 5.00% | | |
| CC-3-V1 | 11.00% | | |
| PCH-302 | 3.50% | | |
| CC-5-V | 11.00% | | |
| ACQU-3-F | 9.00% | | |
| ACQU-4-F | 9.00% | | |

Example M12 (IPS)

| | | | |
|---|---|---|---|
| PGU-2-F | 9.00% | Clearing point [° C.]: | 81.0 |
| PGU-3-F | 2.00% | Δn [589 nm, 20° C.]: | 0.1090 |
| CGZP-2-OT | 8.00% | Δε [kHz, 20° C.]: | 11.0 |
| CGZP-3-OT | 10.00% | $\gamma_1$ [20° C., mPa · s]: | 100 |
| CCP-20CF$_3$ | 6.00% | | |
| CCP-30CF$_3$ | 6.50% | | |
| PUQU-2-F | 4.00% | | |
| PUQU-3-F | 3.50% | | |
| CCP-V-1 | 9.00% | | |
| CC-3-V1 | 11.00% | | |
| PCH-302 | 15.00% | | |
| ACQU-3-F | 8.00% | | |
| ACQU-4-F | 8.00% | | |

Example M13

| | | | |
|---|---|---|---|
| CC-4-V | 17.00% | Clearing point [° C.]: | 74.5 |
| CC-3-V1 | 3.00% | Δn [589 nm, 20° C.]: | +0.0890 |
| CCQU-2-F | 12.00% | Δε [kHz, 20° C.]: | 12.7 |
| CCQU-3-F | 12.00% | $\gamma_1$ [20° C., mPa · s]: | 119 |
| CCQU-5-F | 10.00% | $V_{10}$ [V]: | 1.09 |
| CCP-20CF$_3$ | 5.00% | | |
| PGU-2-F | 3.00% | | |
| PGU-3-F | 6.00% | | |
| AUUQGU-3-F | 8.00% | | |
| CCP-1F.F.F | 8.00% | | |
| CCP-3F.F.F | 9.00% | | |
| BCH-3F.F.F | 7.00% | | |

Example M14

| | | | |
|---|---|---|---|
| CC-3-V1 | 6.00% | S → N [° C.]: | <−40.0 |
| CCP-1F.F.F | 9.00% | Clearing point [° C.]: | 83.5 |
| CCP-2F.F.F | 9.00% | Δn [589 nm, 20° C.]: | 0.0941 |
| CCP-3F.F.F | 10.00% | Δε [kHz, 20° C.]: | 11.4 |
| CCQU-3-F | 11.00% | $\gamma_1$ [20° C., mPa · s]: | 137 |
| CCQU-5-F | 9.00% | $V_{10}$ [V]: | 1.23 |
| CCP-20CF$_3$ | 6.00% | | |
| CCP-30CF$_3$ | 8.00% | | |
| CCP-50CF$_3$ | 2.00% | | |
| CGU-2-F | 4.00% | | |
| PGU-2-F | 6.00% | | |
| PGU-3-F | 6.00% | | |
| CCP-V-1 | 7.00% | | |
| ACQU-3-F | 7.00% | | |

Example M15

| | | | |
|---|---|---|---|
| CC-3-V1 | 5.00% | S → N [° C.]: | <−40.0 |
| CCP-1F.F.F | 7.00% | Clearing point [° C.]: | 84.0 |
| CCP-2F.F.F | 10.00% | Δn [589 nm, 20° C.]: | 0.0919 |
| ACQU-1-F | 8.00% | Δε [kHz, 20° C.]: | 11.9 |
| ACQU-3-F | 8.00% | $\gamma_1$ [20° C., mPa · s]: | 135 |
| CCG-V-F | 11.00% | $V_{10}$ [V]: | 1.19 |
| BCH-3F.F | 2.50% | | |
| CCP-20CF$_3$ | 8.00% | | |

-continued

| | |
|---|---|
| CCP-30CF$_3$ | 8.00% |
| CCP-40CF$_3$ | 5.00% |
| CCP-V-1 | 8.00% |
| PUQU-2-F | 5.50% |
| PUQU-3-F | 8.00% |
| CCGU-3-F | 6.00% |

Example M16

| | |
|---|---|
| CC-3-V1 | 5.00% |
| CCP-1F.F.F | 7.00% |
| CCP-2F.F.F | 6.00% |
| CCQU-3-F | 10.00% |
| CCG-V-F | 6.00% |
| CCP-20CF$_3$ | 8.00% |
| CCP-30CF$_3$ | 8.00% |
| CCP-40CF$_3$ | 6.00% |
| CCP-50CF$_3$ | 8.00% |
| ACQU-2-F | 6.00% |
| ACQU-3-F | 6.00% |
| PUQU-2-F | 5.00% |
| PUQU-3-F | 7.00% |
| PGU-3-F | 6.00% |
| CCP-V-1 | 6.00% |

Example M17

| | | | |
|---|---|---|---|
| CCP-20CF$_3$ | 8.00% | S → N [° C.]: | <−30.0 |
| CCP-30CF$_3$ | 8.00% | Clearing point [° C.]: | 75.0 |
| CCP-40CF$_3$ | 5.00% | Δn [589 nm, 20° C.]: | 0.0858 |
| PGU-2-F | 5.00% | Δε [kHz, 20° C.]: | 13.3 |
| PGU-3-F | 5.00% | $\gamma_1$ [20° C., mPa · s]: | 152 |
| CCP-1F.F.F | 10.00% | $V_{10}$ [V]: | 1.07 |
| CCP-2F.F.F | 11.00% | | |
| CCP-3F.F.F | 12.00% | | |
| CCZU-2-F | 3.00% | | |
| CCZU-3-F | 13.00% | | |
| ACQU-2-F | 8.00% | | |
| ACQU-3-F | 8.00% | | |
| ACQU-5-F | 4.00% | | |

Example M18

| | | | |
|---|---|---|---|
| CC-4-V | 11.00% | S → N [° C.]: | <−40.0 |
| CDU-2-F | 7.00% | Clearing point [° C.]: | 76.5 |
| CDU-3-F | 8.00% | Δn [589 nm, 20° C.]: | 0.0870 |
| CDU-5-F | 9.00% | Δε [kHz, 20° C.]: | 13.6 |
| CCP-1F.F.F | 8.50% | $\gamma_1$ [20° C., mPa · s]: | 146 |
| CCP-20CF$_3$ | 8.00% | $V_{10}$ [V]: | 1.09 |
| CCP-30CF$_3$ | 6.50% | | |
| PGU-2-F | 3.00% | | |
| PGU-3-F | 6.00% | | |
| CCGU-3-F | 6.00% | | |
| CBC-33 | 3.00% | | |
| ACQU-2-F | 8.00% | | |
| ACQU-3-F | 8.00% | | |
| ACQU-5-F | 8.00% | | |

Example M19

| | | | |
|---|---|---|---|
| CC-4-V | 10.00% | S → N [° C.]: | <−40.0 |
| CCP-1F.F.F | 9.00% | Clearing point [° C.]: | 75.0 |
| CCP-2F.F.F | 9.00% | Δn [589 nm, 20° C.]: | 0.0869 |
| CCP-30CF$_3$.F | 8.00% | Δε [kHz, 20° C.]: | 13.1 |
| CCP-20CF$_3$ | 8.00% | $\gamma_1$ [20° C., mPa · s]: | 128 |
| CCP-30CF$_3$ | 8.00% | $V_{10}$ [V]: | 1.06 |
| ACQU-2-F | 8.00% | | |
| ACQU-3-F | 8.00% | | |
| ACQU-4-F | 8.00% | | |
| PGU-2-F | 2.00% | | |
| PUQU-2-F | 5.00% | | |
| PUQU-3-F | 8.00% | | |
| CCGU-3-F | 6.00% | | |
| CBC-33 | 3.00% | | |

Example M20

| | | | |
|---|---|---|---|
| CC-4-V | 18.00% | S → N [° C.]: | <−40.0 |
| CC-3-V1 | 3.00% | Clearing point [° C.]: | 75.0 |
| CCQU-2-F | 11.00% | Δn [589 nm, 20° C.]: | 0.0891 |
| CCQU-3-F | 12.00% | Δε [kHz, 20° C.]: | 13.0 |
| CCQU-5-F | 8.00% | $\gamma_1$ [20° C., mPa · s]: | 113 |
| CCP-20CF$_3$ | 8.00% | $V_{10}$ [V]: | 1.08 |
| PGU-2-F | 2.00% | | |
| PGU-3-F | 6.00% | | |
| APUQU-2-F | 8.00% | | |
| APUQU-3-F | 9.00% | | |
| CCP-1F.F.F | 7.00% | | |
| CCP-2F.F.F | 7.00% | | |
| CCGU-3-F | 1.00% | | |

Example M21

| | | | |
|---|---|---|---|
| CC-4-V | 17.00% | S → N [° C.]: | <−40.0 |
| PUQU-2-F | 5.00% | Clearing point [° C.]: | 75.5 |
| PUQU-3-F | 7.00% | Δn [589 nm, 20° C.]: | 0.0894 |
| CCP-20CF$_3$ | 6.00% | Δε [kHz, 20° C.]: | 14.0 |
| CCP-30CF$_3$ | 5.00% | $\gamma_1$ [20° C., mPa · s]: | 120 |
| CCP-2F.F.F | 5.00% | $V_{10}$ [V]: | 1.06 |
| CCZU-2-F | 3.00% | | |
| CCZU-3-F | 13.00% | | |
| PGU-3-F | 6.00% | | |
| ACQU-1-F | 8.00% | | |
| ACQU-3-F | 8.00% | | |
| ACQU-4-F | 8.00% | | |
| CCGU-3-F | 6.00% | | |
| CBC-33 | 3.00% | | |

Example M22

| | | | |
|---|---|---|---|
| CC-4-V | 16.00% | S → N [° C.]: | <−40.0 |
| CC-3-V1 | 8.00% | Clearing point [° C.]: | 75.5 |
| CCP-1F.F.F | 5.00% | Δn [589 nm, 20° C.]: | 0.0916 |
| CCP-2F.F.F | 6.00% | Δε [kHz, 20° C.]: | 13.6 |
| CCQU-2-F | 10.00% | $\gamma_1$ [20° C., mPa · s]: | 107 |
| CCQU-3-F | 12.00% | $V_{10}$ [V]: | 1.08 |
| CCP-20CF$_3$ | 4.00% | | |
| CCZU-3-F | 13.00% | | |

-continued

| | |
|---|---|
| PGU-2-F | 5.00% |
| PGU-3-F | 5.00% |
| APUQU-2-F | 8.00% |
| APUQU-3-F | 8.00% |

Example M23

| | | | |
|---|---|---|---|
| CCP-1F.F.F | 6.00% | Clearing point [° C.]: | 78.2 |
| CCP-2F.F.F | 9.00% | Δn [589 nm, 20° C.]: | 0.0791 |
| CCP-3F.F.F | 6.00% | Δε [kHz, 20° C.]: | 14.3 |
| CCP-5F.F.F | 4.00% | | |
| CCP-20CF$_3$.F | 5.00% | | |
| CCP-30CF$_3$.F | 5.00% | | |
| CCP-50CF$_3$.F | 7.00% | | |
| CDU-2-F | 7.00% | | |
| CDU-3-F | 10.00% | | |
| CDU-5-F | 10.00% | | |
| CGU-3-F | 4.00% | | |
| CCGU-3-F | 9.00% | | |
| ACQU-3-F | 18.00% | | |

Example M24

| | | | |
|---|---|---|---|
| CCQU-2-F | 13.00% | Clearing point [° C.]: | 84.5 |
| CCQU-3-F | 14.00% | Δn [589 nm, 20° C.]: | 0.0779 |
| CCQU-5-F | 13.00% | Δε [kHz, 20° C.]: | 18.7 |
| ACQU-5-F | 33.00% | $\gamma_1$ [20° C., mPa · s]: | 182 |
| APUQU-2-F | 7.00% | $V_{10}$ [V]: | 0.95 |
| APUQU-3-F | 9.00% | | |
| CC-4-V | 11.00% | | |

Example M25

| | | | |
|---|---|---|---|
| CC-4-V | 18.00% | Clearing point [° C.]: | 74.5 |
| CC-3-V1 | 5.00% | Δn [589 nm, 20° C.]: | 0.0882 |
| CCP-2F.F.F | 8.00% | Δε [kHz, 20° C.]: | 12.9 |
| CCQU-2-F | 9.00% | $\gamma_1$ [20° C., mPa · s]: | 103 |
| CCQU-3-F | 11.00% | $V_{10}$ [V]: | 1.09 |
| CCQU-5-F | 11.00% | | |
| CCQG-3-F | 6.00% | | |
| BCH-3F.F.F | 8.00% | | |
| APUQU-2-F | 6.00% | | |
| APUQU-3-F | 6.00% | | |
| PUQU-2-F | 3.00% | | |
| PUQU-3-F | 6.00% | | |
| CCGU-3-F | 1.50% | | |
| PGP-2-3 | 1.50% | | |

Example M26 (IPS)

| | | | |
|---|---|---|---|
| CCP-20CF$_3$ | 7.00% | Clearing point [° C.]: | 80.0 |
| CCP-30CF$_3$ | 7.00% | Δn [589 nm, 20° C.]: | 0.1102 |
| CCP-40CF$_3$ | 7.00% | Δε [kHz, 20° C.]: | 11.1 |
| CCP-50CF$_3$ | 3.50% | $\gamma_1$ [20° C., mPa · s]: | 82 |
| CCZU-3-F | 5.00% | $V_{10}$ [V]: | 1.13 |

-continued

| | |
|---|---|
| PGU-2-F | 9.00% |
| PGU-3-F | 8.00% |
| PUQU-2-F | 6.00% |
| PUQU-3-F | 6.00% |
| CC-3-V1 | 13.00% |
| CC-4-V | 14.00% |
| CCP-V-1 | 8.00% |
| APUQU-2-F | 6.50% |

Example M27 (IPS)

| | | | |
|---|---|---|---|
| CCP-20CF$_3$ | 8.00% | Clearing point [° C.]: | 79.5 |
| CCP-30CF$_3$ | 8.00% | $\Delta n$ [589 nm, 20° C.]: | 0.1095 |
| CCP-40CF$_3$ | 8.00% | $\Delta\epsilon$ [kHz, 20° C.]: | 11.4 |
| CCZU-3-F | 5.00% | $\gamma_1$ [20° C., mPa·s]: | 87 |
| PGU-2-F | 9.00% | $V_{10}$ [V]: | 1.11 |
| PGU-3-F | 8.50% | | |
| PUQU-2-F | 6.00% | | |
| PUQU-3-F | 5.00% | | |
| CC-3-V1 | 12.50% | | |
| CC-4-V | 14.00% | | |
| CCP-V-1 | 9.00% | | |
| AGUQU-2-F | 3.50% | | |
| AGUQU-3-F | 3.50% | | |

Example M28 (IPS)

| | | | |
|---|---|---|---|
| CCP-2F.F.F | 6.50% | Clearing point [° C.]: | 78.0 |
| CCP-30CF$_3$ | 6.00% | $\Delta n$ [589 nm, 20° C.]: | 0.0805 |
| CCZU-2-F | 4.00% | $\Delta\epsilon$ [kHz, 20° C.]: | 14.8 |
| CCZU-3-F | 15.00% | $\gamma_1$ [20° C., mPa·s]: | 121 |
| CDU-2-F | 9.00% | | |
| CDU-3-F | 4.00% | | |
| CCQU-3-F | 13.00% | | |
| CCQU-5-F | 10.00% | | |
| PUQU-2-F | 5.00% | | |
| PUQU-3-F | 5.00% | | |
| APUQU-2-F | 6.00% | | |
| CC-3-V1 | 12.00% | | |
| CC-4-V | 4.50% | | |

Example 28 (IPS)

| | | | |
|---|---|---|---|
| CDU-2-F | 9.00% | Clearing point [° C.]: | 76.5 |
| CDU-3-F | 8.00% | $\Delta n$ [589 nm, 20° C.]: | 0.0960 |
| PGU-2-F | 9.00% | $\Delta\epsilon$ [kHz, 20° C.]: | 12.7 |
| CCZU-2-F | 4.00% | $\gamma_1$ [20° C., mPa·s]: | 92 |
| CCZU-3-F | 11.00% | $V_{10}$ [V]: | 1.02 |
| PUQU-2-F | 4.00% | | |
| PUQU-3-F | 6.00% | | |
| APUQU-2-F | 7.00% | | |
| CCP-V-1 | 14.50% | | |
| CC-3-V1 | 12.50% | | |
| CC-4-V | 10.00% | | |
| CCH-35 | 5.00% | | |

Example M30 (IPS)

| | | | |
|---|---|---|---|
| CCP-30CF$_3$ | 3.50% | Clearing point [° C.]: | 75.5 |
| CDU-2-F | 5.00% | $\Delta n$ [589 nm, 20° C.]: | 0.0975 |
| PGU-2-F | 6.50% | $\Delta\epsilon$ [kHz, 20° C.]: | 8.4 |
| PUQU-2-F | 8.00% | $\gamma_1$ [20° C., mPa·s]: | 67 |
| PUQU-3-F | 8.00% | $V_{10}$ [V]: | 1.28 |
| CCP-V-1 | 13.00% | | |
| CCP-V2-1 | 9.50% | | |
| CC-3-V1 | 13.00% | | |
| CC-5-V | 9.00% | | |
| CC-4-V | 14.00% | | |
| PCH-302 | 3.50% | | |
| APUQU-2-F | 7.00% | | |

Example M31 (IPS)

| | | | |
|---|---|---|---|
| PGU-2-F | 6.50% | Clearing point [° C.]: | 74.0 |
| CDU-2-F | 9.00% | $\Delta n$ [589 nm, 20° C.]: | 0.1005 |
| PUQU-2-F | 11.00% | $\Delta\epsilon$ [kHz, 20° C.]: | 14.1 |
| PUQU-3-F | 10.00% | $\gamma_1$ [20° C., mPa·s]: | 92 |
| CCP-30CF$_3$ | 8.00% | | |
| CCZU-3-F | 11.50% | | |
| CC-4-V | 10.00% | | |
| CC-5-V | 3.00% | | |
| CC-3-V1 | 11.00% | | |
| CCP-V2-1 | 13.00% | | |
| APUQU-2-F | 7.00% | | |

Example M32

| | | | |
|---|---|---|---|
| CCQU-2-F | 10.00% | Clearing point [° C.]: | 82.0 |
| CCQU-3-F | 12.00% | $\Delta n$ [589 nm, 20° C.]: | 0.0792 |
| CCQU-5-F | 8.00% | $\Delta\epsilon$ [kHz, 20° C.]: | 11.2 |
| CCP-1F.F.F | 6.00% | $V_{10}$ [V]: | 1.20 |
| CCP-2F.F.F | 5.00% | | |
| CCP-3F.F.F | 5.00% | | |
| CC-3-V1 | 10.00% | | |
| CC-4-V | 14.00% | | |
| CGU-2-F | 5.00% | | |
| CCGU-3-F | 5.00% | | |
| ACQG-3-F | 5.00% | | |
| ACQG-4-F | 5.00% | | |
| APUQU-2-F | 5.00% | | |
| APUQU-3-F | 5.00% | | |

Example M33

| | | | |
|---|---|---|---|
| CCQU-2-F | 11.00% | Clearing point [° C.]: | 81.5 |
| CCQU-3-F | 13.00% | $\Delta n$ [589 nm, 20° C.]: | 0.0804 |
| CCQU-5-F | 11.00% | $\Delta\epsilon$ [kHz, 20° C.]: | 13.6 |
| CCP-1F.F.F | 8.00% | $\gamma_1$ [20° C., mPa·s]: | 153 |
| CCP-2F.F.F | 10.00% | $V_{10}$ [V]: | 1.06 |
| CCP-3F.F.F | 10.00% | | |
| CCP-5F.F.F | 6.00% | | |
| CC-3-V1 | 9.00% | | |
| CGU-3-F | 4.00% | | |
| ACQG-3-F | 3.00% | | |
| ACQG-4-F | 5.00% | | |
| APUQU-2-F | 5.00% | | |
| APUQU-3-F | 5.00% | | |

Example M34

| | | | |
|---|---|---|---|
| CCH-5CF$_3$ | 5.00% | Clearing point [° C.]: | 80.5 |
| CCP-1F.F.F | 5.00% | Δn [589 nm, 20° C.]: | 0.0660 |
| CCP-2F.F.F | 9.00% | Δε [kHz, 20° C.]: | 9.7 |
| CCP-3F.F.F | 8.00% | $V_{10}$ [V]: | 1.27 |
| CCP-5F.F.F | 5.00% | | |
| CCP-20CF$_3$.F | 6.00% | | |
| CCP-50CF$_3$.F | 6.00% | | |
| CCOC-3-3 | 2.00% | | |
| CCOC-4-3 | 2.00% | | |
| CCQU-2-F | 10.00% | | |
| CCQU-3-F | 12.00% | | |
| CCQU-5-F | 8.00% | | |
| CCH-501 | 6.00% | | |
| ACQG-3-F | 8.00% | | |
| ACQG-4-F | 8.00% | | |

Example M35

| | | | |
|---|---|---|---|
| CCP-1F.F.F | 7.00% | Clearing point [° C.]: | 81.5 |
| CCP-2F.F.F | 8.00% | Δn [589 nm, 20° C.]: | 0.0658 |
| CCP-3F.F.F | 7.00% | Δε [kHz, 20° C.]: | 13.5 |
| CCP-5F.F.F | 4.00% | $V_{10}$ [V]: | 1.06 |
| CCQU-2-F | 11.00% | | |
| CCQU-3-F | 12.00% | | |
| CCQU-5-F | 8.00% | | |
| ACQU-2-F | 8.00% | | |
| ACQU-3-F | 9.00% | | |
| ACQU-5-F | 8.00% | | |
| ACQG-3-F | 7.00% | | |
| ACQG-4-F | 5.00% | | |
| CCOC-3-3 | 3.00% | | |
| CCOC-4-3 | 3.00% | | |

Example M36

| | | | |
|---|---|---|---|
| AUUQU-3-F | 6.00% | Clearing point [° C.]: | 98.0 |
| AGUQU-3-F | 6.00% | Δn [589 nm, 20° C.]: | 0.0927 |
| APUQU-2-F | 6.00% | Δε [kHz, 20° C.]: | 18.9 |
| CGU-2-F | 5.00% | | |
| CGU-3-F | 5.00% | | |
| CGU-5-F | 5.00% | | |
| CCZU-2-F | 5.50% | | |
| CCZU-3-F | 10.50% | | |
| CCZU-5-F | 5.50% | | |
| CCQU-2-F | 10.00% | | |
| CCQU-3-F | 10.00% | | |
| CCQU-5-F | 10.00% | | |
| CC-5-V | 9.50% | | |
| CCPC-33 | 2.00% | | |
| CCPC-34 | 2.00% | | |
| CCPC-35 | 2.00% | | |

Example M37

| | | | |
|---|---|---|---|
| CCQU-2-F | 7.00% | Clearing point [° C.]: | 85.5 |
| CCQU-3-F | 8.00% | Δn [589 nm, 20° C.]: | 0.0783 |
| CCQU-5-F | 8.00% | Δε [kHz, 20° C.]: | 11.66 |
| CCQG-3-F | 6.00% | $\gamma_1$ [20° C., mPa · s]: | 213 |
| ACQU-2-F | 17.00% | $V_{10}$ [V]: | 0.90 |
| ACQU-5-F | 16.00% | | |
| PUQU-2-F | 5.00% | | |
| PUQU-3-F | 5.00% | | |
| CCGU-3-F | 5.00% | | |
| CCOC-4-3 | 3.00% | | |
| CCZU-2-F | 3.00% | | |
| CCZU-3-F | 14.00% | | |
| CCZU-5-F | 3.00% | | |

Example M38

| | | | |
|---|---|---|---|
| BCH-3F.F | 10.80% | Clearing point [° C.]: | 56.9 |
| BCH-5F.F | 9.00% | Δn [589 nm, 20° C.]: | 0.0834 |
| ECCP-30CF$_3$ | 4.50% | Δε [kHz, 20° C.]: | 4.1 |
| ECCP-50CF$_3$ | 4.50% | $\gamma_1$ [20° C., mPa · s]: | 65 |
| CBC-33F | 1.80% | | |
| CBC-53F | 1.80% | | |
| CBC-55F | 1.80% | | |
| PCH-6F | 7.20% | | |
| PCH-7F | 5.40% | | |
| CCP-20CF$_3$ | 7.20% | | |
| CCP-30CF$_3$ | 10.80% | | |
| CCP-40CF$_3$ | 6.30% | | |
| CCP-50CF$_3$ | 9.90% | | |
| PCH-5F | 9.00% | | |
| AUUQPU-3-F | 10.00% | | |

Example M39

| | | | |
|---|---|---|---|
| CCP-1F.F.F | 3.00% | Clearing point [° C.]: | 79.5 |
| CCP-2F.F.F | 6.00% | Δn [589 nm, 20° C.]: | 0.0796 |
| CCP-3F.F.F | 7.00% | Δε [kHz, 20° C.]: | 10.12 |
| CCP-5F.F.F | 5.00% | $\gamma_1$ [20° C., mPa · s]: | 202 |
| CCQU-2-F | 11.00% | $V_{10}$ [V]: | 0.93 |
| CCQU-3-F | 12.00% | | |
| CCQU-5-F | 8.00% | | |
| CGU-2-F | 4.00% | | |
| CGU-3-F | 7.00% | | |
| CCGU-3-F | 9.00% | | |
| ACQU-2-F | 8.00% | | |
| ACQU-3-F | 10.00% | | |
| ACQU-4-F | 10.00% | | |

Example M40

| | | | |
|---|---|---|---|
| CCH-5CF$_3$ | 2.00% | Clearing point [° C.]: | 79.5 |
| CCP-2F.F.F | 9.00% | Δn [589 nm, 20° C.]: | 0.0659 |
| CCP-3F.F.F | 7.00% | Δε [kHz, 20° C.]: | 8.22 |
| CCP-5F.F.F | 4.00% | $\gamma_1$ [20° C., mPa · s]: | 169 |
| CCP-20CF$_3$.F | 7.00% | $V_{10}$ [V]: | 1.14 |
| CCP-50CF$_3$.F | 6.00% | | |
| CCOC-3-3 | 2.00% | | |
| CCOC-4-3 | 2.00% | | |
| CCQU-2-F | 10.00% | | |
| CCQU-3-F | 12.00% | | |
| CCQU-5-F | 8.00% | | |
| ACQU-2-F | 8.00% | | |
| ACQU-3-F | 10.00% | | |
| ACQU-4-F | 8.00% | | |
| CCH-501 | 5.00% | | |

Example M41

| | | | |
|---|---|---|---|
| CCP-1F.F.F | 6.00% | Clearing point [° C.]: | 80.0 |
| CCP-2F.F.F | 9.00% | Δn [589 nm, 20° C.]: | 0.0694 |
| CCP-3F.F.F | 10.00% | Δε [kHz, 20° C.]: | 8.96 |
| CCP-5F.F.F | 6.00% | $\gamma_1$ [20° C., mPa · s]: | 175 |
| CCP-20CF$_3$.F | 4.00% | $V_{10}$ [V]: | 1.11 |
| CCP-50CF$_3$.F | 8.00% | | |
| CCQU-2-F | 11.00% | | |
| CCQU-3-F | 12.00% | | |
| CCQU-5-F | 8.00% | | |
| ACQU-3-F | 26.00% | | |

Example M42

| | | | |
|---|---|---|---|
| CCP-1F.F.F | 8.00% | Clearing point [° C.]: | 88.0 |
| CCP-2F.F.F | 7.00% | Δn [589 nm, 20° C.]: | 0.0788 |
| CCP-3F.F.F | 9.00% | Δε [kHz, 20° C.]: | 8.51 |
| CCP-5F.F.F | 6.00% | $\gamma_1$ [20° C., mPa · s]: | 192 |
| CCP-30CF$_3$.F | 9.00% | $V_{10}$ [V]: | 1.13 |
| CCP-50CF$_3$.F | 9.00% | | |
| CGU-2-F | 5.00% | | |
| CCGU-3-F | 5.00% | | |
| CCQU-2-F | 11.00% | | |
| CCQU-3-F | 12.00% | | |
| CCQU-5-F | 8.00% | | |
| ACQU-3-F | 6.00% | | |
| ACQU-4-F | 5.00% | | |

Example M43

| | | | |
|---|---|---|---|
| CCP-1F.F.F | 2.00% | Clearing point [° C.]: | 81.0 |
| CCP-20CF$_3$ | 8.00% | Δn [589 nm, 20° C.]: | 0.0785 |
| CCP-30CF$_3$ | 8.00% | Δε [kHz, 20° C.]: | 7.27 |
| CCP-40CF$_3$ | 6.00% | $\gamma_1$ [20° C., mPa · s]: | 108 |
| CCP-50CF$_3$ | 8.00% | $V_{10}$ [V]: | 1.34 |
| CCP-20CF$_3$.F | 12.00% | | |
| ACQU-2-F | 8.00% | | |
| ACQU-3-F | 8.00% | | |
| ACQU-4-F | 8.00% | | |
| PUQU-2-F | 5.00% | | |
| PUQU-3-F | 7.00% | | |
| CC-3-V1 | 8.00% | | |
| CC-4-V | 9.00% | | |
| CCOC-4-3 | 3.00% | | |

Example M44

| | | | |
|---|---|---|---|
| CC-3-V1 | 5.00% | S → N [° C.]: | <20.0 |
| CCP-1F.F.F | 8.00% | Clearing point [° C.]: | 82.5 |
| CCP-2F.F.F | 10.00% | Δn [589 nm, 20° C.]: | 0.0939 |
| CCQU-2-F | 10.00% | Δε [kHz, 20° C.]: | 10.6 |
| CCQU-3-F | 5.00% | $\gamma_1$ [20° C., mPa · s]: | 128 |
| CCP-20CF$_3$ | 8.00% | $V_{10}$ [V]: | 1.19 |
| CCP-30CF$_3$ | 8.00% | | |
| CGU-2-F | 9.00% | | |
| PGU-3-F | 5.00% | | |
| CCP-V-1 | 6.00% | | |
| CCG-V-F | 18.00% | | |
| APUQU-3-F | 8.00% | | |

Example M45

| | | | |
|---|---|---|---|
| CCP-2F.F.F | 7.00% | Clearing point [° C.]: | 88.0 |
| CCP-3F.F.F | 6.00% | Δn [589 nm, 20° C.]: | 0.0720 |
| CCP-5F.F.F | 6.00% | Δε [kHz, 20° C.]: | 16.1 |
| ACQU-2-F | 10.00% | $\gamma_1$ [20° C., mPa · s]: | 210 |
| ACQU-3-F | 10.00% | $V_{10}$ [V]: | 0.97 |
| ACQU-5-F | 11.00% | | |
| CCQU-2-F | 10.00% | | |
| CCQU-3-F | 12.00% | | |
| CCQU-5-F | 10.00% | | |
| CCGU-3-F | 5.00% | | |
| CCZU-2-F | 4.00% | | |
| CCZU-3-F | 9.00% | | |

The invention claimed is:

1. A liquid-crystalline compound of the formula I:

I

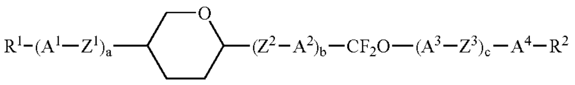

in which $R^1$ and $R^2$ each, independently of one another, denote H, halogen, a halogenated or unsubstituted alkyl or alkoxy radical having 1 to 15 C atoms, where one or more $CH_2$ groups in these radicals, independently of one another, are optionally replaced by —C≡C—, —CH═CH—, —O—, —CO—O— or —O—CO— in such a way that O atoms are not linked directly to one another, and where one of the radicals $R^1$ and $R^2$ is optionally CN, OCN, SCN, NCS or $SF_5$, $A^1$, $A^2$, $A^3$ and $A^4$ each, independently of one another, denote

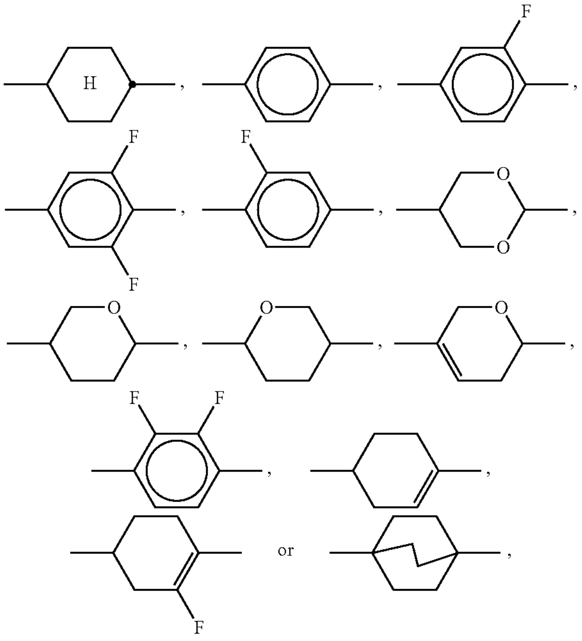

$Z^1$, $Z^2$ and $Z^3$ each, independently of one another, denote —CO—O—, —O—CO—, —$CF_2O$—, —$OCF_2$—, —$CH_2O$—, —$OCH_2$—, —$CH_2CH_2$—, —$(CH_2)_4$—, —$C_2F_4$—, —$CH_2CF_2$—, —$CF_2CH_2$—, —CF═CF—, —CH═CH—, —C≡C— or a single bond, and a, b and c each, independently of one another, denote 0, 1, 2 or 3, where $a+b+c \leqq 3$.

2. A liquid-crystalline compound of claim 1, which is of the formula IA:

IA

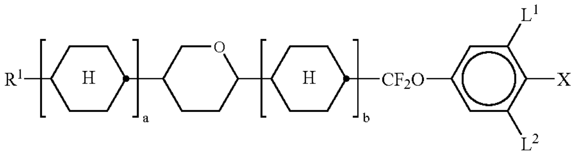

in which $R^1$, $R^2$, a, and b have the meanings indicated in claim 1, where a+b=1 or 2, and $L^1$ and $L^2$ each, independently of one another, denote H or F.

3. A liquid-crystalline compound according to formula I of claim 1, wherein a=1 and b=0 or a=0 and b=1.

4. A liquid-crystalline compound according to claim 2, wherein $L^1$ denotes fluorine and $L^2$ denotes fluorine or hydrogen.

5. A liquid-crystalline compound according to claim 2, wherein $L^1$ and $L^2$ denote fluorine.

6. A liquid-crystalline compound of claim 1, which is of one of the formulae I1 to I31:

I1

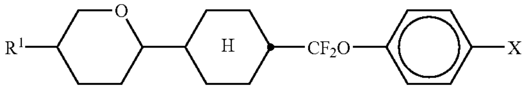

I2

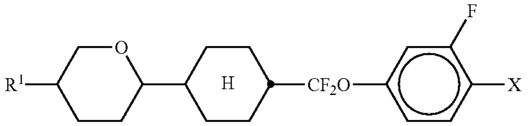

I3

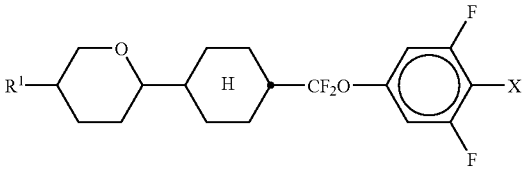

I4

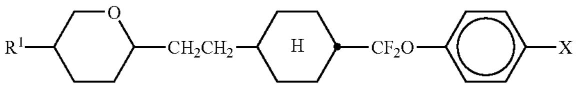

I5

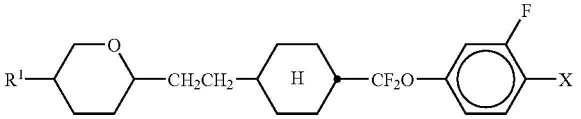

-continued

I6

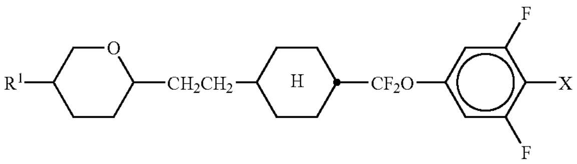

I7

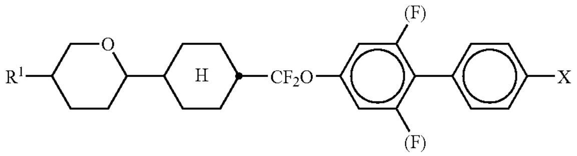

I8

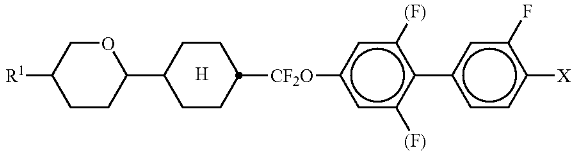

I9

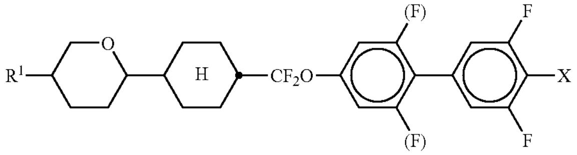

I10

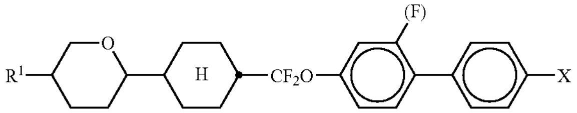

I11

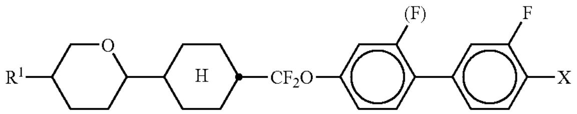

I12

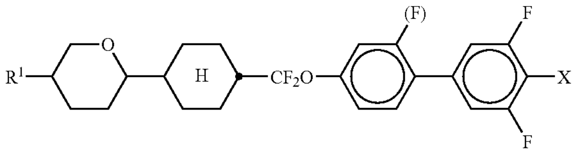

I13

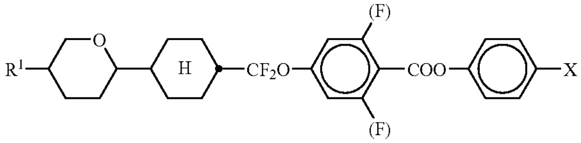

I14

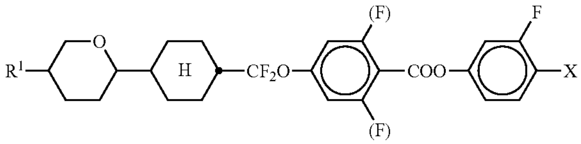

-continued

I15

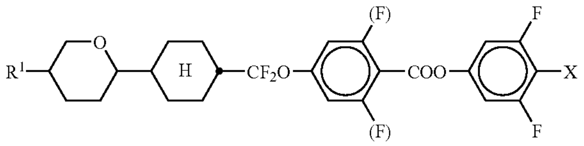

I16

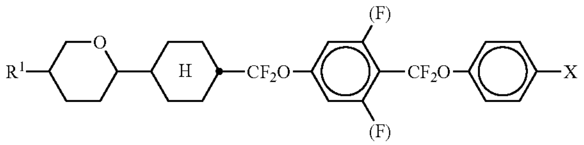

I17

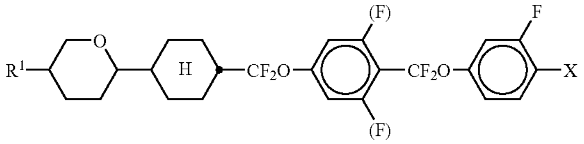

I18

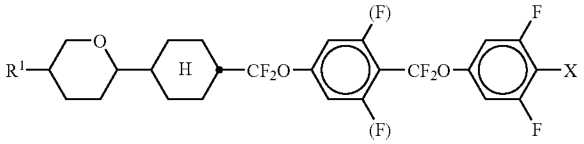

I19

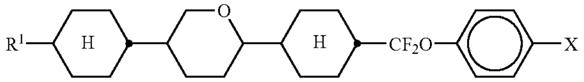

I20

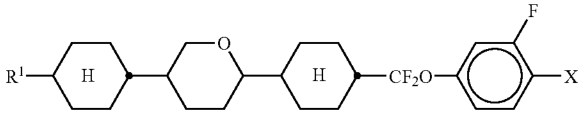

I21

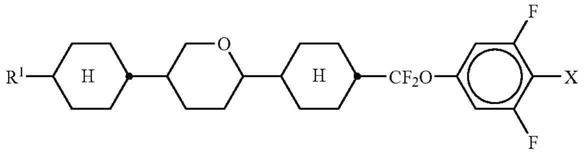

I22

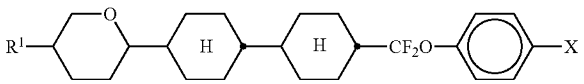

I23

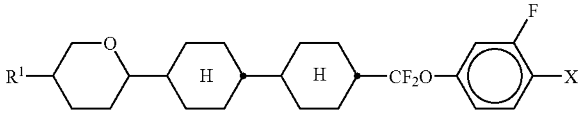

I24

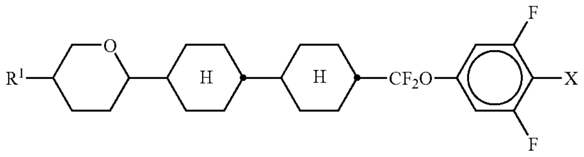

-continued

I25

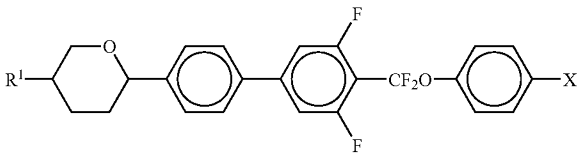

I26

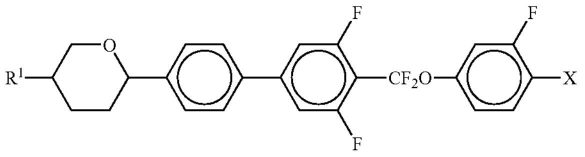

I27

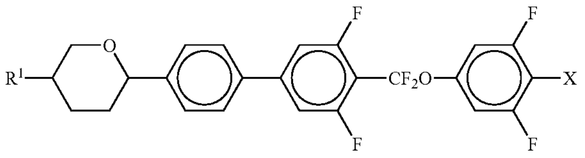

I28

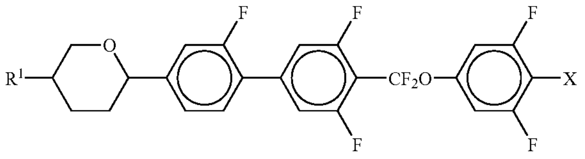

I29

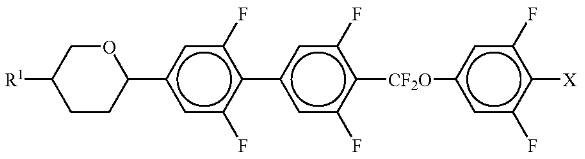

I30

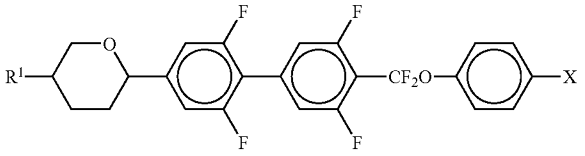

I31

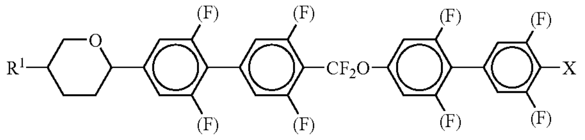

in which $R^1$ has the meaning indicated in claim 1 and X has the meaning of $R^2$ in claim 1.

7. Liquid-crystalline medium comprising at least two mesogenic compounds, which comprises at least one compound of the formula I according to claim 1.

8. Liquid-crystalline medium according to claim 7, which comprises one or more compounds selected from the group consisting of the compounds of formulae II to IX:

-continued

II

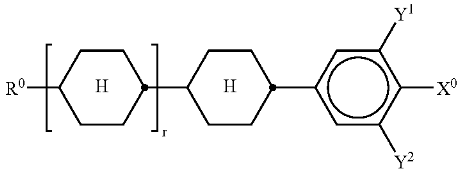

III

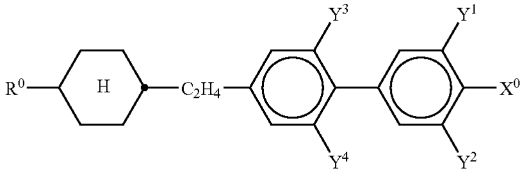

IV

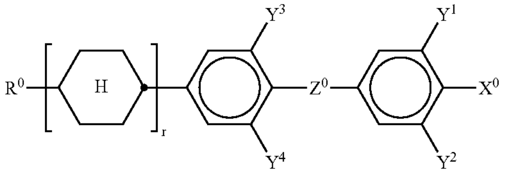

V

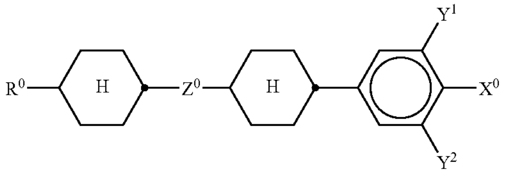

VI

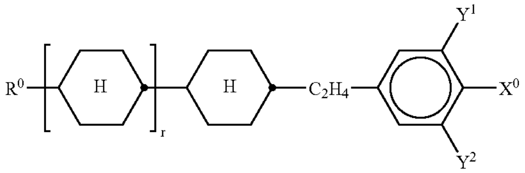

VII

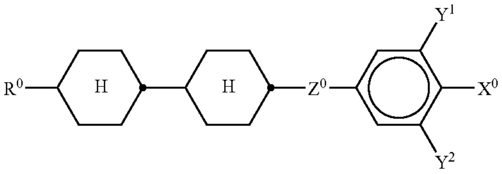

VIII

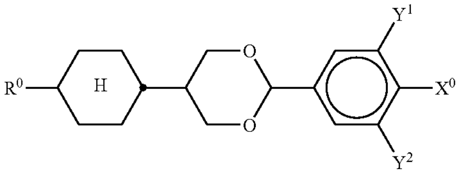

IX

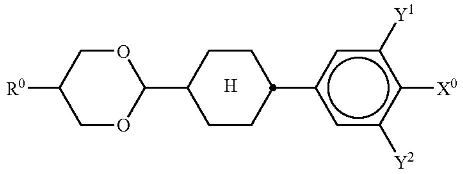

in which $R^0$ denotes n-alkyl, oxaalkyl, fluoroalkyl, alkenyloxy or alkenyl, each having up to 9 C atoms, $X^0$ denotes F, Cl, halogenated alkyl, halogenated alkenyl, halogenated alkenyloxy or halogenated alkoxy having up to 7 C atoms, $Z^0$ denotes —CH═CH—, —$C_2H_4$—, —$(CH_2)_4$—, —$C_2F_4$—, —$CH_2O$—, —$OCH_2$—, —CF═CF—, —$CF_2O$—, —$OCF_2$— or —COO—, $Y^1$, $Y^2$, $Y^3$ and $Y^4$ each, independently of one another, denote H or F, and r is 0 or 1.

9. Electro-optical liquid-crystal display containing a liquid-crystalline medium according to claim 7.

10. A liquid-crystalline compound according to formula IA of claim 2, wherein a=1 and b=0 or a=0 and b=1.

11. Electro-optical liquid-crystal display containing a liquid-crystalline medium according to claim 8.

12. A liquid-crystalline compound of claim 1, which in formula I, a=0.

* * * * *